United States Patent
Paley et al.

(10) Patent No.: US 6,457,152 B1
(45) Date of Patent: Sep. 24, 2002

(54) DEVICE AND METHOD FOR TESTING A DEVICE THROUGH RESOLUTION OF DATA INTO ATOMIC OPERATIONS

(75) Inventors: Daniel Noah Paley, Redwood City; Mark William Knecht, Los Gatos, both of CA (US)

(73) Assignee: inSilicon Corporation, San Jose, CA (US)

( * ) Notice: Subject to any disclaimer, the term of this patent is extended or adjusted under 35 U.S.C. 154(b) by 0 days.

(21) Appl. No.: 09/174,250

(22) Filed: Oct. 16, 1998

(51) Int. Cl.[7] .............................................. G06F 13/24
(52) U.S. Cl. .......................... 714/738; 714/39; 714/33; 714/741; 714/742
(58) Field of Search .............................. 714/33, 37, 39, 714/738, 741, 742, 25, 32, 43, 734

(56) References Cited

U.S. PATENT DOCUMENTS

| | | | |
|---|---|---|---|
| 2,277,037 A | | 3/1942 | Clark et al. |
| 3,246,507 A | | 4/1966 | Hyde et al. |
| 4,176,750 A | | 12/1979 | Holmes |
| 4,260,261 A | | 4/1981 | Mann et al. |
| 4,592,353 A | | 6/1986 | Daikuzomo |
| 4,991,176 A | * | 2/1991 | Dahbura et al. ............ 714/724 |
| 5,070,875 A | | 12/1991 | Falck et al. |
| 5,152,401 A | | 10/1992 | Affeldt, Jr. et al. |
| 5,355,721 A | | 10/1994 | Las Navas Garcia |
| 5,436,454 A | | 7/1995 | Bornstein et al. |
| 5,464,456 A | | 11/1995 | Kertz |
| 5,623,499 A | * | 4/1997 | Ko et al. .................... 371/22.1 |
| 5,627,922 A | | 5/1997 | Kopelman et al. |
| 5,633,467 A | | 5/1997 | Paulson |
| 5,864,658 A | * | 1/1999 | Theobald ...................... 714/26 |
| 5,923,567 A | * | 7/1999 | Simunic et al. ............. 364/490 |
| 5,923,836 A | * | 7/1999 | Barch et al. .................. 714/33 |
| 6,049,662 A | * | 4/2000 | Saha et al. ..................... 714/33 |
| 6,158,031 A | * | 12/2000 | Mack et al. ................. 714/724 |
| 6,161,206 A | * | 12/2000 | Wasson ....................... 714/738 |
| 6,185,708 B1 | * | 2/2001 | Sugamori ................... 714/724 |

* cited by examiner

*Primary Examiner*—Peter Wong
*Assistant Examiner*—Raymond N Phan
(74) *Attorney, Agent, or Firm*—Douglas S. Rupert; Wildman, Harrold, Allen & Dixon

(57) ABSTRACT

A method of testing a device includes monitoring an output of the device, wherein the output is generated by the device in response to an applied test command; and resolving the output into atomic operations, wherein the atomic operations are substantially the smallest constituent operations which are substantially independent of the device. The method is used to provide a simple, comprehensive test environment that effectively tests 1394a and 1394–1995 designs, for example, in Verilog. The test environment contains rules which completely characterize the behavior of different 1394 bus protocols as defined by the IEEE specifications. The test environment provides portability between different devices under test and between different protocols, automated closed-loop reconciliation of test commands and protocol requirements, topology independence, and out-of-order execution of instructions or relative sequencing. The test environment further allows failure injection, and separate and independent design of the device and a test system.

20 Claims, 5 Drawing Sheets

DEVICE AND METHOD FOR TESTING A DEVICE THROUGH RESOLUTION OF DATA INTO ATOMIC OPERATIONS

CROSS-REFERENCE TO RELATED APPLICATIONS

Not applicable.

BACKGROUND OF THE INVENTION

1. Field of the Invention

The invention disclosed broadly relates to the field of testing integrated circuit designs, and more particularly relates to the field of testing the protocol compliance of designs (such as Verilog designs) of a link layer for either the 1394-1995 or the 1394a bus protocols.

2. Description of the Related Art

Integrated circuit ("IC") designs are commonly designed in software, such as Verilog. It is useful, therefore, to test the design in software as well. Accordingly, a variety of tools have been developed to facilitate both the design and the test of ICs in software. The design itself is also commonly broken into different components, and in such development schemes it is important to be able to test the individual components of the design.

For applications that utilize either the 1394-1995 or the 1394a bus (collectively referred to hereinafter as the "1394 Bus"), many of the protocol functions can be developed independently of the application itself and then incorporated with the application in a single Verilog design, and eventually in a single IC, or application specific IC ("ASIC"). There are three layers of interest to the present invention.

The serial bus specification for the 1394 Bus defines a Link Layer (or Link Layer Core ("LLC")), with the Link Layer providing a half-duplex data packet delivery service. The Link Layer performs the protocol functions referred to in the preceding paragraph. The specification further defines a Physical Layer (or "Phy Layer"), to which the Link Layer interfaces and which provides lower level services such as generating the electrical signals on the transmission medium. The application itself will be referred to as the Application Layer.

The Link Layer must be able to communicate with both the Application Layer and with the Phy Layer. The 1394 Bus specification defines the connection between the Link Layer and the Phy Layer (the "Link-Phy Bus"), but does not define the connection between the Link Layer and the Application Layer (the "Link-Application Bus"). The Application Layer and the Link Layer can be incorporated into the same design and onto the same ASIC. In such a case, the Link-Phy bus connects two separate devices, and the Link-Application Bus is internal to the ASIC. A variety of tools have been developed to test the Link-Phy Bus, and some of these tools also define the Link-Application Bus and test that as well. Naturally, an Application Layer developer would want to know which testing tool was going to be used so that he or she could design the Application Layer to adhere to the tool's Link-Application Bus definition if it had one.

It is a common industry practice to try to develop a test for a new product at the same time that the product is being developed. It is an ongoing challenge to keep these two developments from influencing each other, and thus to maintain the integrity and utility of the test that is developed.

The LLC, test environments typically have several features in common: (i) they employ a behavioral or functional model which requires the test commands to be written at the physical level, (ii) each device (e.g. LLC) which is part of the system under test is separately modeled (the 1394 specification allows up to 63 separately addressable devices on each bus, including bridges to other buses), (iii) the test commands are scripted in a particular order, (iv) the protocol rules are integrated into the test environment, ensuring that all operations which are performed conform to the protocol requirements, and (v) outputs from the device under test ("DUT," which in this case is an LLC) are recorded but must be separately verified to determine if the test was successful. Some test environments use mathematical models of the 1394 Bus specification to verify that the protocol is being followed, but these systems are not in common use in industry.

SUMMARY OF THE INVENTION

It is an object of the invention to provide a test environment which will allow a test to be performed on different devices with a minimal amount of software revision to accommodate the different physical characteristics of the devices.

It is a further object of the invention to provide a test environment which is able to determine not only whether or not the protocol has been followed, but whether or not the expected test result has been achieved, and to be able to do this in an automated fashion. Such a test environment must be able to effectively close the loop by being able to generate the operations for the test, monitor the actual results, and compare the actual results to the expected/desired results.

It is a further object of the invention to provide a test environment that allows separate development of the design and the test system.

It is a further object of the invention to provide a test environment which is modular, so that separate modules can be used independently as part of a test and the entire test environment does not need to be used for every test.

It is a further object of the invention to provide a test environment that is topology independent, that is, whose computations do not rise geometrically when additional devices are logically added to the bus.

It is a further object of the invention to provide a test environment for which test commands can be written architecturally, that is, independently of the specific physical characteristics of the device under test ("DUT").

It is a further object of the invention to provide a test environment that does not require absolute timing for every event, e.g. transmitted and/or received actions on the bus, and thus to provide a system; which can test and simulate "random" events, as well as operate faster in certain cases due to a higher throughput of operations.

It is a further object of the invention to provide a test environment in which protocol failures can be injected, tracked, monitored, and reported.

It is a further object of the invention to provide a test environment which can be used to perform a particular test on a particular device in different and/or multiple bus protocols, potentially more than one protocol in a given test, and to do so with a minimal amount of software revision to accommodate the different bus protocols.

There is provided, according to one aspect of the invention, a method of testing a device. The method includes the steps of monitoring at least one output of the device, and resolving the at least one output into atomic operations. The at least one output is generated by the device in response to an applied test command. The atomic operations are substantially the smallest constituent operations which are substantially independent of the device.

There are further provided, according to other aspects of the invention, a system and a computer program product which facilitate the above method.

There is further provided, according to another aspect of the invention, another method of testing a device. The method includes the step of applying a test command to the device. The step of applying the test command includes the steps of breaking the test command into its atomic operations, and applying the atomic operations to the device. The atomic operations are substantially the smallest constituent operations which are substantially independent of the device. A generator rules section, which includes rules for the protocol and for the device and for the test command, is utilized to apply the atomic operations to the device.

There are further provided, according to other aspects of the invention, a system and a computer program product which facilitate the above method.

There is further provided, according to another aspect of the invention, a method of reconciling at least one monitored output of a device as part of a test of the device, wherein a test command has been applied to the device and the at least one output has been resolved into atomic operations. The atomic operations are substantially the smallest constituent operations which are substantially independent of the device. The method includes the steps of: reconciling the atomic operations of the at least one monitored output against at least one rule governing a protocol; and recording the results of the protocol reconciling step.

There are further provided, according to other aspects of the invention, a system and a computer program product which facilitate the above method.

There is further provided, according to another aspect of the invention, another method of testing a device. The method includes the step of utilizing a monitor rules section for monitoring outputs from the device. The monitor rules section includes output protocol rules for a protocol and output device rules for the device. Both the output protocol rules and the output device rules relate to outputs from the device.

BRIEF DESCRIPTION OF THE DRAWINGS

The accompanying drawings, which are incorporated in and constitute part of the specification, illustrate a presently preferred embodiment of the invention, and, together with the general description given above and the detailed description of the preferred embodiment given below, serve to explain the principles of the invention.

DETAILED DESCRIPTION OF A PREFERRED EMBODIMENT

Figure 1:
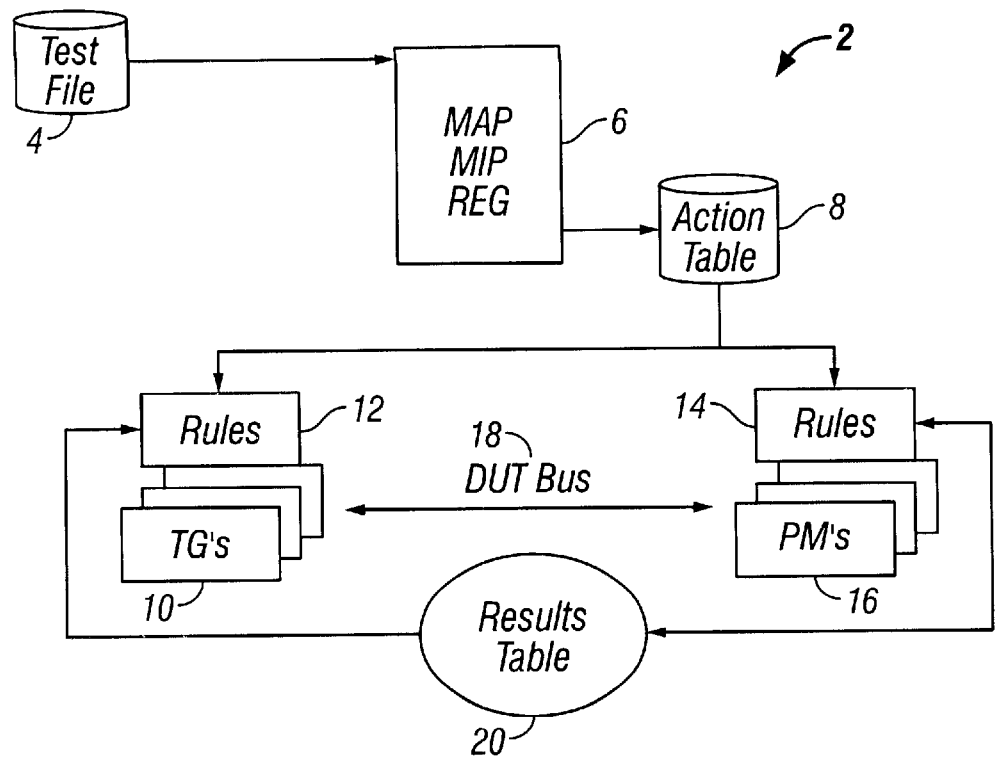
FIG. 1 is a block diagram showing most of the major modules of preferred embodiment for one side of the DUT.

In accordance with the present invention, the functionality disclosed in this application can be, at least partially, implemented by hardware, software, or a combination of both. This may be done for example, with a computer system running Verilog, or other design programs. Moreover, this functionality may be embodied in computer readable media (or computer program product) such as 3.5 inch diskettes to be used in programming an information-processing apparatus to perform in accordance with the invention. This functionality may also be embodied in computer readable media such as a transmitted waveform to be used in transmitting the information or functionality.

Although a specific embodiment of the invention is disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

This description is divided into multiple parts. The first is a broad overview of the system components and a typical data flow through them, as well as a general description of the prominent advantages of the preferred embodiment. The second is a series of more detailed treatments of these components, and the remaining parts are appendices containing additional explanatory material.

1. Definitions and Broad Overview of System and Advantages

The 1394 test environment was created with real hardware knowledge in mind. Taking a look as to how to test this system in a lab setting, a "black box" test strategy has been created which is very simple and modular. One need only use the parts of the system desired; all other parts may be removed.

Before getting into the architecture of how the test environment works, a few definitions first need to be explained. Some of these terms have been explained or defined above, and/or will be explained or defined below. Multiple explanations, or definitions, of any terms, where they exist, offer another vantage point from which to view the concept and ought to provide a more complete understanding of the idea.

The first definition is that of "atomic operation" or AO. An Atomic Operation is the smallest constituent and/or non-divisible independent operation on any bus. Observing a microcontroller bus,, it can be seen that there are reads and writes. Reads and writes would then translate into a read AO and a write AO. An Atomic Operation is the smallest divisible operation which can take place on the bus, where breaking the operation down further would possibly violate the 1394 protocol.

The next definitions are those of Traffic Generators ("TGs") and Protocol Monitors ("PMs"). This Test Environment ("TE") was designed with the understanding that monitoring the ongoing protocol was very important. The Protocol Monitors are a vital part of the system. The responsibility of a Protocol Monitor is to watch the bus it is connected to and report "higher up" if a certain protocol is observed. The converse of a Protocol Monitor is the Traffic Generator. The Traffic Generator is responsible for generating Atomic Operations when no other "system" module will generate the desired AO. If a TE has a TG, then it needs a PM. The converse, however, is not true. If a TE has a PM, it does not necessarily need a TG.

Two additional definitions are directed toward whether or not a "mistake" is encountered by a PM or the processing that is done after the PM. The mistake may be related to either the bus protocol or the DUT. The first of these definitions is a "failure," which refers to user-induced or user-created mistakes. These are purposeful. The second definition is an "error," which refers to an unexpected mistake or failure. These are not user-created and as such are not purposeful.

Because the 1394 protocol is what is known as a split transaction protocol, not all portions of a transfer are completed in a sequential period. There are two major divisions in commands: requests and responses. A request for a read or a write of some type may be generated by any node in the system. A response to a request, must come after the corresponding request, but not directly after. The time may lag by a considerable amount. Therefore, the command transfer structure has been broken down into these two major portions. Each of these commands has an associated acknowledge. So, there are really four types of commands associated with asynchronous type transfers: request, indication, response, confirmation.

To allow a test to specify the order in which these commands are run, the idea of a table index or an array index is used. All of the above commands reside in a table called the action_list. Within this memory table, referred to herein as an "Action List," addresses indicate which command or transfer has been chosen. If, for example, the first location is loaded with a read quadlet command, the system will need to know in what order to execute the request, the request ACK, the response, and the response ACK. The system is told which sub-action to execute next by the use of absolute or relative timing.

If absolute timing has been used, the test writer has gone through the system and has hand tuned each test entry in the table. Therefore, to send the request at time 100 ns, and the request ACK at time 110 ns, the response at time 200, and the response ACK at time 210, the entry would be loaded, for example, with the following:

The transfer timing is absolute.

The request is executed at time 100 ns.

The request ACK follows the request by 10 ns.

The response is executed at time 200 ns.

The response ACK is executed at time 210 ns.

In this mode, it is left to the user to make sure that they are not violating any protocols (such as order) while assigning absolute times. The other mode of sequencing through a test is by relative timing.

Relative timing takes into account the Action List index for each command. When loading the Action List, entries and/or commands are made sequentially from the test. Once the table is loaded, relative indexing refers to a relative index into the Action List memory to assign an order. Relative timing, as well as each of the other concepts and modules mentioned above, will be further explained by the remainder of this overview section, as well as by the more detailed sections of this application.

For all test instructions (MAP, MIP, REG) there is a need to allow independent sequencing of the instructions. By allowing for a concept and feature called Marker information, the user is allowed to create multi-threaded tests, and the testing of the split transaction nature of the 1394 bus is also allowed. The Marker descriptions are slightly different for the three commands.

The Request Start marker (which is common to all instructions) has four parameters which describe the:conditions. Request_start_time, Request_absolute_relative, Request_index, and Request_Phase. There are two basic modes of operation, or ways to describe when a request starts.

For initial commands, and for control instructions which must be tightly timed, the absolute time is the time when the simulation equals the value in the Request_Start_Time. When this time is reached, the condition is met for execution of this portion of this instruction. The Index and Phase information are unused in this mode.

For normal execution of subsequent commands the relative mode should be used. The relative mode takes into account some previous or subsequent command and makes the condition for execution relative to the completion of another instruction, sub-section, sub-action, or AO. Referring to the Action List, where all instructions are stored for the system, it can be seen that all test instructions are stored sequentially. The sequential nature of this storage can be taken advantage of by using the following two scenarios to describe the relative mode of operation further.

A series of three MAP commands (MAP1, MAP2, MAP3), for example, can be executed in many ways. One scenario could execute MAP1 then MAP2 then MAP3, and a second scenario could execute MAP1 then MAP3 then MAP2. These scenarios will be used to describe how the relative mode works.

In the first example, the MAP1 instruction may very well be an absolute timing. This is because it is the beginning of a thread. It is desired to execute the second instruction (MAP2) after MAP1 is finished. This is done by assigning the value of 1 for the request_index and a complete to the request_phase parameters.

A value of 1 is assigned to the index because it needs to go back one entry in the Action List. The phase is assigned the value "complete," because it is desired to run this request when the previous command has completed.

For the MAP3 instructions, the same values of 1 for index and complete for phase are assigned. This again will assign MAP2 complete to be the condition necessary for running request MAP3.

In the second example, again the MAP1 instruction may have an absolute value for the request. But in this; example it is desired for request MAP3 to execute before MAP2. This is set up by having MAP2's request index set to −1 (a negative number relates to a positive step in the Action List, not a lower step). MAP3's index would be set to 2 (again, going back or down two places in the Action List).

For the MAP instructions there are absolute or relative timings for the request, the request acknowledge, the response, and the response acknowledge. For the MIP and REG instructions, there is only the request marker.

In some cases, the link core will be responsible for sending the ACK. In this case, the test environment has little control over when the ACK will be executed. The test environment will only run the sub-actions it has control over and will ignore ACK timing for instructions which it cannot control that are generated by the TGs.

Figure 2:
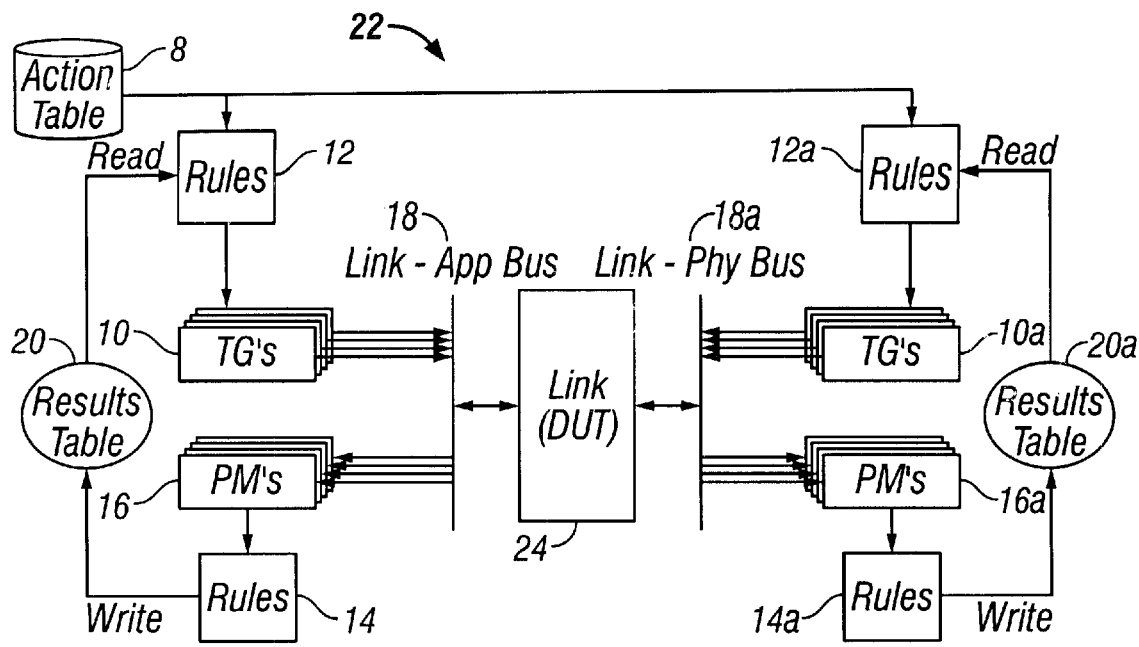
FIG. 2 is a block diagram showing most of the major modules of the preferred embodiment for both sides of the DUT.

Referring to FIGS. 1 and 2, there are shown two overviews 2, 22 of the preferred embodiment, which is a test environment for a LLC in a 1394 Bus. Note that although this discussion deals with testing a LLC in a 1394 Bus, alternate embodiments could test a variety of other devices and other protocols.

Virtually any other protocol could be used and tested with the TE. Examples include, but are not limited to, MPEG, PCI, and AGP. In order to use a protocol other than 1394, additional or different instructions may be required, but the format for the TE would be the same. Additionally, different devices could be tested with the TE. Any device can be tested for which the output can be influenced and understood. This is a simple requirement of being deterministic. Examples of other testable devices include, but are not limited to, memories, input/output devices, and processors. When a new device is being tested with the 1394 protocol, for example, the PMs can be used and new TGs would, most probably, need to be created. This process illustrates the adaptability and the modularity of the TE.

FIG. 1 shows a test file 4, which contains test commands written at an architectural level, that is, independent of the specific physical characteristics of the device. This is analogous to a high level programming language, which can be translated into any of a variety of machine languages. FIG. 1 further shows this translation process 6, with the test file being translated into the primary commands of the preferred embodiment. These commands are move asynchronous packet ("MAP"), move isochronous packet ("MIP"), and read/write to a LLC register ("REG"). The translated test file test commands are then placed in an Action Table (or Action List) 8. A rules section governing transmission 12 accesses the Action Table 8 in order to determine what commands need to be executed. The rules section 12 then executes the commands by further translating them into smaller, physical-device dependent commands called Atomic Operations (not shown). The Atomic Operations are each performed by a Traffic Generator ("TG") 10, and executed over the DUT Bus 18.

The Protocol Monitors ("PMs") 16 monitor the DUT Bus 18, and recognize Atomic Operations that come across the DUT Bus 18. The PMs use rules section 14 (separate and distinct from the rules section for the TGs 12) to interpret the data and classify it. All Atomic Operations that are monitored are stored in the Results Table 20, and the rules section 14 attempts to identify and interpret the data being accumulated in the Results Table 20. The rules section 14 may eventually recognize a sequence of monitored Atomic Operations and classify them as pertaining to a specific test command. Alternately, the rules section 14 may determine that a protocol error or a test error occurred. All of these determinations are likewise stored in the Results Table 20.

Referring to FIG. 2, there is shown a more complete system 22. The DUT Bus 18 is now shown connected to a DUT 24, and on the other side of the DUT 24 there is shown (i) another DUT Bus 18a, (ii) another set of TGs 10a, PMs 16a, and their associated rules sections 12a, 14a (respectively), and (iii) another Results Table 20a. Each bus 18, 18a is treated separately by the test environment, although there is a great deal of communication through the Action Table 8. For each bus 18, 18a, the TGs 10, 10a generate traffic, the PMs 16, 16a monitor traffic, and the PM rules section 14, 14a reconciles the monitored traffic in the Results Table 20, 20a using the Action Table 8.

There are several prominent features which distinguish the preferred embodiment, and a variety of advantages which flow from these features. These features include the use of: (i) Atomic Operations, (ii) rules sections, and (iii) a Bus Equivalent Model ("BEM," defined below).

Another definition is that of a BEM. A BEM models the bus protocol as opposed to the functionality of the device itself. Other systems use a Bus Functional Model. In a Bus Functional Model, the system sets up an equivalent behavioral model of the device features themselves as opposed to the bus. By using a BEM, the TE does not need to simulate the topology and the devices. The system can be set up as one node, and the TE can emulate the bus traffic.

Another definition is that of a pseudo-device. A pseudo-device is a logical device, as opposed to a physical device, and its interaction with the bus is emulated. Pseudo-devices are used with the BEM.

Atomic Operations have briefly been explained above, and will be further defined below, in addition to the short explanation which follows. In a layered hierarchy, Atomic Operations ought to be the lowest logical layer. In such a way, Atomic Operations are the smallest constituent operations of a command which can be defined without specific regard to the physical device. This provides the test environment with a fine granularity for using or monitoring the DUT. The following features flow, at least in part, out of the use of Atomic Operations (as will be explained in greater detail below): (i) topology independence, (ii) relative timing and out-of-order operations capability, (iii) the ability to inject protocol failures, (iv) support of architecturally written tests, and (v) portability of a test to a different device.

Topology independence is achieved by being able to simulate the device's interface with another device, or a group of devices, rather than having to simulate the entire device itself (or a the entire group of devices). This allows the simulation of the bus protocol instead of the devices (through the use of pseudo-devices and the use of the invention).

Relative timing, and out-of-order execution of Atomic Operations, is possible, because the test environment can recognize the Atomic Operations and store the fact of their being generated or monitored. The test environment itself does not necessarily care what order the operations are performed in, as long as the protocol is followed. Therefore, if the protocol does not require a particular sequencing of operations, then the system, because of its fine granularity, will not :require it either.

Using Atomic Operations, the system is able to inject specific protocol failures. It is also able to recognize failures with the PMs. Again, because of its fine granularity, the system need not simply follow the protocol rules, but can implement and monitor test commands which call for a protocol failure. Systems which do not implement Atomic Operations will typically not be able to generate the failures, because that fine a level of granularity is not available for the test commands. Additionally, they will typically not be able to specifically monitor and report such failures, again because of a lack of available granularity. These systems will, however, typically be able to report the fact that some protocol failure did occur.

The use of Atomic Operations also allows the test commands to be written at a higher level, without regard to the physical device, and for these tests to be used with different devices. The Atomic Operations for that different device would, of course, need to be rewritten, at least in part.

The second prominent feature, from which a variety of advantages flow, is the use of rules sections. The rules sections, as briefly explained above, contain information on the protocol rules, the DUT, and the test itself (or at least has access to the test information). The rules sections close the loop on the test, and allow the monitored bus activity to be reconciled with the protocol rules and the expected test results.

Figure 3:
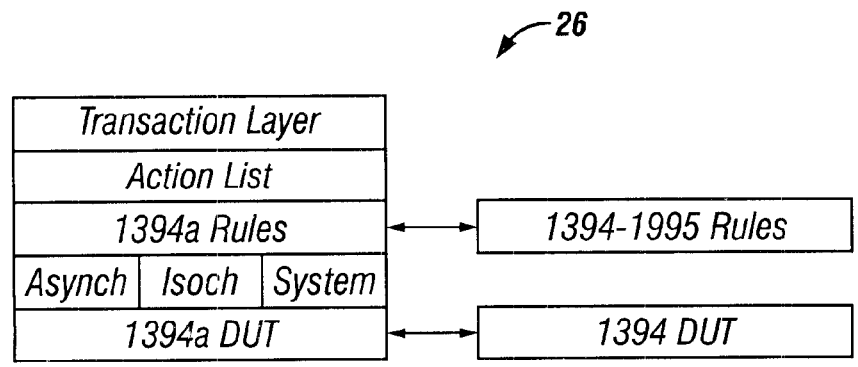
FIG. 3 is a block diagram showing the hierarchical and modular nature of the preferred embodiment.

The rules sections also allow the portability of a test to either a different device or a different protocol. This relies, in part, on the fact that the rules sections are separated from the other functions of the test environment. Referring to FIG. 3, there is shown a hierarchical stack 26 of the 1394 test environment. As can be seen, such an architecture isolates the key characteristics of the 1394a and 1394-1995 buses by using a set of rules specific to the IEEE specifications. These rules drive the 1394 Traffic Generators and Protocol Monitors to execute, respond, and interpret 1394 bus activity on both the Link-Phy Bus and the Link-Application Bus.

As suggested by FIG. 3, the rules relating to a specific device or protocol can be changed with relative ease compared to rewriting the entire test environment to account for all of the different places that deal with the rules. It can be seen that the rules sections also have a carefully designed interface, containing information on the protocol and the device, but not being able to generate or monitor Atomic Operations without the TGs or the PMs, respectively.

Additionally, the use of separate rules sections for the TGs and the PMs allows a test system to be developed independently of the physical ASIC development (e.g. a LLC). Preferably (it is industry standard, but not necessarily required), the test developers would be responsible for developing the rules section for the Traffic Generators and the Protocol Monitors, and these rules sections would be based on a common specification for the formal protocol. Therefore, there is little or no interaction necessary between the two groups (e.g. discussing particular implementations) except for the specification of the device's interface to the bus. The use of a BEM and pseudo-devices are two key reasons why the test developer need only know the operational parameters (contained in the specification of the device), and need not know the details of the device implementation.

The third prominent feature, from which a variety of advantages flow, is the use of a bus equivalency model. This is in contrast to a bus functional model, or behavioral model. This feature, along with the use of Atomic Operations allows the interface to a device, or series of devices, to be simulated, rather than simulating the device itself. Again, the fine granularity of the Atomic Operations allows, for instance, the generation of bus traffic as if it had been generated by any particular device.

2. Detailed Discussion

This section contains a more detailed description of the operation of the 1394 Test Environment ("TE"). It includes discussion on how the TE works, the major components, and the theory of how testing is to be completed. No attempt will be made to educate the reader on the 1394 specification or theories of testing ASICs, however some background information is necessary. (Note that an appendix to this application contains further details concerning the general operation of the 1394(a) Test Environment.)

A. Separate Device and Test Designs

Looking at industry standards for the testing new ASIC designs, there is a pattern of using what are known as bus functional models ("BFMs") of the "new" design. As briefly mentioned above, two design teams are formed for creating the system, one for the actual design (the RTL design) and another equally or greater staffed effort in verification. The verification/test team must come up with a cycle-by-cycle accurate model to execute test vectors to check the validity of the RTL design, and it should do this without any knowledge of the activity of the RTL design team. One of the major problems with this method is that it requires the test team to interpret the specification just as the RTL designers are doing. In making these interpretations about the specification's requirements, errors can be made. In looking at these interpretations, the best way to prove a design correct would be to remove the engineer's interpretation.

Figure 4:
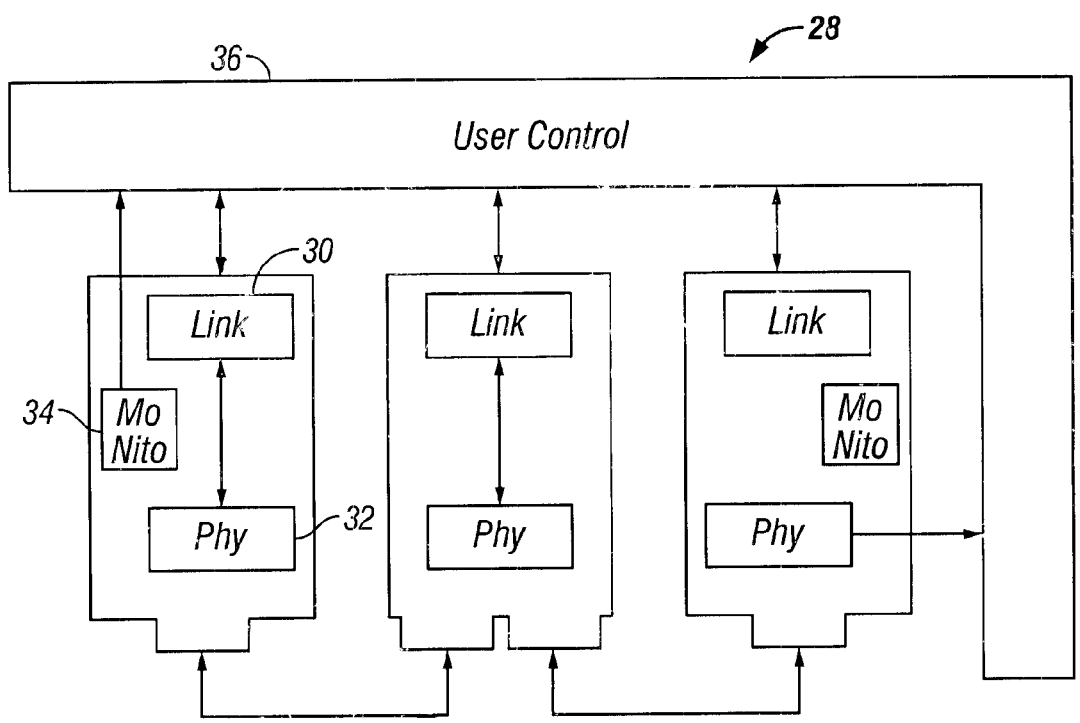
FIG. 4 is a high-level block diagram showing a topology for a test with the preferred embodiment.

Referring to FIG. 4, there is shown a typical test environment 28. There is shown both link 30 and phy 32 behavioral models along with some type of monitor 34. In order to set a vector pattern, there is also included a basic user control section 36. A major problem with this approach is that if both teams pick the same way of executing an assertion in the design, no cross-checking takes place. Also, typically, these environments are difficult to use. They include a lot of "hidden" parameters or registers, which will not be known to someone who does not have direct understanding or experience using the environment. Understanding of how to modify the system is only possible by the designers of the TE.

Another major problem may surface after the initial testing is completed, the product is shipped, and the next phase, or set, of enhancements is proposed and started. To use the test environment again may require reprogramming of the BFM to such an extent that it represents completely new code and, therefore, must be reverified prior to checking it against an RTL mode.

B. Description of Tests

The flow of information and data traverses the test environment ("TE") in the following way. The test is written by the user to perform some type of test. The test understands what should take place and what a successful, or correct, test is. The test is the most complex part of the TE system. The test is comprised of the following three sections:

Initialization of both the core/DUT and the Test Environment,

The test setup, and

The test scenario which is broken down into two sections:
The variables which change between runs, and
The particular description of the scenario.

The test will have one or more iterations or loops where the test code may be executed for different setups of the test scenario.

This basic test has the following commands:

MAP for move an asynchronous packet of information,

MIP for move an Isochronous packet of information,

REG for perform a register read or write on the application side of the DUT,

TE_initialize for performing initialization and setup for the TE itself, and

Link_Core_Reset for resetting the link core.

There are also some "smaller" background tasks for creating the information which composes the input to the above instructions. These include generate_data, generate_crc, get_response_opcode, etc.

An example test is as follows:

REG(Write, to address 1, of data 04(h), at time N)

MAP(At time M, with the packet P)

End_test.

The following example describes a MAP read instruction with the following characteristics. The read is from a device with a source ID of D0. The length of the read is D1 bytes. The read is from address D2 and from designation D3. The read starts at an absolute time of D4. The request ACK pending relative latency is D5. The response starting relative latency is D6. The response ACK complete relative latency is D7. The data that was read is D8, and the data that was expected is D9. The request was correct without failures.

Source ID: D0

Length: D1

Address: D2

Designation: D3

Start Request time: D4

Request ACK pending time: D5

Response Time: D6

Response ACK complete time: D7

DATA: D8

Expected DATA: D9

Failure Fields: NONE (no failures initially caused by the TE)

At the initialization of the simulation, the top level of the test environment reads the test and, through task and function calls, loads a table called the ACTION_LIST. This is the internal description of the test in a test environment readable form, which all the rules sections understand. The ACTION_LIST is just a large array or memory (loaded sequentially).

C. Description of Modules and Atomic Operations

The preferred embodiment TE uses a concept called "Atomic Operations." An Atomic Operation, which has also been explained above, can be thought of as the lowest portion of an operation (in this case a bus operation). A useful analogy is to think of Atomic Operations as the ingredients of a recipe. An Atomic Operation, in the context of the TE, applies to the smallest unique transfer on any particular bus.

In a transaction involving moving information on the Link-Phy bus, in an asynchronous ("async") packet, there are four portions of the transaction: (i) the request, (ii) the request acknowledgement ("ACK"), (iii) the response, and (iv) the response ACK. In addition to these actions, correct protocol operation also requires the bus requests and the bus grants. The following sequence of actions is broken down into AOs performed at either the sending node (the Initiator node) or the receiving node (the Destination node). The actions at any particular node are performed in the order stated, but are not necessarily performed sequentially. For example, there are indeterminate time delays between some of the actions. Additionally, the actions performed at each node may, in some cases, be performed simultaneously.

1. At the Initiator Node
   (i) the Initiator node requests for fair arbitration of the bus, (ii) the bus is granted to the Initiator node, and (iii) the Initiator node starts sending a request packet.
2. At the Destination Node
   (i) the Destination node sees the bus go from idle to receive, (ii) the request packet is received, (iii) the Destination node determines that the packet belongs to it (it sees an ID hit), (iv) it requests an immediate bus arbitration, (v) the bus is granted after the request packet is complete (that is, when the bus is free), and (vi) the Destination node sends the request ACK.
3. At the Initiator Node
   (i) finishes sending the request packet, (ii) puts the bus to idle, (iii) sees the bus go to receive, and (iv) collects (receives) the request ACK.
4. At the Destination Node
   (i) after a period of time, it arbitrates for the bus, (ii) when granted, it sends a response packet, and (iii) puts the bus to idle after finishing sending the response packet.
5. At the Initiator Node
   (i) sees the bus go from idle to receive, (ii) receives the response packet, (iii) determines that the response packet ID corresponds to the request packet that it had sent out, (iv) requests immediate bus arbitration, (v) finishes receiving the response packet, (vi) the bus is granted at some point after the response packet is competed and the bus goes to idle, and (vii) when granted, the Initiator node sends a response ACK.
6. At the Destination Node
   (i) sees the bus go from idle to receive, and (ii) receives the response ACK packet.

Provided that certain conditions are met, such as no errors and no negative acknowledgements, the transaction will be complete.

Each one of these would be considered a separate Atomic Operation. Looking only at the Link-Phy Bus request, there are several types of Lreq requests which can be made. The Lreq pin, or signal, is part of the 1394 protocol relating to bus arbitration, and the protocol defines several types of arbitration requests. Each of these requests is a separate Atomic Operation. It is the most basic type of transfer which may happen at any one time without interruption of transfer.

The architecture of the test environment follows the paradigm of "if this core was in silicon, and was brought into a lab, what are the things that would be needed in order to fully test the part?" Using this idea of a lab tester, it can be seen that there are several things that would be needed. First, some way of simulating the part would be needed. Next, some way of observing the stimulus and the results of the stimulus would be needed. Third, in this case, an automated manner of monitoring the results versus the stimulus and determining if the part passed would be needed. In the 1394 Test Environment (the preferred embodiment) a similar type of system in simulation has been created. First, the actual link core description is in the simulation language (in this case Verilog). Additionally, as will be explained, there is an automated method of observing or monitoring the stimulus and the results of the stimulus, and of determining the outcome of the test. The following paragraphs describe the modules of the TE which provide these features.

As discussed earlier, there are two busses for this core: the Link-Application Bus and the Link-Phy Bus. The abbreviations of AL and LP are used when talking about the busses. AL being the Application-Link Bus (or Link-Application Bus), and LP being the Link-Phy Bus. In talking about either bus, there are two sides of each bus, the core side (link side) or the "other" side. Consequently, when specifying the AL bus there is an AAL (application side of the AL bus) and an LAL (the link side of the AL bus), and when specifying the LP bus, there is a PLP (phy side of the LP Bus), and an LLP (the link side of the LP Bus).

Figure 5:
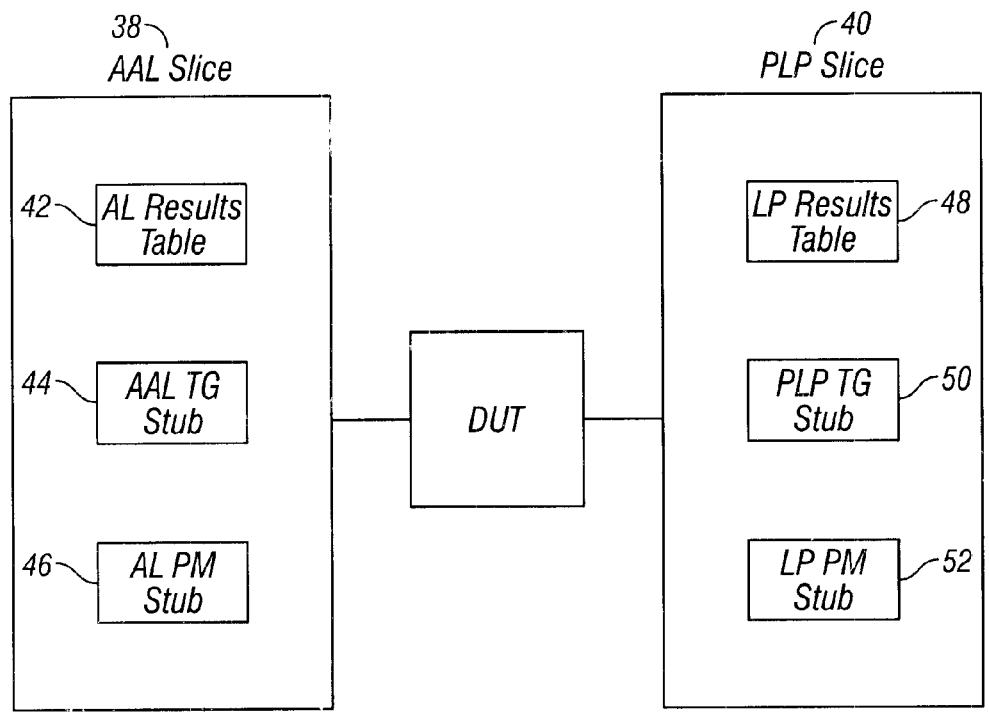
FIG. 5 is a block diagram showing the primary elements of a AAL Slice and a PLP Slice.

Referring to FIG. 5, in testing the Link core design, there are defined two "slices": the AAL slice 38 and the PLP slice 40. These two slices represent the actions (Atomic Operations) for that particular side of the bus. The AAL slice 38 is composed of three main sections, which will be described in detail below. These sections are the AL Results Table 42, the AAL Stub (or AAL TG Stub) 44, and the AL Stub (or AL PM Stub) 46. The PLP slice is also composed of three main sections, which are the LP Results Table 48, the PLP Stub (or PLP TG Stub) 50, and the LP Stub (or LP PM Stub) 52. As will be developed below, a stub contains a set of either TGs or PMs and the associated rules section. A pair of stubs (e.g. PLP TG stub and LP PM stub) along with the associated Results Table forms the slice.

Each slice holds two lower level routines which contain Traffic Generators and Protocol Monitors. The TG Stub 44, 50 holds low level routines for the Traffic Generators and the Traffic Generator rules units (not shown). The Traffic Generators are responsible for asserting signals on the AL bus (or LP bus, respectively) in order to operate as the Atomic Operations require. The TGs assert the basic bus signals in order to perform the Atomic Operations. The Traffic Generator rules section is the portion which tells the TGs how and when to act.

The PM Stub 46, 52 holds the low level routines for the Protocol Monitors and the Protocol Monitor rules units (not shown). The Protocol Monitors are responsible for monitoring the bus and determining which (if any) Atomic Operations have happened. This function is referred to as resolving (or reconciling or parsing) the bus activity into Atomic Operations. The Protocol Monitor rules section is the portion which receives the information from the PMs to determine what happened and if it was a "correct" time for the event to occur.

The remaining section in each slice is the Results Table 42, 48. The TG stubs 44, 50 and the PM stubs 46, 52 cannot directly communicate between themselves. Therefore, a message passing protocol is used. The PMs will record all happenings in the Results Table and then both Stub (the TG Stub and the PM Stub) rules sections are free to examine the contents to determine, if the correct thing happened and what the next course of action should be. The Results Tables are nothing more than memory modules, with each data bit representing a different phase of operation.

Note that an appendix to this application discusses the PLP Slice in greater detail.

D. Flow of Instructions through the Modules

This section describes in detail the flow of data, and the interaction of the various modules, as an instruction is executed. The first part of this section contains a generic description of the flow involved in the execution of an instruction. After the generic description, there is a discussion of two specific examples.

i. Generic Description of Instruction Execution

Figure 7:
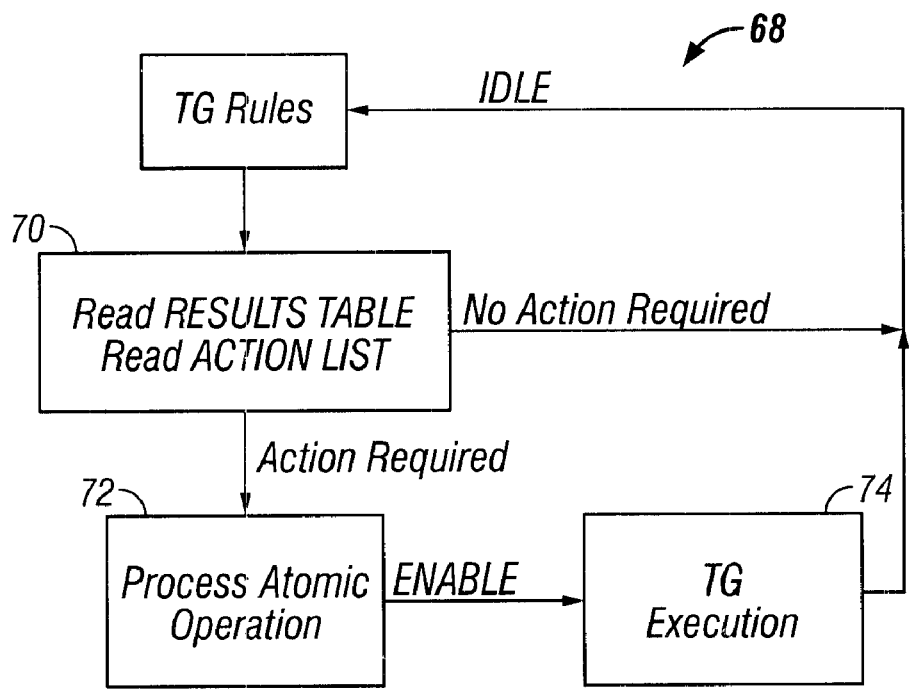
FIG. 7 is a flow diagram describing the TG Rules processing.
Figure 8:
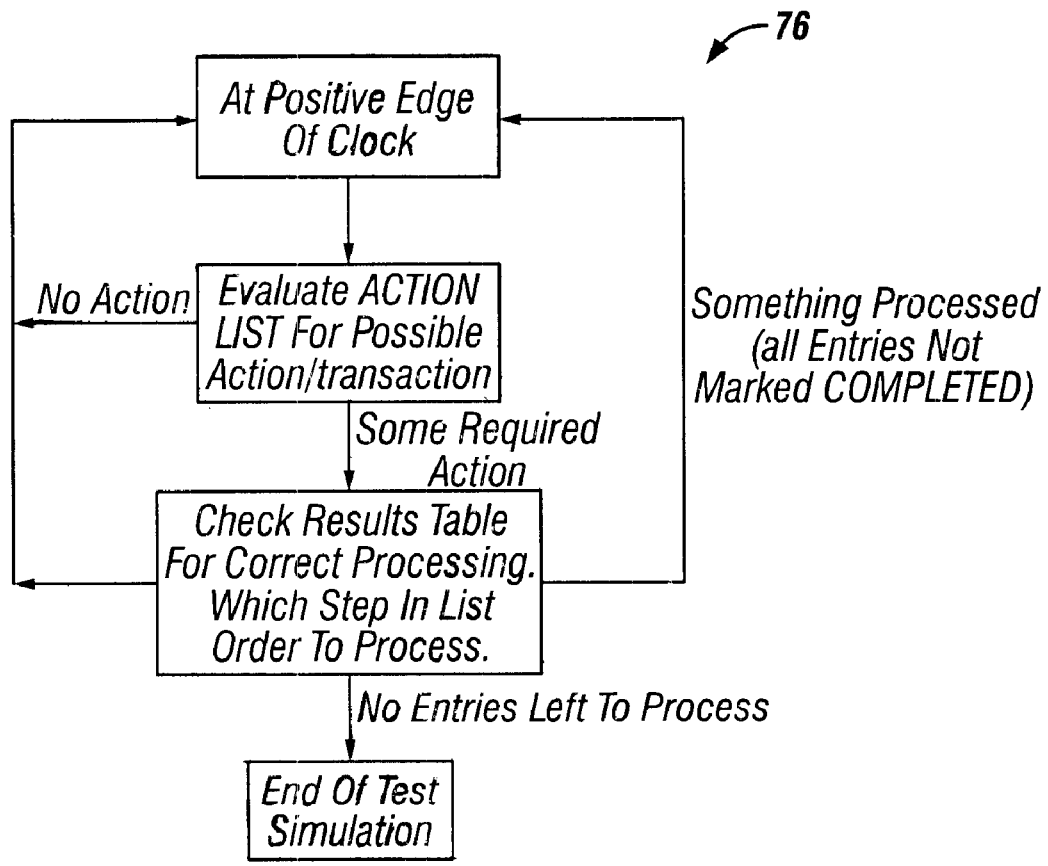
FIG. 8 is a flow diagram further describing the TG Rules processing.

The TG Rules section is responsible for observing that the execution of some type of command/Atomic Operation should take place. The TG Rules will then interpret the ACTION_LIST and the RESULTS_TABLE to make sure that execution may take place in accordance with the desires of the test, and proposed operation of the protocol (whether the specification has been violated or not). Referring to the flow 68 in FIG. 7, this task is shown in block 70. It is also depicted in more detail by the flow 76 in FIG. 8.

Once the TG Rules determines that something may be executed, it will collect all the information required:;to process the transaction and "ENABLES" the Traffic Generator which handles that ATOMIC OPERATION and passes the information required to the traffic Generator (TG). This task is depicted by block 72 in FIG. 7.

At this point the Traffic Generator for that Atomic Operation takes over processing the command. The TG once receiving the ENABLE, will take the data needed and asserted in the correct protocol and order the Atomic Operation requested by its rules section. This is the physical protocol on the bus. This task is depicted by block 74 in FIG. 7.

Upon asserting signals on the bus, the device under test and the Protocol Monitor will receive the signals and "process" the incoming information. In the case of the core, registers or some such will be loaded and when the correct process has been done, it will perform its desired operation on that information. At the same time, the PMs associated with the correct Atomic Operation will also collect the information the TG has asserted on the bus. Once a protocol has been observed and satisfied for some Atomic Operation, the PM associated with that Atomic Operation will "ENABLE" its PM Rules section.

Figure 9:
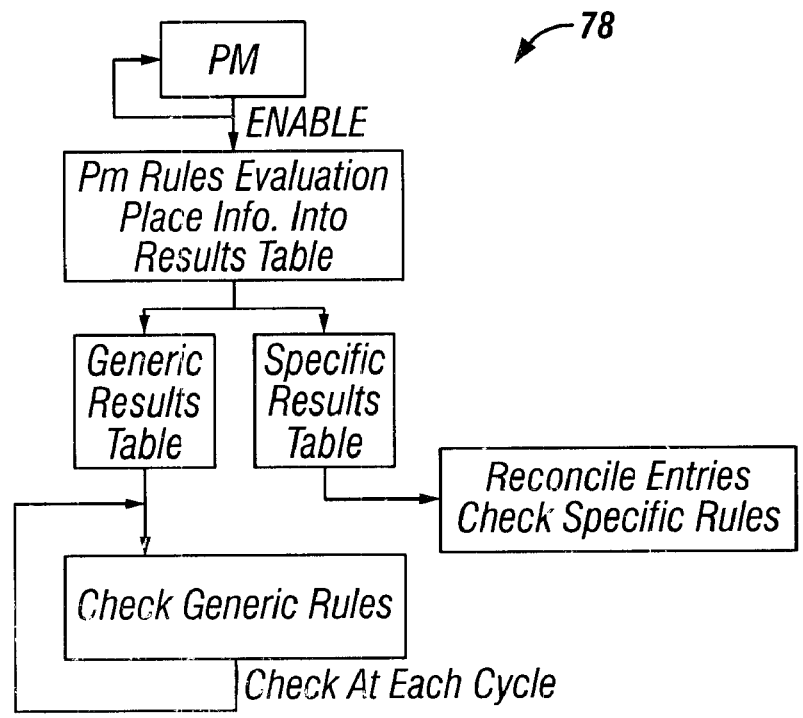
FIG. 9 is a flow diagram describing the PM Rules processing.
Figure 10:
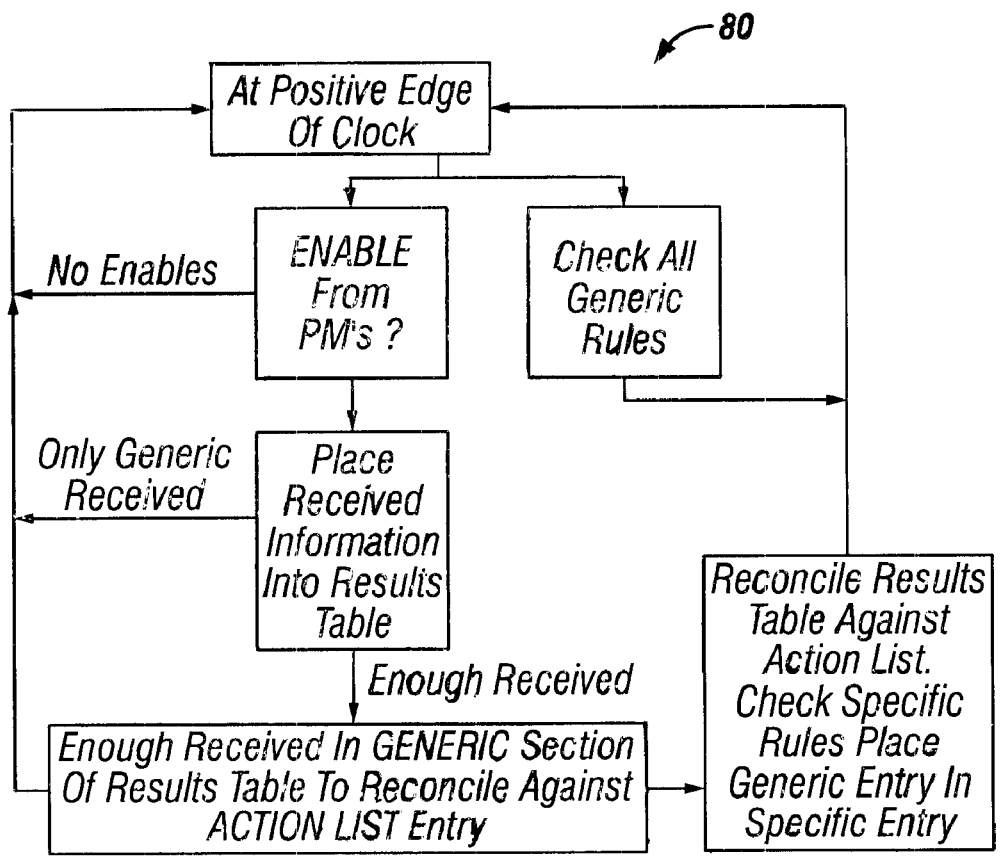
FIG. 10 is a flow diagram further describing the PM Rules processing.

The flows 78, 80 in FIGS. 9 and 10, respectively depict the processing that occurs by the PM Rules section. At this point in the processing the PM rules will perform three things, one, it will place the received data into its RESULTS TABLE, second will try to resolve the received information to an entry in the ACTION LIST. At some point prior to having enough unique information, the data will be placed into a "generic" entry of the RESULTS TABLE. When enough information has been collected in the generic entry of the Results Table, the PM rules section will try to resolve the received entry in the incoming data and the generic entry of the Results Table with an entry in the Action List. If no entry is found which matches the desired operation of all entries in the Action List, an error is determined and error descriptions are generated to the user.

If the PM Rules can find the entry in the Action List for the generic information (along with the new incoming data) it places all the combined information into the corresponding entry in the Results Table, along with flagging the correct corresponding phase of operations for that entry (keeps track of the progress in the processing of that particular instruction). At this point the PM Rules can take care of the remaining operation which is to check to make sure that the PM Rules received the correct information (data and process of data, along with all possible desired failure modes of operation).

All rules sections operate separately on the ACTION LIST information. The PM Rules section is responsible for writing the information into the RESULTS TABLE. Both the TG and PM Rules sections read the ACTION LIST and the RESULTS TABLE. The rules sections hold no cycle to cycle state information, all storage is in the RESULTS TABLE.

Once the PM Rules section has finished processing the required information, it has nothing left to do. At this point the system is back to a "steady state" and will wait until the TG Rules section has a "rule" to process or there is some activity on the bus and the PMs "ENABLE" the PM Rules section.

Because this device (the current 1394 Link Layer Core) has connections to two busses, a similar structure is created on the "other" bus. These two busses are connected by the DUT and operate on the information seen by the TGs and PMs. All of the Rules sections operate without knowledge of the other sections of the design other than their TG's or PM's. All the rules sections see their RESULTS TABLE, and it's the responsibility of the local PM Rules section to write entries into that table.

ii. First Example of the Execution of an Instruction

This is an example of a "correct" operation, that is, one with no desired errors. The instruction is as follows. Source Id Node0 reads a length of Length1 bytes from address Address0 from destination Node1 at a starting time Time1. There is a request ACK pending latency of Time2, a response starting latency of time Time3, and a response ACK complete latency of Time4. Read data of D1 is asserted without any desired failures.

In this example, and other examples throughout this application, the convention "time x+," "time x++," "time x−," etc. is used. In "time x+," the "+" is used to designate some arbitrary time after "time x," but before the next time in the sequence. Similarly, in the notation "time x−," the "−" is used to designate some arbitrary time before "time x," but after the preceding time in the sequence. For example, consider the sequence of times "time 1," "time 2−," "time 2," "time 2+,"time 2++," and "time 3." "Time 2−" refers to some arbitrary time after time 1, but before time 2. "Time 2+" is some arbitrary time after "time 2" and before "time 2++," and "time 2++" is some arbitrary time after "time 2+" and before "time 3."

At Time Time1

The Node0 TG Rules section would see that the event required for execution of this instruction has been met, and would start processing the instruction. Because the TG Rules sees that no failure is desired, the TG Rules must first check the current status of events (in the RESULTS TABLE) so that it does not inadvertently violate the correct protocol. Seeing that the current status will allow it to proceed, it will collect what is needed to process the first part of the instruction (a generation of a request packet). For a specific device, having an AO defined, and based on what processing (list of things to do) needs to take place, the TG Rules section will process the register writes. Upon seeing that no other processing has taken place on this instruction it would start with the first register write. The TG Rules section would then process the first required register write. The TG RULES section then gathers all the required information and sets the REGISTER WRITE TG's "ENABLE" and passes control to that TG. The TG for this Atomic Operation then takes over processing of the command. It takes the logical idea of a register write to some address with some data and converts it to the actual assertion of signals necessary. At this point, the TG will assert the signals necessary. These assertions will be seen by both the core device and the PM associated with Register Write Atomic Operations.

After the correct protocol is followed, the PM will pass control (via the ENABLE) to the PM Rules. The PM rules will see that a register write has been seen at the PM and places that information into the generic entry of the Results Table. It then sees that not enough information has taken place to determine what the command being seen is, and therefore, places that information into the generic table of the Results Table and checks to make sure that no current protocol has been violated.

At this point the TG Rules section sees that the PM rules have written some information into the generic entry and checks to see what was written. It then combines that generic information along with the information from the Action List (telling it that the current instruction is still being processed, and that no other operations are taking place). Seeing that the first register write was completed, it sends the next "ENABLE" command to the next Atomic Operation TG.

The above continues until all necessary processing from the TG Rules section has completed. At this point (or possibly previously) the PM Rules can reconcile the current observed transaction with a command in the ACTION LIST. Once the PM Rules can reconcile, it removes the information form the generic portion of the Results Table and places the information collected thus far into the entry for the correct command (in the preferred embodiment, there is a one to one correspondence with the entries in all the tables, so that if one looks at instruction 12 in the ACTION LIST, and entry 12 in the RESULTS TABLE, one will see that they refer to the same instruction.).

During this process (multiple cycles will have taken place), the PM Rules section will be checking the protocol and once it can reconcile the tables with the instructions, it will check to make sure that data and control information seen is that which is expected.

At Time Time1+

The destination will see the request packet generated by the Link core. The destination Node1 PMs will observe the request that has been made. The PM will then ENABLE its PM rules section. Once the destination's PM rules section has collected enough information to make a determination of which command in the ACTION LIST it should be processing, it will try to reconcile the command with the data/information in the generic entry of "ITS" Results Table. If at the time a reconciliation should be possible, and the PM Rules section cannot find the correct instruction, an error will be assumed and processing will end at that point. At some point the DUT will have processed all of the information necessary for the read request and the PM on the destination will have recorded in its Results Table that the request for instruction number one (in this case) has been met and is correct.

At Time Time 2

The destination's TG rules section will see that processing of instruction 1's request completed correctly and is now at a stage where it's waiting for the TG Rules to process the next part of the protocol. Then when Time 2 expires, the TG Rules section will collect all of the information necessary to execute the Request acknowledge and pass that information along with the "ENABLE" to the TG responsible for the request acknowledge. The request acknowledge TG will see the enable and will sequence the correct protocol for the ACK to be returned to the source node.

At Time Time2+

The source PMs will see that the DUT has sent some type of response. The PM will pass this response to the PM rules section. The PM rules will again log this information into the generic entry of the Results Table and look to see what type of information it received. Because it was an acknowledge, it will look in the Results Table to see if there was one and only one outstanding acknowledge pending. It will find that instruction 1 was waiting for a request ACK to come back from the DUT. At this point the PM rules section will update the entry in the Results Table to reflect the current information received. It will also check to make sure that the correctly expected acknowledge was received.

At Time Time3

The destination's TG rules section will see that the event necessary to process the response to command 1 has expired, and will start to process the next step (understanding the current state by looking in the Results Table). The TG rules will break down the Atomic Operations and pass the ENABLES sequentially to the TGs. The TGs in turn will process the Atomic Operations and assert the correct signals in the correct order on the bus. The DUT and the PMs will at the same time see these assertions. The PMs will "ENABLE" the PM rules on the destination side and place that information into the Results Table for the destination. Upon seeing that the desired protocol is being followed the TG Rules will sequence through the Atomic Operations. At some point the TGs for the destination will have completed the response, and the destination's PM rules will have recorded the completion of the desired information transfer.

At time Time3+

The DUT will have received the competed response to its request. It will then take some action on the application side of the device which will be observed by the source PMs. These source PMs will then enable the PM Rules section and pass the information to the rules. Once all is collected, the rules section will update the Results Table. At this point the TG rules section will take all further appropriate action until the command is completed (e.g. send the response ACK). Once completed, the PM rules sections (both of them) will mark the phase of the entry of instruction 1 as completed.

This means that no further processing is desired or possible.

iii. Second Example of the Execution of an Instruction

Figure 6:
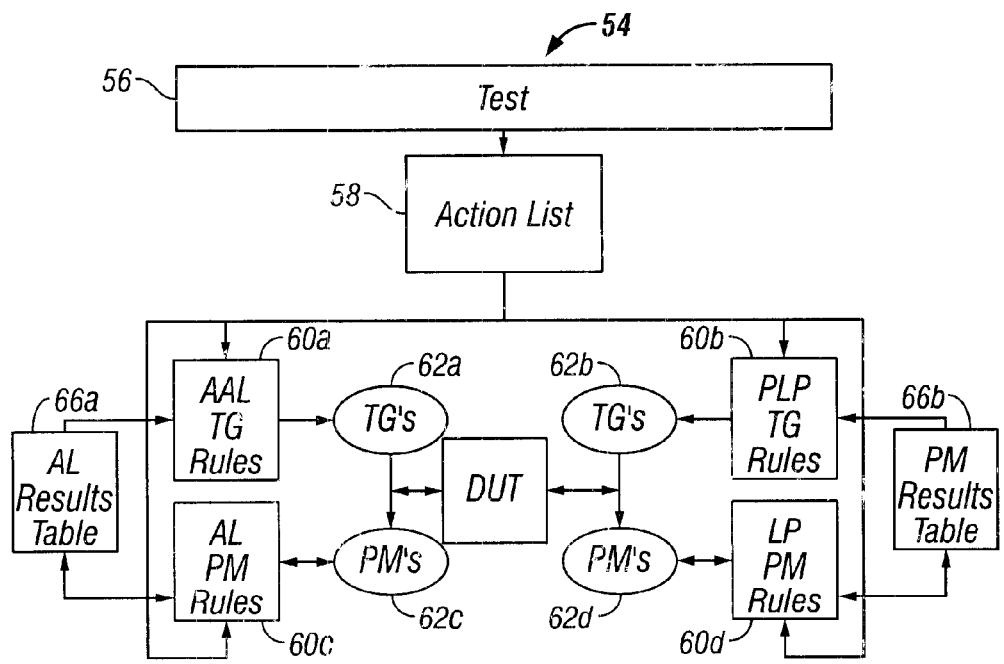
FIG. 6 is a block diagram showing most of the major modules of the preferred embodiment for both sides of the DUT.

Referring to FIG. 6, there is shown a more complete system 54 than that of FIG. 5. Operation of the system 54 can be explained by following the instructions through the system 54. First, there is the architectural test 56. There are three basic commands MAP, MIP, and REG. The MAP instruction stands for move asynchronous packet. The MIP instruction stands for move isochronous packet. The REG command stands for register, and is for the special case of writing or reading registers internal to the DUT from the application interface. Because this is a "transaction based" design, all commands involve complete transactions. The MAP command will start at some planned event, request the bus, win the bus, transfer out the request, wait for the ACK (the proper ACK), wait for the response, and send out a proper response ACK.

All three of these commands are really task calls. They load the Action List 58 with the command information. This load happens directly after initialization time. The Action List 58 is, again, nothing more than a memory. Within this memory, different bits or series of bits represent different fields. The rules sections use these fields to interpret different commands and data for those commands.

After initialization, when the Action List 58 is loaded with the complete test, the rules sections (all four) 60a–60d will start to interpret the Action List 58. Each slice has been given a "test Node Number." This number is assigned in the Verilog source code as a parameter. The test command TE_Initialize is used to assign a logical test node number to a physical node address (as specified from an id_tree_init from the 1394 bus). Once each slice knows its physical ID, it looks through the Action List 58 looking to match the IDs with the next possible thing to do. When the correct "things" happen, and the rules for a slice identify that it is the slice which is to process the command, it starts down a "cookbook" list of what to do and in what order.

After determining what should happen first, the TG rules section 60a, 60b will issue the correct data and issue the reserve term "Enable" to the particular Traffic Generator (in either 62a or 62b). At this point two things happen, one, the link core (or DUT 64) will see the "event" happening on the bus, and two, the PM section (either 62c or 62d) will also see some event happening on the bus. The correct Protocol Monitor (in either 62c or 62d) will then determine if its protocol has been followed and if so, it will send an "Enable" to the PM rules section (either 60c or, 60d). The PM rules section, 60c or 60d, will then do several things.

First, it will "log" the event and the time the event took place, by passing the required information to the Results Table, 66a or 66b. Second, the PM rules, 62c or 62d, will make a determination of whether or not it has enough data to find the transfer in the Action List 58. If not, it will place all data received into a "generic" or temporary section of the Results Table, 66a or 66b, and go on monitoring the bus. If enough data is available, the PM rules, 60c or 60d, will try to match the entry with one of the unfinished entries in the Results Table, 66a or 66b. At this point two things are possible, either a match will be made or a match will not be made.

In the case of a match of the entries, the information received (the data) and the information in the Results Table, 66a or 66b, are compared. If a mismatch of the data is found, then an error is flagged and the simulation is stopped. If no data mismatches are found, then the Results Table, 66a or 66b, is updated with the current status of this particular transfer and the simulation continues.

In the case where the entries do not match, the system continues processing until it is certain that an error has occurred. As the system accumulates more data, the entries may match up. However, if an error has occurred, the system will eventually realize that a match is impossible.

This continues until all of the entries in the Results Table have been either stamped complete or one entry is found to be in error. At that time, the slice will signal the top level of the system by asserting its "complete signal." When all sections have completed the above sequence, then the top level will end the simulation.

As one can see, the flow of information is from the Action List 58 (which all rules sections 60a–d have access to and understand) through the rules sections of the TGs 60a–b. From the TG rules 66a–b, the flow continues to the Traffic Generators 62a–b. From the TGs 62a, 62b it goes to the design 64 and also into the PMs (62c and 62d, respectively) for that slice. The PMs' 62c, 62d task is to record and format what transactions and transitions it sees and to pass that information along to the PMs rules section (60c and 60d, respectively). There, the PM rules section 60c–d has two jobs. The first is to make sure that proper protocol is being followed, and the second is to equate what legal/illegal things it sees, based on protocol and the desire(s) of the tests, with an entry in the Results Table 66a–b and the Action List 58.

Therefore, the TG rules section 60a–b has only one function, and that is to assert commands on the bus (in a cookbook way of breaking down a high level command into its sub-components). The PM rules 60c–d, however, has two tasks. The first is to make sure that protocol is followed and the second is to make sure that what is observed was something which should have been observed.

E. Sequencing of Instructions

In order to provide some structure to the instructions, there must be some idea of "when" things happen. Because this is a "split transaction" bus, many things may happen in very different orders. Within the transaction there are four basic parts: the request, the request ACK, the response, and the response ACK. For each of these four parts there are four items associated with sequencing the test. For each of the above sub-actions, there are the following four parameters specified from the MAP, MIP, or REG instruction:

Start time abs_rel

Index

Phase

There are two, methods for sequencing an instruction: the first is the idea of absolute time and the second is that of relative time. For the first instruction of each test, and perhaps other instructions within a test, the user wants the instruction to execute at an absolute time (time being that of the simulation time). In order to do this, one would put the time of instruction execution into the start time parameter and set the abs_rel parameter to "ABSOLUTE." This will allow the system to try and execute that instruction when that tine expires.

For example, if the first register instruction is set to write register 50 in the link core at time 100 ns, the start time parameter would be set to 100 ns and the abs_rel parameter would be set to ABSOLUTE. In the absolute mode the other parameters are unused. The system will try to execute at the absolute time, but it is assumed that the user takes responsibility for correcting for ongoing previous tasks and that a task "collision" (if not desirable) does not take place. The absolute mode allows the user complete control of the sequencing the instructions.

The second mode is that of relative timing, which is more complicated than that of absolute timing. Note that the instructions (MAP, MIP, or REG) are stored in a memory or table which is addressed by an index number. Instructions are stored sequentially, from the order in which they appear in the test file.

In relative timing the system is allowed to decide when an instruction should be run. As an example, assume that it is desired to begin execution of an instruction (labeled inst B) after some other instruction (labeled inst A) has begun. Further, assume that after some portion/sub-action of instruction A it is desired to start execution of some portion/sub-action of instruction B. In this case it must be specified that it is desired to sequence instruction B after instruction A, and within that instruction which sub-action it is desired to sequence from. An example will be helpful here.

Assume a MAP instruction 3, and that it is desired to start execution of the request packet 100 ns after MAP instruction 2 has completed its request ACK phase. Then the four parameters associated with sequencing an instruction would be set as follows. First, set the start time for the request portion to 100 ns. Second, set the abs__rel parameter to RELATIVE. Third, set the index to one, so that it points "one back in the table" to MAP instruction 2. Fourth, set the phase for MAP instruction 3 to "RESPONSE__ACK," so that execution will start after MAP 2's response ACK. It's assumed that all phase parameters are "after" the system has seen that phase.

the core and the test environment. This also contains the definition of all of the "tasks" which compose the user instructions MAP, MIP, and REG. The Action List is also defined at this level. The Action List is defined as a large memory where each "file" of the list has a defined sub index of the data width.

The next level down is that for each slice of the system. Within each slice there are the stubs for the TGs and the PMs and (at that level) the definition for the Results Table for that slice. Within the stub there are the rules section and the TGs or PMs, which are the final level of the code.

G. Further Description of Phase Parameters and the Results Table

The following relates to a specific example of a portion of the Link-Phy Bus PM Results Table. It is a description of the possible LP Results Table entries for each of the sub-actions indicated at the beginning of the line. The Results Table entries are the possible phases for each of the sub-actions.

The TG, PM, and Results Table can be modeled or visualized as a state machine. In such a model, the current state is loaded into the Results Table, the next state is put on the bus, and then that state (now current) is itself subsequently loaded into the Results Table. The Results Table, then, tracks the state of the transaction. The transactions, and their states, are listed below. The state s are, in the preferred embodiment, tracked by providing a bit location for each of the possible phases.

| General: | Complete | Failure | Initialize | | | | |
|---|---|---|---|---|---|---|---|
| Lreq for request: | Start | Lost | Retry | Won | | | |
| Request: | Start | Req. rcvd. | Retry | Finished | | | |
| Lreq for ACK of request: | Start | End | | | | | |
| ACK code for request: | Complete | Pending | Reserved | BusyA | BusyB | Data | Type |
| Lreq for response: | Start | Lost | Retry | Won | | | |
| Response: | Start | Received | Retry | Finished | | | |
| Lreq for response ACK: | Start | End | | | | | |
| ACK code for response: | Complete | Pending | Reserved | BusyA | BusyB | Data | Type |

Therefore, instructions can be built up using both the absolute and the relative timing. For each of the sub-actions of a request, there are these four fields, and they operate the same for each sub-action.

This also allows a "multi-threaded" test. As long as each thread originates to one "synchronizing" instruction one is allowed to branch off with any instruction or multiple instructions. As an example of this, assume that on one side of the core design it is desired to process even instructions (2, 4, 6, and 8), and on the other side of the core it is desired to process (without regard to the even instructions) all of the odd instructions (3, 5, 7, and 9). First, instruction 1 would be designated as an absolute instruction. Second, both instruction 2 and 3 would be made to point "relative" to instruction 1. Third, instruction 4 would be made to point to 2, instruction 6 would point to 4, and instruction 8 would point to 6 on the even side. Fourth, on the odd side instruction 5 would point to 3, 7 would point to 5, and 9 would point to 7.

This allows the emulation of what might happen in a real system, by allowing separate "programs" of series of instructions emulating the transactions at one node of the bus structure without knowledge and without sequence concerns to "other threads" of the system. This allows the test writer more flexibility in building a test.

F. Internals of the System

There are three basic levels (and many files) of code: the first is the top level. This would include the instantiation of The following text provides additional explanatory material for the entries of the first five transactions above. The remaining four transactions are similar to the immediately preceding four transactions in the table, and can then be easily understood by one of ordinary skill in the art.

The first line is the "general status" of the entry. It indicates whether the entry is complete, if it has failed, and if it is initialized.

The next line is the Arbitration Request. It indicates if request arbitration has started, if the request arbitrations was lost, if the request arbitration was granted/won, and if the request arbitration has been retried.

The next line is for the actual request. It indicates if it has started (indicates that request has started and that beginning time is valid). Request received is included for indications that a request was received. Retry indicates that a retry has take place due to a bad ACK code. Finished means that a complete request has been received.

In the next line, the Start and End refer only to the request Lreq Immediate request, and indicate whether or not it has been sent.

The next set of phases are connected with the Acknowledgment logging the type of ACK received. If the ACK code is complete, the complete flag is set. If it is pending, then the pending flag is set, or if it is another type then that other type is entered.

When the sub-action is complete, the complete flag of the general status will be set. This will be used by both rules sections to ignore any further processing on this entry.

In the preferred embodiment, each entry in the Results Table will correspond to the same index number as the corresponding index number of the Action Table. Therefore, to find the progression of the Action Table commands as they flow through the system, only the unique index is needed.

The Results Table includes the following entries listed below. These entries, and the time parameters in particular, allow the collection of begin and end times for each sub-action, which can then be post-processed to produce a variety of statistics. The statistics and the operational characteristics can be used as an architectural tool for tuning and redesign of existing systems, as well as for the design of new systems.

Nexus Information (in the Preferred Embodiment, These Are Unique for Each Transaction)
    Dest_id
    TI
    TR
    Tcode
    PRI
    Source_Id
    Header_CRC Time Parameters
    Request LReq Begin Time
        Time field, beginning of LReq send from the link to the Phy.
    Request LReq End time
        Time Field, End of LReq sent from the link to the Phy.
    Request Begin Time
        Time Field, Beginning of Request Packet from link to the Phy.
    Request End Time
        Time Field, End of Request Packet from link to Phy.
    ACK LReq for Request Begin Time
        Time field, beginning of LReq send from the link to the Phy.
    ACK LReq for Request End Time
        Time Field, End of LReq sent from the link to the Phy.
    ACK for Request Begin Time
        Time field, beginning of Request Packet from the link to the Phy.
    ACK for Request End Time
        Time Field, End of Request Packet from link to Phy.
    Response LReq Begin Time
        Time field, beginning of LReq send from the link to the Phy.
    Response LReq End Time
        Time Field, End of LReq sent from the link to the Phy.
    Response Begin Time
        Time Field, Beginning of Response Packet from link to the Phy.
    Response End Time
        Time Field, End of Response Packet from link to Phy.
    ACK LReq for Response Begin Time
        Time field, beginning of LReq send from the link to the Phy.
    ACK LReq for Response End Time
        Time Field, End of LReq sent from the link to the Phy.
    ACK for Response Begin Time
        Time Field, Beginning of Response Packet from link to the Phy.
    ACK for Response End Time
        Time Field, End of Request Packet from link to Phy.

Phase Entry
The Phase Entry will have one of the following names, which specifies the status of the bus:
    Start_Arbitration
    Lost_Arbitration
    Retry_Arbitration
    won_Arbitration;
    Start_Request
    Request_Received
    Re-Request
    Request_Ack_Sent (complete, pending, reserved, busyA, busyB, data_error, type_error)
    Request_Ack_Received (complete, pending, reserved, busyA, busyB, data_error, type_error)
    Start_Response
    Response_Received
    Re_Response
    Response_Ack_Sent (complete, pending, reserved, busyA, busyB, data_error, type_error)
    Response_Ack_Received (complete, pending, reserved, busyA, busyB, data_error, type_error)
    Failure
    Failure Begin Time: Time Field, Beginning of failure time.
    Failure End Time: Time Field, end of failure time.
    Failure of data Type: What data field failed expected vs. Received.
    Failure Data Received Value: Received data field.
    Failure Data Expected Value: Expected data field.

The Results Table also has a "look up" function. This function takes the current time and the parameters passed from the PM rules section and relates this information back to the Action List trying to find a match, as described earlier. The Look up function then has to create the correct INDEX into the results array, and to place the correct or updated information into the Results Table at the correct INDEX. The Index of the Action List item and the corresponding entry (same INDEX) in the Results Table will be for the same transaction.

A typical example of this process is described below.

Action List
Source N0 reads a length of L1 bytes from address A0 from destination N1 at a starting time absolute T1. There is a request ACK pending relative latency of T2, a response starting relative latency of time T3, and a response ACK complete relative latency of T4. Read data of D1 is asserted and D2 is expected, request_correct, request_ack_correct, response_correct, response_ack_correct, data_correct.

At Time T1
The source NO TG rules module would send a LReq for fair request at absolute time T1. If the rules section allows for the "sending" of the LReq fair request packet, the TGs which are associated with the Fair request LReq packet will be "enabled." At that point the source N0 PM modules will see the LReq pin go active and start to record the action (the request) and the time it started/finished. The PM module will then pass this information to the PM rules module. These items will be entered into the Results Table at the same index as the index of this action in the Action Table. When granted, the source N0 will assert its read request for data block packet and the Source N0 PMs will record the assertion of source N0's Request for read block.

At Time T1+

The destination will see the request for data block packet. The destination N1 PMs will see that the bus has gone active and all PMs will start to monitor the bus activity. Only the request receive packet PM section will recognize that the packet asserted on the Link-Phy Bus was a read request. That PM will send all the "required information" to the PM rules section. The PM N1 rules section will see that the Index 1 request came into the N1 node, and store all pertinent information in the Results Table for N1.

At Time T2

The destination N2 will, at time T2, assert its ImmReq LReq TG from the rules section so that the destination N2 can assert its ACK packet on the 1394 bus.

At Time T2+

The destination N1, after gaining the bus during the ACK gap, will assert its ACK Pending packet from the TG rules section.

At Time T2++

The Source N0 will see the ACK Pending packet placed on the bus and the PMs monitoring the Link-Phy Bus for activity will see that an ACK packet came in and pass that information to the N0 PM rules section. The rules section will check the Action List and place the information in the N0 Results Table.

At Time T3

At time T3 the Destination N1 will assert its LReq request for a fair request (or, in the case of 1394a, a priority request). The N1 PMs will see the LReq asserted for a "X" request and place that information in the N1 Results Table.

At Time T3+

Next, the N1 destination will win arbitration and place the Read Response for data block packet with data D1 on the Link-Phy Bus. This is again accomplished by the N1 PMs sensing that the N1 link has won arbitration and passing that information up to the PM rules section which will place that information into the Results Table, thus, causing the TG rules module to "enable" the Send read response with data D1 packet.

At Time T3++

The source N0 PMs see the response packet, decode the Tcode and nexus information, and pass along the data D1 plus all times associated with receiving the packet. The PM rules then checks the received data against the Action List D2 expected data and verifies that it's the same. If it is correct, then it enters that information into the N0 Results Table.

At Time T4−

The N0 TG rules see that the response packet arrived and check to see that N0 is the destination for that transfer. Then it asserts its TGs which control LReq sending an ImmReq.

At Time T4

After being granted the bus (during the ACK gap) the N0 device will send the ACK a packet Ack_Complete. This ends the transfer. The N0 PMs see this ACK complete signal and place that information (passed throughout the PM rules) into the Results Table and assign a "complete" to the transfer.

At Time T4+

The destination N1 sees the ACK complete packet and records this information in the Results Table via the PMs and the PM rules sections.

H. Description of How to Generate Rules

There are two basic types of rules: those for the Protocol Monitors and those for the Traffic Generators. They hold similar properties, but have different goals. The goal of the Traffic Generator rules is to generate the information and assertions on the system busses. The goals of the Protocol Monitor rules are to: (i) show that the information received on the system bus did not violate the system bus protocol, (ii) show that the data and information received was the data and information which was expected, and (iii) place the received information into the Results Table in either the generic or specific place.

Although rules exist in both sections for some portions of the protocol, they have different reactions to correct and incorrect behavior. The formal specification for the bus under test (the 1394-1995 protocol bus for the preferred embodiment) contains different statements telling us what is correct and incorrect usage of the protocol. The first step in generating rules is to; break each one of those statements down into usable stand-alone statements. An example follows.

The 1394-1995 specification, Section J, sub-section 1, titled scope, contains the following text:

This annex describes an example PHY-link interface for this standard. It covers the protocol, signal timing, and galvanic isolation circuitry. It does not cover specific operations of the PHY except for behavior with respect to this interface.

In this annex bit 0 of any multiple-bit bus is the most significant and transmitted first on the serial bus. The proposed data rates that are referred to in multiples of 100 Mbit/s are actually multiples of 98.304 Mbit/s. The interface described in this annex supports the following data rates for the cable environment: 100 Mbit/s, 200 Mbit/s, and 400 Mbit/s (data rates beyond 400 Mbit/s can be supported if the need arises). The interface can also support the following data rates for the backplane environment: 25 Mbit/s and 50 Mbit/s. These rates are the actual "bit" rates, independent of the encoding scheme. The actual clock rate in a redundant encoding scheme is referred to as a "baud" rate and is independent of the clock rate of this interface. In the timing diagrams in this annex, each bit cell represents one clock sample time. The specific clock to data timing relationships are described in J.7.

From this section the following rules (or assertions) can be inferred:

1. Bit 0 of any multiple-bit bus is the most significant and is transmitted first on the serial bus.
2. The interface described in this annex supports the following data rates for the cable environment: 100, 200, and 400 Mbit/s. Data rates are actually in multiples of 98.304 Mbit/s.
3. These rates are actual bit rates, independent of the encoding scheme.

These would be examples of assertions for the cable environment for the 1394-1995 bus protocol.

From the next section (j.2), the following assertions can be inferred:

1. Data is carried between the link and the phy chips on the D bus.
2. The width of the D bus depends on the maximum speed of the connected Phy chip.
3. In multiple-speed implementations, the portion of the D bus that carries packet data is left-justified in the D bus (starting with bit 0 ).
4. The Unused D bus signals are to be driven low.

The next step in generating rules would be to actually construct them. Several rules are shown below. In the preferred embodiment, these rules are called E_Rules, for enabled rules.

E_Rule_J_2_1: Data is carried between the link and phy on the D bus

E_Rule_J_2_2: The width of the D bus depends on the maximum speed of the connected Phy chip.

E_Rule_J_2_4: In multi-speed implementations, the portion of the D bus that carries packet data is left-justified, starting with bit 0

E_Rule_J_2_5: The Unused D bus signals are to be driven low (see E_Rule_J_2_2 for a determination of which signals are unused).

The code for these rules would be contained in the appropriate rules section. For example, E_Rule_J_2_5 is contained in the code of the PM rules section for this bus (in the preferred embodiment, the Ip_PM_rules.v file), and is shown below.

```
case (Phy_Speed)
Speed_100Mbit_per_s : begin
    If(((D[0] != 1'b0) || (D[0] != 1'b1)) &&
        ((D[1] != 1'b0) || (D[1] != 1'b1)) &&
        ((D[2] != 1'b0) && (D[3] != 1'b0) &&
        (D[4] != 1'b0) && (D[5] != 1'b0) &&
        (D[6] != 1'b0) && (D[7] != 1'b0)))
    $display("*** ERROR *** Protocol Violated Section J.2.5:
        The unused D bus signals are to be driven low.");
    end
Speed_200Mbit_per_s : begin
    If(((D[0] != 1'b0) || (D[0] != 1'b1)) &&
        ((D[1] != 1'b0) || (D[1] != 1'b1)) &&
        ((D[2] != 1'b0) ||(D[2] != 1'b1)) &&
        ((D[3] != 1'b0) ||(D[3] != 1'b1)) &&
        (D[4] != 1'b0) && (D[5] != 1'b0) &&
        (D[6] != 1'b0) && (D[7] != 1'b0))
    $display("*** ERROR *** Protocol Violated Section J.2.5:
        The unused D bus signals are to be driven low.");
    end
Speed_400Mbit_per_s : begin
    If(((D[0] != 1'b0) || (D[0] != 1'b1)) &&
        ((D[1] != 1'b0) || (D[1] != 1'b1)) &&
        ((D[2] != 1'b0) || (D[2] != 1'b1)) &&
        ((D[3] != 1'b0) || (D[3] != 1'b1)) &&
        ((D[4] != 1'b0) || (D[4] != 1'b1)) &&
        ((D[5] != 1'b0) || (D[5] != 1'b1)) &&
        ((D[6] != 1'b0) || (D[6] != 1'b1)) &&
        ((D[7] != 1'b0) || (D[7] != 1'b1)))
    $display("*** ERROR *** Protocol Violated Section J.2.5:
        The unused D bus signals are to be driven low.");
    end
```

This code will be executed at each change, or cycle, of the Link-Phy Bus. It will check the Test Environment Initialize signal "Phy Speed" which represents the speed at which the test set the phy. If any of the unused bits are set to a 1 or are unknown, the system will generate an error. This would be an example of a generic rule. For this particular rule, there is no corresponding TG rule per say. The TG rules section would pass the phy speed to the TGs, and it would be up to the TGs to process the protocol correctly.

On the TG side there is, as an example, the following rule with the corresponding code:

Section J.3.2.2: The Phy will wait until the interface is IDLE to perform a Phy status packet transfer.

```
E_RULE_J_3_2__2 = ((Request_Code_
    Act ==PHY_STATUS_PKT) &&
    (E_Initialize) &&
    (!Bus_Granted_In_This_Cycle) &&
    (!E_End_Imm) &&
```

```
!Action_Initiated_In_This_Cycle &&
    E_Bus_Idle);
```

By examining the code for the above rule, the conditions that must be met for this rule can be determined. One, the Request code from the Action List is checked against a phy status packet. Two, the Entry in the ACTION LIST must have been initialized (pre-loaded) such that it is a "legal" and desired command. Three, no arbitration bus has been granted in this cycle (the bus will be maintained). Four, currently the system is not at the end of an immediate packet. Five, no action was previously initiated in this cycle. Six, the bus is in an IDLE state.

From the above code, it can also be determined that certain things have previously been looked up in the tables. The Request Code was already accessed from the Action List. The rule for a just ending immediate request (E_End_Imm) was previously evaluated and the bus is currently in the idle state (the rule: E_Bus_Idle), which shows that the previous rule for the bus being idle is E_Bus_Idle.

Appendix 1: General Operation of the 1394(a) Test Environment

1. Overview of system

This appemdix discusses the general operation of the preferred embodiment test environment. The test environment consists of the following pieces and hierarchy:

```
Module:
    Top:
        Includes (../system/include/common_inc_param.v
            ../system/include/get_response_tcode.v
            ../system/include/get_lock_resp_length.v
            ../system/include/data_generator.v
            ../albus/include/al_inc_param)
        Tasks (generate_error, End_Test, MAP, MIP, REG)
        Functions (ACT_LOOK, CRC_Function)
        Modules (aal_slice, plp_slice, link_core)
    aal_slice:
        Includes (../system/include/common_inc_param.v
            ../albus/include/al_inc_param)
        Modules (aal_tg_stub, al_pm_stub, al_results_table)
    plp_slice:
        Includes (../system/include/common_inc_param
            ../lpbus/include/inc_param)
        Modules (plp_tg_stub, lp_pm_stub, lp_results_table)
    link_core:
        Many module instances.
    aal_tg_stub:
        Includes (../system/include/common_inc_param.v
            ../albus/include/al_inc_param)
        Modules (rd_asyncFIFO_aal_tg, rd_siochFIFO_
            aal_tg, rd
            _reg_aal_tg,
            wr_asyncFIFO_aal_tg, wr_isochFIFO_aal_tg,
            wr_reg_aal_tg, aal_tg_rules)
    al_pm_stub:
        Includes (../system/include/common_inc_param,
            ../albus/include/al_inc_param)
        Modules (wr_reg_al_pm, rd_reg_al_pm, rd_
            asyncFIFO
            _al_pm,
            wr_asyncFIFO_al_pm, rd_isochFIFO_al_pm,
            wr_isochFIFO_al_pm, link_isochCT_al_pm,
            link_interrupt_al_pm,host_bus_op_al_pm,
            al_pm_rules)
    al_results_table:
        Includes (../system/include/common_inc_param.v
            ../albus/include/al_inc_param)
```

-continued

```
plp_tg_stub:
    Includes (../system/include/common_inc_param.v
        ../lpbus/include/_inc_param)
    Modules (ack_pkt_plp_tg, async_pkt_plp_tg,
        bus_op_plp_tg,
        isoch_pkt_plp_tg, phy_pkt_plp_tg,
        phy_status_plp_tg,
        plp_tg_rules)
lp_pm_stub:
    Includes (../system/include/common_inc_param.v
        ../lpbus/include/inc_param)
    Modules (lp_pm_rules, ack_pkt_lp_pm,
        async_pkt_lp_pm,
        bus_op_lp_pm, bus_request_lp_pm,
        isoch_pkt_lp_pm, phy_status_lp_pm,
        phy_pkt_lp_pm)
lp_results_table:
    Includes (../system/include/common_inc_param.v
        ../lpbus/include/inc_param)
```

1.1 Pieces of the system 1.1.1. Test

The entire system test resides in the system/tests subdirectory. Within each test is one initial "begin end" block. The actual test resided within this block. The first section of any test is the test description. This will describe the actions and methods taken in the test. The next section is the local variable definitions. Here would be all the temporary variables (integers, registers, etc) for the test use. Examples of the section would be integer looping variables and the like.

The next section would start with the initial begin block and end with the end block statements. This would be the body of the test. There is a "large" list of valid variables and constants, which are described in the individual include parameter files (system/include/common_inc_param, albus/include/al_inc_param, Ipbus/include/inc_param). These include files contain all the system constants which are understood by the test and the system. Along with these constants, there are a number of variables, which are defined, in the top module. An example of one of these variables would be the Tcode register.

The test contains only three major commands: MAP, MIP, and REG. These represent the move asynchronous packet, move isochronous packet, and register commands.

1.1.2. Action List

Once the initial "begin end" block has been created, the MAP, MIP, and REG tasks load the Action List. The Action List is nothing more than a "large" memory. It includes all the parameters associated with the task/instruction provided for in the test. The MAP, MIP, and REG tasks place their parameters into the Action List as the correct location in a "test environment readable" form. The Action List is then seen by all rules sections in the system. Typically, the Action List includes commands and responses, length of transfer, the timing related to when the command (sub-action) should be executed, and other necessary parameters. The Action List then holds this information for all rules sections to read.

1.1.3. Link Core

This piece is the actual RTL or behavioral code for the Link core.

1.1.4. ALBUS

The Application Link Bus is also known as the application back end. It incorporates the connection from the user's /customer's logic to the Link core specific logic. The interface consists of three separate busses: the microcontroller bus, the asynchronous bus, and the isochronous bus. Each of these busses may run on different clocks. In talking about this side of the test environment, we have four main portions, which make up this slice of logic. They are as follows: the two rules sections (one for the Protocol Monitors, and one for the Traffic Generators), the Results Table which connects the two rules sections, and the TGs and PMs themselves, which interact with the physical nature of the bus.

1.1.4.1. Rules

The two rules sections basically read the Action List and the information from the PMs and the Results Table to determine what to do next. The TG rules module deals with reading the Action List and the Results Table and then asserts any action necessary. This may include sub-actions that are now "timed-out" and ready for processing, or actions based on the Results Table changing entries. Each rule is based on the specifications of the bus and is somewhat symmetrical in its implementation. Based upon the information in the Action List and the Results Table, the TG rules can determine what action (if any) that it needs to initiate on the Application Link bus.

1.1.4.2. Results Table

The Results Table is read by the TG rules module and written by the PM rules module. The table contains all revenant historic and current states of the AL bus slice. The Results Table consists of current phase information. This is the information which tracks the current state of any sub-action. The Results Table also keeps track of the current timing for all phases of the transaction and also keeps track of the failures (if any).

1.1.4.3. TGs

The Traffic Generators receive "enables" from the TG rules section, and transform the enables into actions and asserted signals on the Albus. Some of the TGs with reading from any of the busses. The read TGs only set up the read (i.e. provide the address and associated strobes and the like). Any reading of the registers or FIFOs happens when data is transferred to the PMs. Because the TG only asserts signals on the Albus, the PM must be used to read any data placed on the bus.

1.1.4.4. PMs

The Protocol Monitors receive and record any changes to the Albus. Each PM then passes this information along to the PM rules section using "enables." The PMs will record any asserted information on the bus; this includes information from both the TGs driving the bus and the Link core driving the bus. Both are recorded and passed along to the PM Results Table, which in turn passes the required information along to the Results Table.

1.1.5. LPBUS

The Link Phy bus incorporates the connection from the link chip/core to the Phy chip/core. Its specification is defined in the 1394-1995 specification and also the 1394 A specification. In talking about this side of the test environment, we have four main portions that make up this slice of logic. They are as follows: the two rules sections (for Protocol Monitors and Traffic Generators), the Results Table which connects the two rules sections, and the TGs and PMs themselves, which interact with the physical bus.

1.1.5.1. Rules

The two rules sections basically read the Action List and the information from the PMs and the Results Table to determine what to do next. The TG rules module deals with reading the Action List and the Results Table and then asserts any action necessary. This may include sub-actions that are now "timed-out" and are ready for processing, or actions based on the Results Table changing entries. Each rule is based on the specifications of the bus and is somewhat symmetrical in its implementation. Based upon the information in the Action List and the Results Table, the TG rules can determine what action (if any) it needs to complete on the Ipbus.

1.1.5.2. Results Table

The Results Table is read by the TG rules module and written by the PM rules module. The table contains all revenant historic and current states of the Ipbus slice. The Results Table consists of current phase information. This is the information which allows the tracking of all relevant states of any transaction on the Ipbus.

1.1.5.3. TGs

The Traffic Generators receive "enables" from the TG rules section, and transform the enables into actions and asserted signals on the Ipbus. Some of the TGs deal with reading from any of the busses. The read TGs only set up the read (i.e. provide the address and associated strobes and the like). Any reading of the bus happens when data is transferred to the PMs. Because the TG only asserts signals on the Ipbus, the PM must be used to read any data placed on the bus.

1.1.5.4. PMs

The Protocol Monitors receive and record any changes to the Ipbus. Each PM then passes this information along to the PM rules section using "enables." The PMs will record any asserted information on the bus; this includes information from both the TGs driving the bus and the Link core driving the bus. Both are recorded and passed along to the PM rules table, which in turn passes the required information along to the Results Table.

2. Basic Makeup of a Test 2.1. Initialization of test

The basic construction of any test in the 1394 test environment places an executable Verilog task call within an initial begin end block. Prior to defining this block, any initialization or declaration of register should take place. Temporary loop values, intermediate holding registers, integers, etc. are just examples of what may be defined. Anything that is particular to this test should be defined here in the beginning of the test file.

Next comes the initialization begin block. This should start with any link core register initialization necessary for the test. This will usually include REG writes to internal Link core registers.

The body of the test is next. This will mostly be composed of MAP or MIP instructions. There may also be a need to read or write internal link core registers, so in this case, REG instructions should be used.

At the end of the test, after all processing and loops, is the reset procedure. It is necessary to reset both the link core and the test environment in order to have the Action List and TG rules sections start processing the instructions from the test.

2.2. Initialization of link core

Currently, all FIFO (non-composer mode) tests should have the A 1394_Control_Register set to 0, the Interrupt_Control_Register set to 'hFF, the Operational_Control_Register set to 'h48, and the Priority Request_Register set to 0. This will turn on all interrupts, and set the link core in non-composer mode.

3. Flow of a Test 3.1 The steps of processing an instruction.

At compile time, all initialization block are processed first. Because the "test" itself is within one of these initialization blocks, it is among the first routines that are processed. Because the test language is implemented by task calls, all of the tables must be loaded first. The first table that gets loaded is the Action List. All of the ports from the MAP, MIP, and REG commands are inserted into the next available slot in the Action Table.

The Action List is loaded sequentially from the bottom of the list to the top (location 0 to max). If an overflow condition exists, the test environment will send an error message and "finish" the run.

Once the Action List is loaded with the test, a reset is initiated (by the test). This reset will allow the PM rules sections to know that the Action List has been loaded, and the PM rules will take this opportunity to load their tables. This includes loading the local slice's Results Table. At a minimum, the PM rules sections must initialize the phase information for all legal entries in the Results Tables. It is by this method, initialization of the phase entries, that the TG and PM rules sections know if the index into the tables is legal.

From this point, that at which the Results Tables are initialized, the actual processing of the Action List will begin. All of the TGs rules sections will search the Action List to determine if, at the current instant, any processing is necessary. At the point at which all conditions for execution exist, a TG rules section will "enable" the TGs. The TGs necessary for processing will initiate processing on their respective bus. At this point the link core and the PMs will observe this action. The link core will act normally, and the PMs will observe the action and make a determination as to what (if anything) is necessary to report to the PM rules section.

This continues until all Action List entries are either completed or have caused a failure. At the point that one of the busses is complete, it sets its slice complete signal from the TG rules section. When all sections have set their complete signals, the test ends with test status information.

Background Information

In order to understand and correctly write tests for the Test Environment, there are a few things architecturally which must be understood about the system before you can start.

First, the tests themselves are written from the prospective of an architectural transaction basis. This means that instead of specifying the individual parts of a transaction sub-actions, only the transaction needs to be specified from the test. The test environment, being set up properly, will take care of the particular sub-actions which need to be run. By using this method of specifying a test, an individual test will work without regard to the particular system being tested, provided that the test is a valid one for the system under testing.

To help facilitate writing tests, several examples of the different types of tests will be described in detail, these four template tests comprise most of the tests in the test suite. These tests are smaller versions of actual tests in the suite but have been reduced in size and scope to easily describe.

The major portions of a test are as follows:

Local Parameters for use of the test itself. These are different from system/test environment parameters.

Local Registers. Again this will be for local test storage such as local looping integer storage.

TE_Initialize. This command will initialize the test environment to setup such things as 1394-1995 protocol or 1394A protocol.

Link_Core_Reset. This does a "hard" reset of the link core logic and allows for the setup of I/O protocols, such as direct or differential modes.

Test Sequence Setup. This will include all setup necessary for completion of the test.

This will include such things as link core register writes and reads to setup link interrupts.

The actual test itself. The different commands necessary to execute the required test.

Start_Test command, which actually executes the test.

The last section "Start_Test command" actually initiates the test. Because the instructions in the test (from beginning to end of the test) are actually entered into a "Test Table," each entry in the "test" actually is entered into the test table. Therefore, the last command in every test is the "start_test" command. This is an instruction to the test environment to start execution and interpretation of the test table entries.

First example: 1.1.1.1.1.2.v Asynchronous Transaction.

Each test file starts with an initial begin block. In actuality, several files are prepended and post-pended to the test file to make a "useable" Verilog module file.

initial
begin: one

The first section for all tests is an optional section for local parameters. In this file there are two parameters, Links_Id and Phys_Id. The Links_Id parameter is used for setting up the physical ID of the link core. This is used in writing the link ID control register.
parameter Links_Id=0;
parameter Phys_Id=1;

The next section is the local storage section. These are local registers and integers used for the test.

The integer A is used for an internal loop integer. It selects between 1394-1995 mode and 1394A mode.

Because these tests are valid for both protocols, we should test both protocols in this one test, therefore, we loop through the test twice, once in both modes.

The register bit rel_abs is used to switch between relative indexing and absolute indexing. This brings up the aside topic of how the test is sequenced. Because the 1394 specification is a "split-transaction" bus, it is not necessarily true that all sub-actions of a transaction complete sequentially. It is often the case that several different initiators will send out requests, and it is undeterminable which node will return responses to the requests. Therefore, we model this split transaction nature by allowing sub-actions of different transactions to be interspersed between sequential sub-actions or different transactions. The way this is accomplished is by using the test table's concept of how individual transactions are stored.

For each transaction (MAP, MIP) we have four different sub-actions which are legally split into two. The request sub-action consists of a request packet and an acknowledge packet. The response sub-action is also split into two consisting of a response packet and an acknowledge packet. Because it is necessary to model the physical delay of a real system, the timing between request and request ACK may be different. Also the timing between response and response ACK may also be different. Along with the differences between a transaction, there will be different delays in the system depending on how many nodes separate the source and destination nodes.

To correctly model the timing delays of the system and the split transaction nature of the system, the concept of "index" and "absolute_relative" timings were developed. There are four parameters (I/Os) for each of the timing constraints. The first is the "Start_Time", the second is the ABSOLUTE$_{13}$ RELATIVE, the third is the INDEX, and the fourth is Phase.

The absolute relative parameter determines if we are going to use an absolute time (i.e. simulation time) to determine when the instruction will be executed, or if we are going to use time relative to a previous sub-action. If we use absolute time, and we set the start time parameter to some number (say 100 ns) then at simulation time of 100 ns, the start time sub-action will be executed. This allows us to set up a very specific timing oriented mode of operation. If we know at what time things should be executed we would use this method of execution sequencing.

The second method of execution sequencing is to use the relative mode of operation. In this mode, the index parameter is used. We would then specify an offset of instructions and a phase at which execution of this sub-action would take place. In this way, a "subsequent" instruction can be programmed to begin after the any "previous" instruction, and in particular after any particular "phase"of a "previous" instruction. The "previous" instruction could also be one that is later in the listed sequence, in which case the Index would merely point forward in the list.

Getting back to the register definitions, the rel_abs register is a "programmable" reusable variable to assign either absolute or relative timing to any command.

Version is again a temporary variable used only in the test. It is set to either 1394-1995 or 1394A mode. This allows the test environment to know which protocol to expect.

integer a;

reg rel_abs;

integer version;

The temp tcode is used to compute the CRC for the response packet. It is assigned by looking at the request tcode and determining what the response tcode should be and then the temp_tcode is used in the CRC generate function to allow for a correct CRC calculation.

reg [3:0 ] temp_tcode;

The Request Start Index P and L are the Start Request indices for the relative timing for both the Phy and the Link.

```
reg [Request_Start_Index_Size-1:0]    Request_Start_IndexP;
reg [Request_Start_Index_Size-1:0]    Request_Start_IndexL;
//-----------------------------------------------------------------
//    Description:
//       Link-Phy Interface Testing. Single sub-action, with speeds of:
//          S100, S200, S400,
//       Link Initiated, with No Request Outstanding
//       Write a Block Packet from the link
$display ("-----------------------------------------------------------------");
$display ("TEST FILE: 1.1.1.1.1.2.v");
$display ("Link-Phy Interface Testing. Single sub-action, with speeds of:
S100,
$display ("S200, S400");
$display ("Link Initiated, with No Request Outstanding");
$display ("Write a Block Packet from the link - in Bypass mode");
$display ("-----------------------------------------------------------------");
for (version = 0; version , <=1; version = version + 1)
begin
```

Here we start the setup for the different modes of 1394. For 1394A we enable Streaming Packets, Priority response packets, multispeed concatenation packets, accelerated request packets and Priority request packets. We also set the Protocol Monitors and the Traffic Generators to execute the 1394A handshake between the link and the phy.

Because we test the 1394A version first, we must have the first register command be an absolute timing. Since this is the first command there is nothing to make it relative to. In other words, you must start (at least in one place) somewhere with an absolute time for the first command to execute.

```
Case (version)
    0: begin
        IEEE_Spec_Version         = P1394a;
        Stream_Pkts               = 'h1;
        Pri_Response_Pkts         = 'h1;
        MultiSpeed_Concat         = 'h1;
        Accel_Requests            = 'h1;
        Pri_Request_Pkts          = 'h1;
        A1394_Phy_Link_HandShake  = 'h1;
        Request_Start_Time        = 0;
        Request_Start_Index       = 1;
        rel_abs                   = ABSOLUTE;
    end
    1: begin
        IEEE_Spec_Version         = IEEE1394_1995;
        Stream_Pkts               = 'h0;
        Pri_Response_Pkts         = 'h0;
        MultiSpeed_Concat         = 'h0;
        Accel_Requests            = 'h0;
        Pri_Request_Pkts          = 'h0;
        A1394_Phy_Link_HandShake  = 'h0;
```

Here the timing is made relative. Since this is NOT the first time we have executed any commands, and we wish the subsequent commands to follow the previous commands, we make this next command relative. The reason that the Request_Start_Index is set to 2 and not 1 is due to the fact that the last previous command was not in a sequential order. We did the equivalent of MAP10 (or MAP x+1) then MAP 9 (or MAP x), so in order to make the next command sequential, we must make it relative to MAP9 (which will be the last command run prior to the next one).

```
        Request_Start_Time   = 2000;
        Request_Start_Index  = 2;
        rel_abs              = RELATIVE;
    end
```

```
    end case
```

The next set of register loads are for Test environment setup. First, we are telling the TE that it will be responsible for generating the phy status and the cycle start command. We then set the gap count, the cycle master id, the number of outstanding priority requests, and the Phy speed. We also set the data_on count to 2. This allows the system to specify how many idle cycles (or data_on cycles) the link will see prior to getting real data (the phy link bus switching from receive data_on to receive data).

```
    Phy_Status_Generation    = AUTOMATIC;
    Gap_Count                = 2;
    Cycle_Start_Generation   = AUTOMATIC;
    Link_Core_Id             = Links_Id;
    Cycle_Master_ID          = 12;
    Link-Core_Channels       = 64 'h0000000000000001;
    Pri_Req_Count            = 0;
    PHY_Speed                = S400;
    Data_On_Count            = 2;
```

The Interface_Mode sets the test environment for connections to the link core. There are two modes for both the application side and the phy side. The Application side has the ability to connect in a multiplexed mode and a non-multiplexed mode. This adjusts how the Traffic Generators will send information to the link core. This is specified by AL_NON_MULTIPLEXED_MODE and AL_MULTIPLEXED_MODE. The link phy bus also allows for two connection strategies. The link and phy can be directly connected or connected by a differential mode of isolation. The next instruction sets up the interface mode register to have a direct connect and non-multiplexed modes of operation.

```
Interlace_Mode       = {LP_DIRECT_MODE,AL_NON_MULTIPLEXED_MODE}; '
Request_Start_Phase  = COMPLETE_PHASE;
```

The next instruction is the "first" command which will be entered into the test table. It is the Test Environment initialization instruction. This will initialize the test environment internal parameters for things such as which version of the specification we are using (1995/A), if Phy status is manually or automatically generated, what the gap count number is, if the cycle start is manually or automatically generated, what the link and cycle master ID are, what channels the link core will use for isochronous mode, if we are using stream packets priority request and response packets, if we are using multispeed concatenation packets. This instruction is executed at the relative or absolute time (rel_abs) of request_start_index (in the case of relative) or Request_Start_Time for absolute.

```
TE_INITIALIZE  (IEEE_Spec_Version, Phy_Status_Generation, Gap_Count,
                Cycle_Start Generation, Link_Core_Id, Cycle_Master_Id,
                Link_Core_Channels, Stream_Pkts, Pri_Response_Pkts,
                MultiSpeed_Concat, Accel_Requests, Pri_Request_Pkts,
                A1394_Phy_Link_HandShake, Pri_Req_Count, PHY_Speed,
                Data_On_Count, Interface_Mode, Request_Start_Time, rel_abs,
                Request_Start_Index, Request_Start_Phase);
//-----------------------------------------------------------------------------
```

The next command Link_Core_Reset will have the following information. The request will be executed at 100 ns after the TE_Initialize command has completed. The hardware reset signal will be asserted for

```
    Request_Start_Time = 100;
    Request_Start_Index = 1;
    Request_Start_Phase = COMPLETE_PHASE;
//-----------------------------------------------------------
```

The next instruction is the command which will be placed into the test table. It specifies that the link core will have the reset line held active for 5 bus cycles, states the interface

```
    Reset_Duration = 5;
    LINK_CORE_RESET (interface_Mode, Reset_Duration, 0,
        RELATIVE, Request_Start_Index, Request_Start_Phase);
//-------------------------------------------------------------------
//-------------------------------------------------------------------
//     Write the Operation Control Register
//     !LPS output, Enable Interrupts, Isoch Cycle Master,
//         Isoch Bypass,
//     Async Bypass, !Calc Data CRC, !Calc Hdr CRC, !Reg
//         CRC Async
//-------------------------------------------------------------------
```

The next instruction is a link core register write command. It will be placed in the test table and executed 100 ns after the link core reset command has completed execution. This is a write to the operational control register address 281 (h), and has the following effect:

LPS is deasserted. The link is not requesting access to the Phy or bus.

Interrupts are enabled.

Isochronous cycle master is disabled.

Isochronous bypass mode is enabled, therefore, data stream does contain the header packet.

Asynchronous bypass mode is enabled, therefore data stream does contain the header packet.

Calculate the data CRC for the packet.

If registered CRC were enabled, they would be used from asynchronous packets.

This command will execute 100 ns after the previous command has completed.

```
Reg  (WRITE, Operational_Control_Address,
        {!LPS_Output, Enable_Interrupts, !Isoch_Cycle_Master, Isoch_Bypass,
         Async_Bypass, !Calc_Data_CRC, !Calc_Hdr_CRC, !Reg_CRC_Type},
        Request_Start_Time, RELATIVE, Request_Start_Index, Request_Start_Phase);
if (IEEE_Spec_Version == P1394a)
begin
//-------------------------------------------------------------------------------
//     Write the 1394a Control Register address 280 (h)
//     Reserved, Async_Streams, Priority_Response, Multispeed_Concat,
//     Send_Cycle_Sync, Priority_Request, A1394_Phy_Link_Handoff, 1394_Enable
//-------------------------------------------------------------------------------
        Request_Start_Time = 100;
```

This next command will be entered into the test table and executed 100 ns after the previous command. This register write, writes the 1394 A control register address 280(h). It sets the following:

Enables asynchronous streams.

Enables priority arbitration for response packets.

Enables multispeed concatenation.

Allows the link core to operate per 1394A rules with sending cycle sync requests.

Enables extra requests using priority arbitration.

Enables the link core to operate per the A protocol in handing off the link phy bus.

Enable operation of the 1394A modes of operation.

```
REG  (WRITE, A1394_Control_Address,
        {Reserved, Async_Streams, Priority_Response, Multispeed_
         Concat, Send_Cycle_Sync, Priority_Request, A1394_
```

-continued

```
        Phy_Link_Handoff, 1394_Enable}, Request_Start_Time,
        RELATIVE, Request_Start_Index,
        Request_Start_Phase);
//-------------------------------------------------------------------------
//   Write the Priority Request Register address 288 (h),
//   the number of Priority requests possible in a fairness interval
//-------------------------------------------------------------------------
Request_Start_Time = 100;
```

The next command will be entered into the test table and writes the priority request register. It will be written with a 0, thus, setting the number of extra requests during a fairness interval to 0. This command will be executed 100 ns after the previous command has completed.

```
    Reg    (WRITE, Priority_Request_Address, 'h0,
            Request_Start_Time, RELATIVE, Request_Start_
            Index,
            Request_Start_Phase);
end // if (IEEE_Spec_Version ==P1394a)
else
begin
    //-------------------------------------------------------------------------
    // Write the 1394a Control Register address 280 (h)
    // Reserved, !Async_Streams, !Priority_Response, !Multispeed_
    Concat,
    // !Send_Cycle_Sync, !Priority_Request, !A1394_Phy_
    Link_Handoff,
    // A1394_Enable
    //-------------------------------------------------------------------------
    Request_Start_Time = 100;
```

This command will be entered into the test table and will write the 1394A control register. It will do the following:
Disable asynchronous stream packets.
Disable priority arbitration for response packets.
Disable multispeed concatenations (1394-1995 rules).
Disable cycle sync commands (1394-1995 rules).
Disable priority requests (1394-1995 rules).
Allows the link to operate in handshake with a phy which follows the 1995 protocol.
Disable all 1394A protocols.
It will execute 100 ns after the previous REG command has completed.

The next register write controls the interrupt control 1 register. It will execute 100 ns after the previous command has completed execution. It will set the following:
Interrupt when receiving an acknowledge pending code following an asynchronous packet.
Interrupt when receiving one of the specified codes following an asynchronous packet.
Interrupt when receiving an ACK complete.
Interrupt when receiving a cycle start packet.
Interrupt on receiving an isoch packet with correct channel number.
Interrupt upon receiving an async packet with dest ID match.
Reg (WRITE, Interrupt_Control_Address,
{Reserved, Intr_Std_Ack, Intr_Delay_Ack_Code, Intr Ack_Complete,
Intr_Cycle_Start, $Intr_{13}$ Phy_Status, Intr_Isoch_Received,
Intr_Async_Received}, Request_Start_Time, RELATIVE,
Request_Start_Index, Request_Start_Phase);

The next register write controls the interrupt control 2 register. It will execute 100ns after the previous command has completed execution. It will set the following:
Interrupt when get ACK lost packet.
Interrupt on a bad data CRC.
Interrupt on a bad packet header.
Interrupt on an isoch write error.
Interrupt on an async write error.
Interrupt on an isoch read error.
Interrupt on an async read error.
Reg (WRITE, Interrupt_Control2 _Address,
{Reserved, Intr_Ack_Lost, Intr_Bad_DataCRC, Intr_Bad_Hdr_CRC,
Intr_Isoch_Write_Error, Intr_Async_Write-Error, Intr_Isoch_Read_Error,
$Intr_Async_{13}$ Read_Error}, Request_Start_Time, RELATIVE,
Request_Start_Index, Request_Start_Phase), The next register write controls the interrupt control 3 register. It will execute 100 ns after the previous command has completed execution. It will set the following:
Interrupt on a missed phy packet.
Interrupt on a missed isoch packet.

```
    Reg    (WRITE A1394_Control_Address,
            {Reserved, !Async_Streams, !Priority_Response, !Multispeed_Concat,
            !Send_Cycle_Sync, !Priority_Request, !A1394_Phy_Link_Handoff,
            !A1394_Enable}, Request_Start_Time, RELATIVE,
Request_Start_Index, Request_Start_Phase);
end // else if (IEEE_Spec_Version == P1394a)
//-------------------------------------------------------------------------
// Write the Interrupt Control Registers
//     Reserved, Intr_Std_Ack, Intr_Delay_Ack_Code, Intr_Ack_Complete,
//     Intr_Cycle_Start, Intr_Phy_Status, Intr_Isoch_Received,
//     Intr_Async_Received,
//     Reserved, Intr_Ack_Lost, Intr_Bad_Data_CRC, Intr_Bad_Hdr_CRC,
//     Intr_Isoch_Write_Error, Intr_Async_Write_Error, Intr_Isoch_Read_Error,
//     Intr_Async_Read_Error
//     Reserved, Reserved, Reserved, Reserved, Reserved, Intr_Missed_Phy_Pkt,
//     Intr_Missed_Isoch_Pkt, Intr_Missed_Async_Pkt
//-------------------------------------------------------------------------
    Request_Start_Time  =  100;
    Request_Start_Index =  1;
    Request_Start_Phase =  COMPLETE_PHASE;
```

Do not interrupt on a missed async packet interrupt pending.

```
    Reg    (WRITE, Interrupt_Control3_Address,
           {Reserved, Reserved, Reserved, Reserved, Reserved, Intr_Missed_Phy_Pkt,
           Intr_Missed_Isoch Pkt, Intr_Missed_Async_Pkt},
           Request_Start_Time, RELATIVE, Request_Start_Index, Request_Start_Phase);
//-----------------------------------------------------------------------------
//  Write the Link ID Address
//     With Destination ID Link ID hardcoded to 0 for this test
//-----------------------------------------------------------------------------
```

The next register write controls the link ID register. It will execute 100 ns after the previous command has completed execution. It will set the lower byte of the link address.

Reg (WRITE, Link_Id_Byte0_Address, Links_Id[7.0], Request_Start_Time, RELATIVE, Request_Start_Index, Request_Start_Phase), The next register write controls the link ID register. It will execute 100 ns after the previous command has completed execution. It will set the upper byte of the link address.

```
    Reg    (WRITE, Link_Id_Byte1_Address, Links_Id[15:8],
           Request_Start_Time, RELATIVE, Request_Start_Index, Request_Start_Phase);
//-----------------------------------------------------------------------------
//  Start of Test
//-----------------------------------------------------------------------------
//-----------------------------------------------------------------------------
//  make the link a destination of write block command
//     try to send a write block command at s100, s200 s400
//  make the link as the source of write block command
//     try to send a write block command at s100, s200, s400
//-----------------------------------------------------------------------------
//
//
```

The following registers are set in such a way that no retries will be attempted for failed packet transfers. Also all of the failure fields are set to null or zero. This means that no failures will be injected into the system. Therefore, we should see no failed or retried packets.

| | | |
|---|---|---|
| Retry_Amount | = | 0; |
| Failure_Field | = | 0; |
| Failure_Data | = | 0; |
| Failure_Amount | = | 0; |

All following requests which are (should be) relative, will start 100ns after the previous phase command completes.

| | | |
|---|---|---|
| Request_Start_Time | = | 100; |
| Request_Start_Index | = | 1; |
| Request_Start_Phase | = | COMPLETE_PHASE; |

The following requests ACKs which are (should be) relative, will start 100 ns after the request phase has ended.

| | | |
|---|---|---|
| Request_Ack_Latency | = | 100; |
| Request_Ack_Index | = | 0; |
| Request_Ack_Phase | = | REQUEST_PHASE; |

All following responses which are (should be) relative, will start 100 ns after the request ACK phase has ended.

| | | |
|---|---|---|
| Response_Start_Latency | = | 100; |
| Response_Start_Index | = | 0; |
| Response_Start_Phase | = | REQUEST_ACK_PHASE; |

All following response ACK which are (should be) relative, will start 100 ns after the response has completed.

| | | |
|---|---|---|
| Response_Ack_Latency | = | 0; |
| Response_Ack_Index | = | 0; |
| Response_Ack_Phase | = | RESPONSE_PHASE; |

All following requests will have the packet type of a write block transaction, and the tcode will also be a write block command.

```
    Request_Code    =   WRITE_REQUEST_BLOCK;
    Tcode           =   WRITE_REQUEST_BLOCK;
//----------------------------------------------------------------------------
// Procedure:
// loop on speed code (S100,S200,S400)
//    link sends a Write Block
//    Phy sends a Write Block
//
//        a     01
//    --------------------------------
//    Link Write Block to phy      12
//    Phy Write Block to Link      21
//
//----------------------------------------------------------------------------
    for (Speed_Code = S100; Speed_Code <= S400; Speed_Code = Speed_Code + 'h1)
    begin
      for (a = 0; a < 2; a = a + 1)
      begin
        case (a)
        0:
          begin
```

For the first case we will send the link commands first then followed sequentially by the phy sending a transaction.

```
    if      (Speed_Code == S100)
            Request_Start_IndexL    =   1;
    else
            Request_Start_IndexL    =   2;
        Request_Start_IndexP        =   1;
    end // case: 0
1:
    begin
```

For the next case, we will send the phy command first then followed sequentially by the link sending a transaction.

```
            Request_Start_IndexL    =   -1;
            Request_Start_IndexP    =   2;
        end // case: 1
      endcase // case (a)
```

Set the source and destination of each subsequent transaction. If you wish to have the link initiate the transaction (i.e. Request) then make the source ID the link's . If you wish to have the link as the receiver and therefore, the initiator of the response, set the source ID to any legal value other than the link's id.

```
        Dest_Id     =   Phys_Id;
        Source_Id   =   Links_Id;
        TL          =   'h1;
```

This is just filling in the rest of the request and response packet fields with the correct information for this test.

```
        Retry_Code  =   2'b00;
        Pri         =   'h0
        Dest_Off    =   'h0;
        Data        =   'h1'
        RCode       =   'h0;
        Length      =   4;
        Ext_Tcode   =   'h0;
```

The INC_FN for data pointer sets the data generator to provide an incrementing function for any subsequent data packets (which are unused in this simulation due to length of 4).

```
        Data_Ptr    =   INC_FN;
```

The test must understand what the correct request, response, and any subsequent data CRC values should be. This allows the test to make the determination of when there has been a CRC failure. Must create temporary CRC values if there is more than 4 quadlets of information in the data packet. Generate_data_crc starts with the initial value of the data and looks at the function which will be used to generate any further data, automatically calculated with one call based on length.

```
generate_data_crc(Data_Ptr, Length, Data, Req_Data_CRC);
    Req_Header_CRC  =   CRC_Function ({Dest_Id, TL, Retry_Code, TCode,
                        Pri}, {Source_Id, Dest_Off [47:32]},
                        Dest_Off[31:0],
{Length, Ext_Tcode},4,FALSE);
```

A temporary tcode value must be calculated to give the test table the correct response CRC code.

```
temp-tcode         = get_response_tcode (TCode);
Resp_Header_CRC    = CRC_Function({Source_Id, TL, Retry_
                     Code temp_tcode, Pri}, {Dest_Id,
                     RCode, 12'b0}, 32'h0,32'h0,3,FALSE);
```

This command is the move asynchronous packet command. It will take care of all sub-actions (request, request ACK, response, response ACK). Source ID is the initiator and destination ID is the receptor.

```
// Link Write Block to Phy
MAP (Request_Code, TCode, Source_Id, Dest_Id, TL,
     Pri, Length,
     Dest_Off, Ext_Tcode, Retry_Code, RCode, Data,
     Data_Ptr,
     Req_Header_CRC, Resp_Header_CRC, Req_
     Data_CRC, Resp_Data_ CRC,
     Retry_Amount, Speed_Code, Failure_Data,
        Failure_Field,
     Failure_Amount, Request_Start_Time, RELATIVE,
     Request_Start_IndexL, Request_Start_Phase,
     Request_Ack_Latency, RELATIVE, Request_Ack_
        Index,
     Request_Ack_Phase,
     Response_Start_Latency, RELATIVE, Response_
        Start_Index,
     Response_Start_Phase,
     Response_Ack_Latency, RELATIVE, Response_
        Ack_Index,
     Response_Ack_Phase,
     Retry_Start_Latency, RELATIVE, Retry_Start_
        Index,
     Retry_Start_Phase),
```

Same as above except that now we are setting up the transfer from the phy to the link, so we need to flip the source and destination ids.

```
Dest_Id       = Links_Id;
Source_Id     = Phys_Id;
TL            = 'h0;
Retry_Code    = 2'b00;
Pri           = 'h0;
Dest_Off      = 'h0;
Data          = 'h0;
RCode         = 'h0;
Length        = 4;
Ext_Tcode     = 'h0;
Data_Ptr      = INC_FN;
generate_data_crc (Data_Ptr, Length, Data, Req_Data_CRC);
Req_Header_CRC = CRC_Function    ({Dest_Id, TL, Retry_Code, TCode, Pri},
                                  {Source_Id, Dest_Off [47:32]},
                                  Dest_Off[31:0],{Length,Ext_Tcode},4,FALSE);
temp_tcode       = get_response_tcode (Tcode);
Resp_Header_CRC  = CRC_Function({Source_Id, TL, Retry_Code, temp_tcode,
                                 Pri}, {Dest_Id, RCode, 12'b0},
                                 32'h0,32'h0,3,FALSE);
//     Phy Write Block to link
MAP (Request_Code, TCode, Source_Id, Dest_Id, TL, Pri, Length,
     Dest_Off, Ext_Tcode, Retry_Code, RCode, Data, Data_Ptr,
     Req_Header_CRC, Resp_Header_CRC, Req_Data_CRC, Resp_Data_CRC,
     Retry_Amount, Speed_Code, Failure_Data, Failure_Field,
     Failure_Amount,
     Request_Start_Time, RELATIVE,
     Request_Start_IndexP, Request_Start_Phase,
     Request_Ack_Latency, RELATIVE, Request_Ack_Index,
     Request_Ack_Phase,
     Response_Start_Latency, RELATIVE, Response_Start_Index,
     Response_Start_Phase,
     Response_Ack_Latency, RELATIVE, Response_Ack_Index,
     Response_Ack_Phase,
     Retry_Start_Latency, RELATIVE, Retry_Start_Index,
     Retry_Start_Phase);
       end // for (a = 0; a < 2; a = a +1)
    end // for (Speed_Code = S100; Speed_Code <= S400; Speed_Code = . . .
//---------------------------------------------------------------------------------------------------------------
end // for (version = 0; version <= 1; version = version + 1)
    start_test;
end // block: one
Example 2: Isochronous Transfer 1.1.1.1.16.1.v
//---------------------------------------------------------------------------------------------------------------
//     Copyright © 1997 BY Phoenix Technologies Ltd.
//     All Rights Reserved
//     Virtual Chips Division, Phoenix Technology Ltd.
//     Company confidential and Proprietary information.
//     This information may not be disclosed to unauthorized individuals.
//---------------------------------------------------------------------------------------------------------------
//     Description:  P1394, Link Phy interface Testing section 1.1.1.1.1.6.1
//---------------------------------------------------------------------------------------------------------------
//---------------------------------------------------------------------------------------------------------------
//     Other Comments:
//        Link-Phy Interfacting Testing. Single sub-action, with speeds of:
```

-continued

```
//         S100, S200, S400,
//         Link initiated, with No Request Outstanding
//         Cycle Start Packet & Isochronous Block Packet from the link - in Bypass mode.
//-----------------------------------------------------------------------------------------------------
initial
    begin: one
```

Parameters for setting the link's ID and phy ids. These are set as parameters here due to use in the rest of the test.

```
parameter Links_Id  =   0;
parameter Phys_Id   =   1;
integer a;
reg rel-abs;
integer version;
reg [3:0] temp_tcode;
reg [Request_Start_Index_Size-1.:0]    Request_Start_IndexP;
reg [Request_Start_Index_Size-1:0]     Request_Start_IndexL;
//-----------------------------------------------------------------------------------------------------
// Description:
//      Link-Phy Inteface Testing. Single sub-action, with speeds of:
//          S100, S200, S400.
//      Link Initiated, with No Request Outstanding
//      Cycle Start Packet & Isochronous Block Packet from the link - in Bypass mode.
//-----------------------------------------------------------------------------------------------------
$display("-----------------------------------------------------------------------------------------------------");
$display("TEST FILE: 1.1.1.1.1.6.1.v");
$display("Link-Phy Interface Testing. Single sub-action, with speeds of:");
$display("S100, S200, S400");
$display("Link Initiated, with No Request Outstanding");
$display("Cycle Start Packet & Isochronous Block Packet from the link-");
$display("in Bypass mode");
$display("-----------------------------------------------------------------------------------------------------");
```

Here we start the setup for the different modes of 1394. For 1394A we enable Streaming Packets, Priority response packets, multispeed concatenation packets, accelerated request packets and Priority request packets. We also set the Protocol Monitors and the Traffic Generators to execute the 1394A handshake between the link and the phy.

Because we test the 1394A version first, we must have the first register command be an absolute timing. Since this is the first command there is nothing to make it relative to. In other words, you must start (at least in one place) somewhere with an absolute time for the first command to execute.

```
for (version = 0; version <= 1; version = version + 1)
begin
    case (version)
        0: begin
                IEEE_Spec_Version            =  P1394a;
            Stream_Pkts                      =  'h1;
                Pri_Response_Pkts            =  'h1;
                MultiSpeed_Concat            =  'h1;
            Accel_Requests                   =  'h1;
                Pri_Request_Pkts             =  'h1;
                A1394_Phy_Link_HandShake     =  'h1;
            Request_Start_Time               =  0;
            Request_Start_Index              =  1;
                rel_abs                      =  ABSOLUTE;
           end
        1: begin
                IEEE_Spec_Version            =  IEEE1394_1995;
            Stream_Pkts                      =  'h0;
                Pri_Response_Pkts            =  'h0;
                MultiSpeed_Concat            =  'h0;
            Accel_Requests                   =  'h0;
                Pri_Request_Pkts             =  'h0;
                A1394_Phy_Link_HandShake     =  'h0;
            Request_Start_Time               =  2000;
            Request_Start_Index              =  2;
                rel_abs                      =  RELATIVE; //ABSOLUTE;
```

-continued

```
            end
        endcase
//-------------------------------------------------------------------------
        Phy_Status_Generation  =   AUTOMATIC;
        Gap_Count              =   2;//temporary value
        Cycle_Start_Generation =   AUTOMATIC; //MAP_BASED;
        Link_Code_Id           =   Links_Id;
        Cycle_Master_Id        =   12; //Links_Id;
        Link_Core_Channels     =   64'h0000000000000001;
        Pri_Req_Count          =   0;
        PHY_Speed              =   S400
        Data_On_Count          =   2;
        Interface_Mode         =   {LP_DIRECT_MODE,AL_NON_MULTIPLEXED_MODE};
//-------------------------------------------------------------------------
```

The next instruction is the "first" command which will be entered into the test table. It is the Test Environment initialization instruction. This will initialize the test environment internal parameters for things such as which version of the specification we are using (1995/A), if Phy status is manually or automatically generated, what the gap count number is, if the cycle start is manually or automatically generated, what the link and cycle master ID are, what channels the link core will use for isochronous mode, if we are using stream packets priority request and response packets, if we are using multispeed concatenation packets. This instruction is executed at the relative or absolute time (rel_abs) of request_start_index (in the case of relative) or Request_Start_Time for absolute.

The TE_Initialize command will set the test environment in the following modes:

1394 version. Either 1394A or 1394–1995.

Is the phy going to generate status packets from the test or the test environment (manual vs. automatically)?

Sets the internal gap count.

Are cycle start commands generated automatically or from the MAP instruction?

What is the internal ID for the link core?

What is the ID for the cycle master?

What link core channels may be used for isochronous mode of operation?

Are streaming packets allowed?

Are priority response and priority request packets allowed?

Do we support and use multispeed concatenation packets?

Is accelerated request supported?

Does the phy handshake with the link core using the A or 1995 protocol?

If we are using priority request, what is the allowable number of requests?

What is the speed of this phy?

How long will "data_on" be sent at the beginning of each transfer into the link?

What interface mode will the link use on the application and link phy busses?

```
Request_Start_Phase = COMPLETE_PHASE;
TE_INITIALIZE (IEEE_Spec_Version, Phy_Status_Generation, Gap_Count,
               Cycle_Start_Generation, Link_Core_Id, Cycle_Master_Id,
               Link_Core_Channels, Stream_Pkts, Pri-Response_Pkts,
               MultiSpeed_Concat, Accel_Requests, Pri_Request_Pkts,
               A1394_Phy_Link_HandShake, Pri_Req_Count, PHY_Speed,
               Data_On_Count, Interface_Mode, Request_Start_Time, rel_abs,
               Request_Start_Index, Request_Start_Phase);
//-------------------------------------------------------------------------
        Request_Start_Time   =   100;
        Request_Start_Index  =   1;
        Request_Start_Phase  =   COMPLETE_PHASE;
//-------------------------------------------------------------------------
```

The next instruction is the command which will be placed into the teat table. It specifies that the link core will have the reset held active for 5 bus cycles, states the interface mode from above, this command will be executed in a relative time mode, and will execute after the TE_Initialize has completed.

```
Reset_Duration = 5;
LINK_CORE_RESET (Interface_Mode, Reset_Duration, 0, RELATIVE,
    Request_Start_Index, Request_Start_Phase);
//-----------------------------------------------------------------------------------------
//-----------------------------------------------------------------------------------------
// Write the Operation Control Register
// !LPS output, Enable Interrupts, Isoch Cycle Master, Isoch Bypass,
// Async Bypass, !Calc Data CRC, !Calc Hdr CRC, !Reg CRC Async
//-----------------------------------------------------------------------------------------
```

The next instruction is a link core register write command. It will be placed in the test table and executed 100 ns after the link core reset command has completed execution. This is a write to the operation control register address 281(h), and has the following effect:

LPS is deasserted. The link is not requesting access to the Phy or bus.

Interrupts are enabled.

Isochronous cycle master is disabled.

Isochronous bypass mode is enabled, therefore, data stream does contain the header packet.

Asynchronous bypass mode is enabled, therefore, data stream does contain the header packet.

Calculate the data CRC for the packet.

If registered CRC were enabled, they would be used from asynchronous packets.

This command will execute 100 ns after the previous command has completed.

```
Reg  (WRITE, Operational_Control_Address,
        {!LPS_Output, Enable_Interrupts, !Isoch_Cycle_Master, Isoch_Bypass,
        Async_Bypass, !Calc_Data_CRC, !Calc_Hdr_CRC, !Reg_CRC_Type},
        Request_Start_Time, RELATIVE, Request_Start_Index, Request_Start_Phase);
if(IEEE_Spec_Version == P1394a)
begin
    //-----------------------------------------------------------------------------------------
    // Write the 1394a Control Register address 230 (h)
    // Reserved, Async_Streams, Priority_Response, Multispeed_Concat,
    // Send_Cycle_Sync, Priority_Request, A1394_Phy_Link_Handoff,
    // A1394_Enable
    //-----------------------------------------------------------------------------------------
        Request_Start_Time = 100;
```

This next command will be entered into the test table and executed 100 ns after the previous command. This register write, writes the 1394A control register address 280(h). It sets the following:

Enables asynchronous streams.

Enables priority arbitration for response packets.

Enables multispeed concatenation.

Allows the link core to operate per 1394A rules with sending cycle sync requests.

Enables extra requests using priority arbitration.

Enables the link core to operate per the A protocol in handing off the link phy bus.

Enables operation of the 1394A modes of operation.

```
Reg  (WRITE, A1394_Control_Address,
        {Reserved, Async_Streams, Priority_Response, Multispeed_Concat,
        Send_Cycle_Sync, Priority_Request, A1394_Phy_Link_Handoff,
        A1394_Enable}, Request_Start_Time, RELATIVE, Request_Start_Index,
        Request_Start_Phase);
//-----------------------------------------------------------------------------------------
// Write the Priority Request Register address 288 (h),
// the number of priority requests possible in a fairness interval
//-----------------------------------------------------------------------------------------
        Request_Start Time = 100;
```

The next command will be entered into the test table and writes the priority request register. It will be written with a 0, thus, setting the number of extra requests during a fairness interval to 0. This command will be executed 100 ns after the previous command has completed.

```
    Reg  (WRITE, Priority_Request_Address, 'h0,
          Request_Start_Time, RELATIVE, Request_Start_Index.
          Request_Start_Phase);
End // if (IEEE_Spec_Version = = P1394a)
else
begin
//----------------------------------------------------------------
// Write the 1394a Control Register address 280 (h)
// Reserved, !Async_Streams, !Priority_Response, !Multispeed_Concat,
// !Sent_Cycle_Sync, !Priority_Request, !A1394_Phy_Link_Handoff,
// !A1394_Enable
//----------------------------------------------------------------
    Request_State_Time = 100;
```

This next command will be entered into the test table and executed 100 ns after the previous command. This register write, writes the 1394A control register address 280(h). It sets the following:

Disables asynchronous streams.

Disables priority arbitration for response packets.

Disables multispeed concatenation.

Does not allow the link core to operate per 1 394A rules with sending cycle sync requests.

Disables extra requests using priority arbitration.

Disables the link core to operate per the A protocol in handing off the link phy bus.

Disable operation of the 1394A modes of operation.

```
    Reg  (WRITE, A1394_Control_Address,
          {Reserved, !Async_Streams, !Priority_Response, !Multispeed_Concat,
          !Send_Cycle_Sync, !Priority_Request, !A1394_Phy_Link_Handoff,
          !A1394_Enable}, Reqeust_Start_Time, RELATIVE,
          Request_Start_Index, Request_Start_Phase);
    end // else if (IEEE_Spec_Version = = P1394a)
//----------------------------------------------------------------------------
// Write the Interrupt Control Registers
//   Reserved, Intr_Std_Ack, Intr_Delay_Ack_Code, Intr_Ack_Complete,
//   Intr_Cycle_Start, Intr_Phy_Status, Intr_Isoch_Received,
//   Intr_Async_Received,
//
//   Reserved, Intr_Act_Lost, Intr-Bad_Data_CRC, Intr_Bad_Hdr_CRC,
//   Intr_Isoch_Write_Error, Intr_Async_Write_Error, Intr_Isoch_Read_Error,
//   Intr_Async_Read_Error
//
//   Reserved, Reserved, Reserved, Reserved, Reserved, Intr_Missed_Phy_Pkt,
//   Intr_Missed_Isoch_Pkt, Intr_Missed_Async_Pkt
//----------------------------------------------------------------------------
    Request_Start_Time = 100;
    Request_Start_Index = 1;
    Request_Start_Phase = COMPLETE_PHASE;
```

The next register write controls the interrupt control 1 register. It will execute 100 ns after the previous command has completed execution. It will set the following:

Interrupt when receiving an acknowledge pending code following an asynchronous packet.

Interrupt when receiving one of the specified codes following an asynchronous packet.

Interrupt when receiving an ACK complete.

Interrupt when receiving a cycle start packet.

Interrupt on receiving an isoch packet with correct channel number.

Interrupt upon receiving an async packet with dest ID match.

```
    Reg (WRITE, Interrupt_Control_Address,
        {Reserved, Intr_Std_Ack, Intr_Delay_Ack_Code,
         Intr_Ack_Complete,
         Intr_Cycle_Start, Intr_Phy_Status, Intr_Isoch_
         Received,
         Intr_Async_Received}, Request_Start_Time,
         RELATIVE, Request_Start_Index,
         Request_Start_Phase);
```

The next register write controls the interrupt control 2 register. It will execute 100 ns after the previous command has completed execution. It will set the following:

Interrupt when get ACK lost packet.

Interrupt on a bad data CRC.

Interrupt on a bad packet header

Interrupt on an isoch write error.

Interrupt on an async write error.

Interrupt on an isoch read error.

Interrupt on an async read error.

```
    Reg (WRITE, Interrupt_Control2_Address,
        {Reserved, Intr_Ack_Lost, Intr_Bad_Data_CRC,
         Intr_Bad_Hdr_CRC,
         Intr_Isoch_Write_Error,
         Intr_Async_Write_Error, Intr_Isoch_Read_Error,
         Intr_Async_Read_Error},
         Request_Start_Time, RELATIVE, Request_Start_
         Index, Request_Start_Phase);
```

The next register write controls the interrupt control 3 register. It will execute 100 ns after the previous command has completed execution. It will set the following:

Interrupt on a missed phy packet.

Interrupt on a missed isoch packet.

Do not interrupt on a missed async packet interrupt pending.

```
    Reg  (WRITE, Interrupt_Control3_Address,
            {Reserved, Reserved, Reserved, Reserved, Intr_Missed_Phy_Pkt,
            Intr-Missed_Isoch_Pkt, Intr_Missed_Async_Pkt},
            Request_Start_Time, RELATIVE, Request_Start_Index, Request_Start_Phase;
//--------------------------------------------------------------------------------------
// Write the Link ID Address
// With Destination ID Link ID hardcoded to 0 for this test
//--------------------------------------------------------------------------------------
```

The next register write controls the link ID register. It will execute 100 ns after the previous command has completed execution. It will set the upper byte of the link address.

Reg (WRITE, Link_Id_Byte0_Address, Links_Id[7:0],

Request_Start_Time, RELATIVE, Request_Start_Index,

Request_Start_Phase);

The next register write controls the link ID register. It will execute 100 ns after the previous command has completed execution. It will set the upper byte of the link address.

```
    Reg (WRITE, Link_Id_Byte1_Address, Links_Id[15:8],
            Request_Start_Time, RELATIVE, Request_Start_Index,
            Request_Start_Phase);
//--------------------------------------------------------------------
// Set Rcv_Isoch_Channel 0–15 for Rx
//--------------------------------------------------------------------
```

This next register write sets the Isochronous receiver channel number byte 0. This is set to FE as in FFFFFE. It is executed 100 ns after the previous command.

Reg (WRITE, Isoch_Receive_Channel_Number_Byte0_Address, 'hFe,

Request_Start_Time, RELATIVE, Request_Start_Index, Request_Start_Phase);

This next register write sets the Isochronous receiver channel number byte 1. This is set to FF as in FFFFFE. It is executed 100 ns after the previous command.

Reg (WRITE, Isoch_Receive_Channel_Number_Byte1_Address, 'hFF,

Request_Start_Time, RELATIVE, Request_Start_Index, Request_Start_Phase);

This next register write sets the Isochronous receiver channel number byte 2. This is set to FF as in FFFFFE. It is executed 100 ns after the previous command.

```
Reg (WRITE, Isoch_Receive_Channel_Number_Byte2_Address, 'hFF,
Request_Start_Time,RELATIVE, Request_Start_Index, Request_Start_Phase);
//-------------------------------------------------------------------------------
//    Start of Test
//-------------------------------------------------------------------------------
//-------------------------------------------------------------------------------
//    make Link as the Cycle Master and link as source
//    try to send a Isochronous Block Packet command at s100, s200, s400
//    make the Phy as the source of Isoch Block Packet command
//    try to send a Isochronous Block Packet command at s100, s200, s400
//-------------------------------------------------------------------------------
```

Set no retries and set all failure modes to null or zero.

```
    Retry_Amount          =    0;
    Failure_Field         =    0;
    Failure_Data          =    0;
    Failure_Amount        =    0;
    Request_Start_Time    =    100;
    Request_Start_Index   =    1;
    Request_Start_Phase   =    COMPLETE_PHASE;
    Request_Ack_Latency   =    100;
    Request_Ack_Index     =    0;
    Request_Ack_Phase     =    REQUEST_PHASE;

Response_Start_Latency =   100;
    Response_Start_Index   =   0;
    Response_Start_Phase   =   REQUEST_ACK_PHASE;
    Response_Ack_Latency   =   0;
    Request_Ack_Index      =   0;
    Request_Ack_Phase      =   RESPONSE_PHASE;
```

```
        Request_Code  =   ISOC_BLOCK;
        TCode         =   ISOC_BLOCK;
//-----------------------------------------------------------------------------
// Procedure:
// loop on speedcode (S100,S200,S400)
//     link sends a Isoch Block Packet
//     Phy sends a Isoch Block Packet
//
//        a              0 1
//     ------------------------
//        Link sends Isoch Block Pkt 1 2
//        Phy sends Isoch Block Pkt 2 1
//-----------------------------------------------------------------------------
for (Speed_Code = S100 Speed_Code <= S400; Speed_Code = Speed_Code + 'h1)
begin
    Request_Start_IndexL = 1
    Request_Start_IndexP = 1;
    for (a = 0; a < 2; a = a + 1)
    begin
    case (a)
    0;
    begin
    if (Speed_Code = = S100)
        Request_Start_IndexL = 1;
    else
        Request_Start_IndexL = 2;
    Request_Start_IndexP = 1;
    end // case: 0
1:
    begin
        Request_Start_IndexL = -1;
        Request_Start_IndexP = 2;
    end // case: 1
endcase // case (a)
        Dest_Id       =   Phys_Id;
        Source_Id     =   Links_Id;
        TL            =   'h1;
        Retry_Code    =   2'b00;
        Pri           =   'h0;
        Dest_Off      =   'h0;
        Data          =   'h1;
        RCode         =   'h0;
        Channel       =   0;
        Tag           =   0;
        Sync_Code     =   0;
        Length        =   1;
Req_Header_CRC = CRC_Function ({Length, Tag, Channel, TCode, Sync_Code},
                    32'b0, 32'b0, 32'b0,1,FALSE);
                generate_data_crc(Data_Ptr, Length, Data, Data_CRC);
```

Set all subsequent commands for Isochronous block transfers

The following Move Isochronous Packet will use the above generated information to send an Isochronous packet from the link core out the rest of the system.

```
MIP   (Request_Code, Length, Tag, Channel, TCode, Sync_Code,
       Data, Data_Ptr, Req_Header_CRC, Data_CRC, Speed_Code,
       Failure_Field, Failure_Data,
       Request_Start _Time, RELATIVE, Request_Start_IndexL, Request_Start_Phase);
//----------------------------------------------------------------------------------------------------
       Dest_Id          =       Links_Id;
       Source_Id        =       Phys_Id;
       TL               =       'h0;
       Retry_Code       =       2'b00;
       Pri              =       'h0;
       Dest_Off         =       'h0;
       Data             =       'h0;
       RCode            =       'h0;
       Channel          =       1;
       Tag              =       0;
       Sync_Code        =       0;
       Length           =       1;
Req_Header_CRC = CRC_Function ({Length, Tag, Channel, TCode, Sync_Code},
       32'b0, 32'b0, 32'b0, 1, FALSE);
       generate_data_crc (Data_Ptr, Length, Data, Data_CRC);
```

This Move Isochronous Packet command will move data from "some other" node out to the 1394 bus. It should be observed by the link core.

```
MIP   (Request_Code, Length, Tag, Channel, TCode, Sync_Code,
       Data, Data_Ptr, Req_Header_CRC, data_CRC, Speed_Code,
       Failure_Field, Failure_Data,
       Request_Start _Time, RELATIVE, Request Start_IndexP, Request_Start_Phase);
       end // for (a = 0; a < 2;a = a + 1)
end // for (Speed_Code = S100; Speed_Code < = S400; Speed_Code = _
//----------------------------------------------------------------------------------------------------
end // for (version = 0; version <=1; version = version + 1)
       start_test;
end // block: one
```

Appendix 2: Operation of the PLP Slice

Steps:

1. Set up test cases (MAP, MIP, REG)
2. On initialization the complete set of tests to be run is transferred to the action_list. (The Action List is a memory up to Test_Size bits deep) each row in the Action List corresponds to a MAP, MIP, or REG instruction.
3. The PLP Slice emulates the PHY side of the PHY-LINK bus and it is divided into, the following components.

| COMPONENTS | Name as in Test Environment |
|---|---|
| THE TG RULES | plp_tg_rules |
| PLP_TGs | Async_pkt_pplp_tg |
|  | Bus_op_plp_tg |
|  | Isoch_pky_plp_tg |
|  | Phy_pkt_plp_tg |
|  | Phy_status_plp_tg |
|  | Ack_pky_plp_tg |
| THE PM RULES | Lp_pm_rules |

| COMPONENTS | Name as in Test Environment |
|---|---|
| LP_PMs | Async_pkt_lp_pm |
|  | Bus_op_lp_pm |
|  | Isoch_pkt_lp_pm |
|  | Phy_pkt_lp_pm |
|  | Phy_status_lp_pm |
|  | Ack_pkt_lp_pm |
| LP_RESULTS_TABLE | Lp_results_table |

The THE TG RULES and the PLP_TGs together constitute the plp_tg_stub

The THE PM RULES and the LP_PMs together constitute the lp pm_stub

The plp_tg_stub, lp_pm_stub and the lp_results_table together constitute the plp_slice.

PLP_TG_RULES

The plp_tg_rules reads the Action List to check to see if any action needs to be initiated by it. If yes, then the plp_tg_rules checks the present state of the bus from the Results Table, it then applies a set of rules from the specification to ensure that the action required can be initiated. It then provides the data from the Action List to the relevant TG and then enables the TG.

In order for the plp_tg_rules to function it interacts with the Action_list and the Results Table to get its inputs and uses these inputs and rules to generate its outputs which are inputs to the TG.

Some inputs to the plp_rules_tg from the Results Table are available through ports.

The Results Table module is split into two sections

1) The Results Table itself where each row corresponds to a particular transaction (MAP, MIP, or REG). The progress of a transaction can only be entered here if the nexus information to find the index corresponding to a transaction is available.
2) The Partial or Generic section—Where the progress of a transaction is stored before sufficient nexus to store it in the Results Table is available. The intermediate result is available to the plp_tg_rules.

To read the Action List the plp_tg_rules uses the Action List task.

To read the lp_results_table the plp_tg_rules uses the lp_rt_rdwr tasks.

The ports and tasks used by the plp_tg_rules are listed below:

The following ports are used by the rules to receive data from the Results Table.

Partial Line in results Table read through port.
    Results_Table_Enable_i,
    Partial_Valid_Flag_i.
    Partial_Phase_i,
    Partial_LReq_Begin_i,
    Partial_LRreq_End_i,
    Partial_Pkt_Begin_i,
    Ctl_Bus_State_i,

TABLE 1.1

| Port Name | Description |
|---|---|
| Results_Table_Enable_i | Indicates valid data is available in the Results Table when nexus is available |
| Partial_Valid_Flag_i. | Indicates that the entry in the partial section is valid |
| Partial_Phase_i, | Phase information input from the partial section of the Results Table. This is available before nexus is available |
| Partial_LReq_Begin_i, | Gives the time when a Lreq started on the PHY_LINK bus. |
| Partial_LReq_End_i, | Gives the time when a Lreq on the PHY_LINK bus has ended |
| Partial_Pkt_Begin_i, | Time at which packet has started from link |
| Ctl_Bus_State_i, | Is 3 bits wide. Indicates the state on the CTL lines in the PHY_LINK interface. (refer table 1.2) |

TABLE 1.2

| CTL BUS STATE | Description |
|---|---|
| Phy_Idle | Phy is Driving IDLE the Phy_Link Bus |
| Phy_Receive | Phy is Driving on the Phy_Link interface. This indicates that the Phy is receiving a packet |
| Phy_Status | Phy is transmitting status information on the Phy_Link interface |
| Phy_Transmit | Phy is granting the bus to the LINK |
| Link_Idle | Link is Driving IDLE on the Bus |

TABLE 1.2-continued

| CTL BUS STATE | Description |
|---|---|
| Link_Hold | Link is Driving HOLD on the Bus |
| Link_Transmit | Link is Transmitting a packet on the Bus |

The Partial entries indicate state s or conditions on the bus which occur before sufficient information to enter into the Results Table is available.

The following is the Action List task used to read the Action Table. action_list (TG_Rules_Index_res, Request_Code_act, Tcode_act, Source_Id_act,
  Dest_Id_act, TL_act, Pri_act, Length_act, Dest_Off_act,
  Ext_Tcode_act, Retry_Code_act, Rcode_act, Data_act, Data_Ptr,
  Req_Header_CRC_act, Resp_Header_CRC_act, Req_Data_CRC_act,
  Resp_Data_CRCRetry_Amount_act, Speed_Code_act,
  Failure_Data_act, Failure_Field_act, Failure_Amount_act,
  Request_start_Time_act, ReST_ABS_REL_act,
  Request_Start_Index_act, Request_Start_Phase_act,
  Request_ack_Latency_act, AL_ABS_REL_act,
  Request_Ack_Index_act, Request_Ack_Phase_act,
  Response_Start_Latency_act, RpSL_ABS_REL_act, Response,
  Start_Index_act, Response_Start_Phase_act,
  Response_Ack_Latency_act, RpAL_ABS_REL_act,
  Response_Ack_Index_act, Respone_Ack_Phase_act,
  Retry_Start_Latency_act, RetST_ABS_REL_act,
  Retry_Start_Index_act, Retry_Start_Phase_act, Address_act,
  Retry_Start_Index_act, Retry_Start_Phase_act, Address_act,
  Failure_Start_Latency_act, FailST_ABS_REL_act);
Refer ACTION LIST TABLE (Table 1.6)

The following is the task used to read the lp_results_table
lp_rt_read (TG_Rules_Index_res, Dest_Id_res, TL_res, RT_res, TCode_res,
  Pri_res, Source_Id_res, Phase_res, Request_Lreq_Begin_res,
  Request_Lreq_End_res, Request_Begin_res, Request_End_res,
  Ack_Request_Lreq_Begin_res, Ack_Request_Lreq_End_res,
  Ack_Request_Begin_res, Ack_Request_End_res,
  Response_Lreq_Beigin_res, Reponse_Lreq_End_res,
  Response_Begin_res, Response_End_res,
  Ack_Response_Lreq_Begin_res, Ack_Response_Lreq_End_res,
  Ack_Response_Begin_res, Ack_Response_End_res,
  Failure_Type_res, Failure_Expected_res, Failure_Received_res,
  Failure_Begin_res, Failure_End_res);
/--------------------------------------------------------------

All fields read from the ACTION LIST and the RESULTS TABLE are used by the PLP_TG_RULES to initiate operation on the bus. The plp_tg_rules stores all the relevant fields in the form of internal "E variables." All operations in the plp_tg_rules are done based on these internal variables. A combination of E variables constitute a RULE for the plp_tg_rules. All rules are defined as an "E_Rule". When an E_Rule is asserted the plp_tg_rules calls a corresponding task which provides the inputs to TG and Enables the TG.

PLP_TGs

The following are the various outputs from the plp_tg_ rules to the various TGs.

bus_op_plp_tg enable and other field outputs (refer TABLE 1.3.a)
    Enable_Bus_Op_Idle_o,
    Enable_Bus_Op_High_Imp_o,
    Enable_Bus_Op_Grant_o,
ack_pkt_tg enable and other field outputs (refer TABLE 1.3.b)
    Enable_Ack_Pkt_PLP_TG_o
    Enable_Ack_Pky_Data_o
    Ack_Code_o
    Speed-Code_o
phy_status_plp_tg enable and other field outputs (refer TABLE 1.3.c)
    Enable_Phy_Status_PLP_TG_o,
    Enable_Packet_Arriving_o,
    Read_Request_Pending_o,
    Status_Data_o,
async_pkt_plp_tg enable and other field outputs (refer TABLE 1.3.d)
    Enable_Async_Pkt_PLP_TG_o
    Enable_Async_Pkt_Data_o
    Request_Code_o
    Source_Id_o
    Destn_Id_o
    TLabel_o
    TCode_o
    Pri_o
    RT_o
    RCode_o
    Destn_Off_o
    Ext_TCode_o
    Data_Length_o
    Header_CRC_o
    Data_CRC_o
    Data_Ptr_o
    Quadlet_Data_o
isoch_pkt_plp_tg enable and other field outputs (1.3.e)
    Enable_Isoch_Pkt_PLP_TG_o,
    Enable_Isoch_Pkt_Data_o,
    Tag_o,
    Channel_o,
    Sync_Code_o,
    Isoch_Tcode_o,
    Isoch_Data_Length_o,
    Isoch_Header_CRC_o,
    Isoch_Data_Ptr_o,
    Isoch_Data_o,
    Isoch_Data_CRC_o,
phy_pkt_plp_tg enable and other field outputs (1.3.f)
    Enable_Phy_Pkt_PLP_TG_o,
    Enable_Phy_Pkt_Data_o,
    Phy_Pkt_Quad_Data_o,
    Phy_Pkt_Data_Inv_o.

speed Code Input for Various Packets.
    Speed_Code_o,
    TG_AL_Completed_o.

TABLE 1.3.a

| OUTPUT from plp_tg_rules to bus_op_tg | Action initiated by bus_op_tg if OUTPUT value is HIGH |
| --- | --- |
| Enable_Bus_Op_Idle_o | Drive IDLE on the Bus |
| Enable_Bus_Op_High_Imp_o | Drive ZZ on the Bus |
| Enable_Bus_Op_Grant_o | Grant BUS to LINK |

TABLE 1.3.b

| OUTPUT from plp_tg_rules to ack_pkt_plp_tg | DESCRIPTION |
| --- | --- |
| Enable_Ack_Pky_PLP_TG_o Enavl_Ack_Pkt_Data_o | TG registers the data at its input port This signals the TG drive data on the bus as per 1394 protocol. TG Drives DATA_ON from the time Enable_Ack_Pkt_PLP_TG_o is asserted till Enable_Ack_Pkt_Data_o is asserted. |
| Ack_Code_o | Acknowledgement code to be sent (refer ACK TABLE) |
| Speed-Code_o | Speed at which the TG is to operate S100, S200 or S400. |

TABLE 1.3.c

| OUTPUT form plp_tg_rules to phy_status_plp_tg | DESCRIPTION |
| --- | --- |
| Enable_Phy_Status_PLP_TG_o | Status data is driven on the Bus |
| Enable_Packet_Arriving_o | Abort status transfer |
| Read_Request_Pending_o | Status transfer is in response to Phy_Register read request therefore 16 bits of data need to be sent. |
| Status_Data_o | The data to be sent on the bus Status_Data_o is 16 bits wide. The bits are as follows, starting with MSB 15 (the first bit on the bus) and moving toward LSB 0: arbitration reset gap (15), subaction gap (14), bus reset (13), state tinie out (12), address of phy status register read (11 to 8), data at the above phy register address (7 to 0). |

TABLE 1.3.d

| OUTPUT from plp_tg_rules to async_pkt_plp_tg | DESCRIPTION |
| --- | --- |
| Enable_Async_Pkt_PLP_TG_o Enable_Async_Pkt_Data_o | TG registers the data at its input ports This signals the TG to drive data on the bus as per 1394 protocol. TG Drives DATA_ON from the time Enable_Async_Pkt_PLP_TG_o is asserted till Enable_Async_Pkt_Data_o is asserted. |
| Request_code_o | Decides the type of transfer we wish to do |
| Source_Id_o | Address of the source (Initiator of the transaction). Source ID is a 16 bit field, of which on 0–63 are valid within a bus bridge. |
| Destn_Id_o | Destination node for a transaction # legal values 0–62, 63 is used for broadcast packets. |

TABLE 1.3.d-continued

| OUTPUT from plp_tg_rules to async_pkt_plp_tg | DESCRIPTION |
|---|---|
| TLabel_o | Transaction label - unique value for each transaction bit width - 6, legal values 0–63 |
| TCode_o | Transaction code |
| Pri_o | Priority used in backplane environment only. Set to zero here |
| RT_o | Retry code |
| RCode_o | Response code, 2 bits wide |
| These values go into the packet | |
| Destn_Off_o | Destination offset address |
| Ext_Tccode_o | Extended Transaction Code |
| Data_Length_o | Data length of the data block |
| Header_CRC_o | CRC for the Header of the async packet |
| Data_CRC_o | CRC for the Data block in the async packet |
| Data_Ptr_o | Pointer to Type of function. File location used to get the data block |
| Quatdlet_Data_o | Data value for specific async packets that have on quadlet data payload |

TABLE 1.3.e

| OUTPUT from plp_tg_rules to to isoch_pkt_plp_tg | DESCRIPTION |
|---|---|
| Enable_Isoch_Pkt_PLP_TG_p | TG register the data at its input ports |
| Enable_Isoch_Pkt_Data_o | This signals the TG to drive data on the bus as per 1394 protocol. TG Drives DATA_ON from the time Enable_Isoch_Pkt_PLP_TG_o is asserted till Enable_Isoch_Pkt_Data_o is asserted. |
| Tag_o | Tag Code |
| Channel_o | Channel number for reception |
| Sync_Code_o | Synchronization Code |
| Isoch_Tcode_o | Transaction Code (hex A) |
| Isoch_Data_Length_o | Data length of the isochronous data block |
| Isoch_Header_CRC_o | CRC for the Header in the packer |
| Isoch_Data_Ptr_o | Pointer to Select Function to generate Data or to give a file location from which to read user defined data. |
| Isoch_Data_o | The Data to be sent on the bus |
| Isoch_Data_CRC_o | CRC for the data block |

TABLE 1.3.f

| OUTPUT from plp_tg_rules to phy_pkt_plp_tg | DESCRIPTION |
|---|---|
| Enable_Phy_Pkt_PLP_TG_o | TG registers the data at its input ports |
| Enable_Phy_Pkt_Data_o | This signals the TG to drive data on the bus as per 1394 protocol. TG Drives DATA_ON from the time Enable_Phy_Pkt_PLP_TG_o is asserted till Enable_Phy_Pkt_Data o is asserted. |
| Phy_Pkt_Quad_Data_o | The Quadlet data to be sent in the Phy Pakcet |
| Phy_Pkt_Data_Inv_o | Inverse of the Quadlet data, this is part of the packet |

LP_PMs

When a particular TG is enabled it puts out its data on the Phy-Link bus in the required (1394) format. All the data that is put on the bus is received by the LP_PMs. Each of the PMs is designed to observe only a particular Atomic Operation.

On completion of the Atomic Operation the corresponding PM gives an Enable signal to the PM_RULES section along with the contents of the Atomic Operation and its begin and end time.

The following are the outputs from the various PMs to the PM rules section.

INPUTS FROM PMS
  ack_pkt_lp_pm (refer TABLE 1.4.a)
    Ack_Code_PM_i,
    Ack_Speed_Code_PM_i,
    Enable_Ack_Pkt_data_PM_i,
    Start_Time_Ack_Pkt_PM_i,
    End_Time_Ack_Pkt_PM_i,
  async_pkt_lp_pm (refer TABLE 1.4.b)
    Destn_Id_PM_i,
    TLabel_PM_i,
    RT_PM_i.
    Async_TCode_PM_i,
    Pri_PM_i,
    Source_Id_PM_i,
    RCode_PM_i,
    Dest_Off_PM_i,
    Async_Data_Length_PM_i,
    Ext_TCode_PM_i,
    Async_Header_CRC_PM_i,
    Async_Data_CRC_PM_i,
    Valid_Fields_PM _i,
    Quadlet_Data_PM_i,
    Async_Data_PM_i,
    Async_Speed_PM_i,
    Enable_Async_Header_Transmitted_PM_i,
    Enable_Async_Pkt_Data_PM_i,
    Start_Time_Async_PkT_LP_PM_i,
    End_Time_Async_Pkt_LP_PM_i,
  bus_op_lp_pm (refer TABLE 1.4.c)
    Phy_dle_PM_i,
    Phy_Status_PM_i,
    Phy_Receive_PM_i,
    Phy_Data_On_PM_i,
    Phy_Transmit_PM_i,
    Link_PM_i,
    Link_Hold_PM_i,
    Link_Transmit_PM_i,
    Link_Reserved_PM_i,
    Enable_Bus_Op_PM_i,
    Start_Time_Bus_Op_PM_i,
  bus_request_lp_pm (refer TABLE 1.4.d)
    LReq_Request_Type_PM_i,
    LReq_Request_Speed_PM_i,
    LReq_Request_Address_PM_i,
    LReq_Request_Data_PM_i,
    Enable_Bus_Request_Start_PM_i,
    Enable_Bus_Request_Data_PM_i,
    Start_Time_Bus_Request_LP_PM_i,
    End_Time_Bus_Request_LP_PM i,
  phy_status_lp_pm (refer TABLE 1.4.e)
    Arb_Reset_Gap_PM_i,
    Subaction_Gap_PM_i,
    Bus_Reset_PM_i,
    State_Time_Out_PM_i,
    Phy_Request_Address_PM_i,
    Phy_Request_Data_PM_i, Enable_Phy_Status_Data_PM_i,
Start_Time_Phy_Status_PM_i,
End_Time_Phy_Status_PM_i,
isoch_pkt_lp, m (refer TABLE 1.4.f)
    Isoch_TCode_PM_i,
    Isoch_Data_Length_PM_i,
    Tag_PM_i,
    Channel_PM_i,
    Sync_Code_PM_i,
    Isoch_Header_CRC_PM_i,
    Isoch_Data_CRC_PM_i,
    Isoch_Data_PM_i,
    Enable_Isoch_Header_Transmitted_PM_i,
    Enable_Isoch_Pkt_Data_PM_i,
    Start_Time_Isoch_Pkt_LP_PM_i,
    End_Time_Isoch_Pkt_LP_PM_i,
    Isoch_Speed_LP_PM_i,
phy_pkt_lp_pm (refer TABLE 1.4.g)
    Enable_Phy_Pkt_Data_i,
    Phy_Pkt_Data_i,
    Phy_Pkt_Data_Inv_i,
    Start_Time_Phy_Pkt_LP_PM_i,
    End_Time_Phy_Pkt_LP_PM_i,

TABLE 1.4.a

| INPUTS form ack_lp_pm to lp_pm_rules | DESCRIPTION |
|---|---|
| Ack_Code_PM_i | The acknowledge code as received from any ACK packet on the bus. |
| Ack_Speed_Code_PM_i | Speed at which the ACK packet is sent on the bus |
| Enable_Ack_Pkt_Data_PM_i | High when an ACK packet is detected on the bus |
| Start_Time_Ack_Pkt_PM_i | Time at which an ACK packet started on the bus |
| End_Time_Ack_Pkt_PM_i | Time at which an ACK packet ended |

TABLE 1.4.b

| INPUTS from async_pkt_lp_pm to lp_pm_rule | DESCRIPTION |
|---|---|
| Destn_Id_PM_i | Destination_ID as in the async packet |
| Tlabel_PM_i | Transaction label in the async packet |
| RT_PM_i | Retry code in the async packet |
| Async_TCode_PM_i | Transaction code in the async packet |
| Pri_PM_i | Priority field in the async packet |
| Source_Id_PM_i | Source ID in the async packet |
| Rcode_PM_i | Response code in the async packet |
| Dest_Off_PM_i | Destination offset in the async packet |
| Async_Data_Length_PM_i | Data length field in the async packet |
| Ext_TCode_PM_i | Extended Tcode field in the async packet |
| Async_Header_CRC_PM_i | Header CRC in the async packet |
| Async_Data_CRC_PM_i | Data CRC in the async packet |
| Valid_Fields_PM_i | Indicates which of the outputs of this PM are valid for a particular type of packet |
| Quadlet_Data_PM_i | Quadlet data payload of the async packet |
| Async_Data_PM_i | The Data in bytes if Data is larger than a quadlet (data block) |
| Async_Speed_PM_i | Speed of the async packet |
| Enable_Async_Header_transmit- ted_PM_i | High for 1 clock cycle when the header part of an async packet is transmitted |
| Enable_Async_Pkt_Data_PM_i | High for 1 clock cycle when the async packet has ended |
| Start_Time_Async_PkT_LP_PM_i | Time at which an incoming or outgoing async packet started |
| End_time_Async_Pkt_LP_PM_i | Time at which an incoming or outgoing async packet ended |

TABLE 1.4.c

| INPUTS from bus_op_lp_pm to lp_pm_rules | DESCRIPTION |
|---|---|
| Phy_Idle_PM_i | PHY is driving IDLE on the bus (CTL = 00) |
| Phy_Status_PM_i | PHY is driving STATUS information on the bus (CTL = 01) |
| Phy_Receive_PM_i | PHY is driving RECEIVE on the bus (CTL = 10) |
| Phy_Data_On_PM_i | PHY is driving DATA ON (FF) on the bus D = FF |
| Phy_Transmit_PM_i | PHY is driving TRANSMIT on the Bus CTL = 11 |
| Link_Idle_PM_i | LINK is driving IDLE on the bus |
| Link_Hold_PM_i | LINK is driving HOLD on the bus |
| Lind_Transmit_PM_i | LINK ID driving TRANSMIT on the bus CTL = 10 (link is driving) |
| Link_Reserved_PM_i | LINK is Driving the reserved value on the bus (CTL = 11) |
| Enable_Bus_Op_PM_i | Bus on Pm is active and ready to give out data |
| Start_Time_Bus_Op_Pm_i | Time at which the current bus operation started |

TABLE 1.4.d

| INPUTS from bus_request_lp_pm to lp_pm_rules | DESCRIPTION |
|---|---|
| Lreq_Request_Type_PM_i | Type of Link request (refer table 1.6 for types of Lreq) |
| Lreq_Request_Speed_PM_i | The Speed field in the link request |
| Lreq_Request_Address_PM_i | The Address field in the Lreq, if the request was of type WrReg or RdReg |
| Lreq_Reuqest_Data_PM_i | The Data field in the Lreq, if the request was of type WrReg or RdReg |
| Enable_Bus_Request_Start_PM_i | This shows when a bus request has started |
| Enable_Bus_Request_Data_PM_i | This goes HIGH at the end of the BUS request |
| Start_Time_Bus_Request_LP_PM_i | Start time of a Bus request |
| End_Time_Bus_Request_LP_PM_i | End time of a Bus request |

TABLE 1.4.e

| INPUTS from phy_status_lp_pm to lp_pm_rules | DESCRIPTION |
|---|---|
| ARB_Reset_Gap_PM_I | An arbitration reset gap bit was set in a PHY status transfer |
| Subaction_Gap_PM_I | A subaction gap bit was set in a PHY status transfer packet |
| Bus_Reset_PM_I | A bus reset bit was set in a PHY status transfer packet |

TABLE 1.4.e-continued

| INPUTS from phy_status_lp_pm to lp_pm_rules | DESCRIPTION |
|---|---|
| State_Time_Out_PM_I | State time out bit was set in a PHY status transfer packet |
| Phy_Request_Data_Address_PM_I | The Address field in a PHY status transfer |
| Phy_Reuqest_Data_PM_I | The Data Field in a PHY status packet |
| Enable_Phy_Status_Data_PM_i | High when a PHY status packet end on the bus |
| Start_Time_Phy_Status_PM_i | Start time of a PHY status transfer on the bus |
| End_Time_Phy_Status_PM_i | End time of a PHY status transfer on the bus |

TABLE 1.4.f

| INPUTS from isoch_pkt_lp_pm to lp_pm_rules | DESCRIPTION |
|---|---|
| Isoch_TCode_PM_i | Transaction code in the Isoch packet |
| Isoch_Data_Length_PM_i | Data length field in the Isoch packet |
| Tag_PM_i | Tag Code field in the Isoch packet |
| Channel_PM_i | Channel Number field in the Isoch packet |
| Sync_Code_PM_i | Synchronization code field in the Isoch packet |
| Isoch_Header_CRC_PM_i | Header CRC value in the Isoch packet |
| Isoch_Data_CRC_PM_i | Data CRC value in the Isoch packet |
| Isoch_Data_PM_i | Isochronous data in the Isoch packet |
| Enable_Isoch_Header_Transmitted_PM_I | High when the header of the Isoch packet has been received |
| Enable_Isoch_Pkt_Data_PM_i | High when the entire Isoch packet has been received |
| Start_Time_Isoch_Pkt_LP_PM_i | Time at which the Isoch packet transfer started |
| End_Time_Isoch_PPkt_LP_PM_i | Time at which the Isoch packet transfer ended |
| Isoch_Speed_LP_PM_i | Speed of the isochronous transfer |

TABLE 1.4.g

| INPUTS from phy_pkt_lp_pm to lp_pm_rules | DESCRIPTION |
|---|---|
| Enable_Phy_Pkt_Data_i | HIGH when a Phy packet has ended |
| Phy_Pkt_Data_i | First Quadlet in a Phy packet |
| Phy_Pkt_Data_Inv_i | Second Quadlet of the PHY packet |
| Start_Time_Phy_Pkt_LP_PM_i | Time at which a Phy packet transfer started on the bus |
| End_Time_Phy_Pkt_LP_PM_i | Time at which a Phy packet transfer on the bus ended |

LP_PM_RULES

The PM RULES SECTION based on the inputs form the PMs compute a set of internal E variables on which the LP PM rules operates to generate outputs to the Results Table. All the operations in the PM RULES is based on these E variables.

As in the PLP_TG_RULES the E variables are combined to form "E_Rules". Each E_Rule corresponds to a particular requirement specified by the standard.

The Rules Section apply the E_Rules to validate and enter the progress of a transaction into the Results Table.

The lp_pm_rules interacts with the lp_results_table and Action List.

Writing to the Results Table is through ports.

Reading the Action List is thru the action_list task

Reading the Results Table is through the lp_rt_read task.

Writing the Results Table during initialization is through the lp_rt_write task.

The ports used to write the Results Table are

Phase_RT_o, // output to RT

Partial_Phase_RT_o,

Index_RT_o,

Ctl_Bus_State_RT_o,

Dest_Id_RT_o,

Source_Id_RT_o,

TCode_RT_o,

Pri_RT_o,

TLabel_RT_o,

RT_Code_RT_o,

Lreq_Type_RT_o,

Lreq_Addr_RT_o,

Lreq_Data_RT_o,

Time_Begin_RT_o,

Time_End_RT_o,

Failure_Type_RT_o,

Failure_Expected_RT_o,

Failure_Received_RT_o,

Results_Enable_Nexus_RT_o,

Partial_Result_Enable_RT_o,

Copy_Partial_RT_o,

TABLE 1.5

| OUTPUT from Results Table | DESCRIPTION |
|---|---|
| Phase_RT_o | Phase output from the Results Table |
| Partial Phase_RT_o | Partial Phase Output |
| Index_RT_o | Index of transaction |
| Ctl_Bus_State_RT_o | Control bus state |
| Dest_Id_RT_o | Destination ID of the transaction |
| Source_Id_RT_o | Source ID of the transaction |
| Tcode_RT_o | Transaction Code |
| Pri_RT_o | Priority |
| Tlabel_RT_o | Transaction Label |
| RT_Code_RT_o | Retry code |
| LReq_Type_RT_o | Link request type |
| LReq_Addr_RT_o | Address field in the LReq packet |
| LReq_Data_RT_o | Data field in the LReq packet |
| Time_Begin_RT_o | Start time of present Atomic Operation |
| Time_End_RT_o | End time of the present Atomic Operation |
| Failure_Type_RT_o | Specifies the erroneous field in a packet |
| Failure_Expected_RT_o | If a failure occurs in one of the fields this gives correct (expected) value of the field from the Action List |
| Failure_Received_RT_o | If a failure occurs, this gives the corrupted value as received from the packet |
| Results_Enable_Nexus_RT_o | Flags that the nexus for a transaction is found |
| Partial_Result_Enable_RT_o | Enabled when sufficient nexus information is not available |

TABLE 1.5-continued

| OUTPUT from Results Table | DESCRIPTION |
|---|---|
| Copy_Partial_RT_o | If high, nexus is available therefore the entries in the partial section can be transferred to the index corresponding to the transaction |

Task to read action_list—Action List task

The Action List task takes the Index value as input from the plp_tg_rules and gives the various Action List fields as outputs.

TABLE 1.6

I/O arguments of action_list task and their Description

Note:
"_act" suffix signifies an Action List variable

| | DESCRIPTION |
|---|---|
| INPUTS | |
| Index | Index value of the Action List row to be read |
| OUTPUTS | |
| Request_Code_act | Request Code * (refer Request code table). Specifies the type of transaction |
| Tcode_act | Transaction code field, to be inserted as is to the packet |
| Source_Id_act | Source node ID of the transaction, to be used to determine if the transaction has to be intiated by this node. This field is inserted as is to the packet |
| Dest_Id_act | Destination node of the transaction this field is inserted as in the asynchronous packet |
| TL_act | Transaction label |
| Pri_act | Priority |
| Length_act | Data Length in packet |
| Dest_Off_act | Destination offset |
| Ext_Tcode_act | Extended Tcode |
| Retry_Code_act | Retry code |
| RCode_act | Response code |
| Data_act | Data quadlet to be sent in the packet |
| Data_Ptr_act | Data pointer, used to determine the function used to generate data in case of data block packets or to select file from which data is to be read |
| Req_Header_CRC_act | Header CRC for the request packet |
| Resp_Hearder_CRC_act | Header CRC for the response packet |
| Req_Data_CRC_act | Data CRC for requests packets/isoch packet having data blocks |
| Resp_Data_CRC_act | The number of times this particular transaction is to be repeated with failures. This field is used only by the test environment and not a part of the packet on the bus |
| Speed_Code_act | Speed at which the transaction is be done |
| Failure_Data_act | Test environment variable to determine which bits in the field selected for failure need to be toggled |
| Failure_Field_act | Select the Field that is to be Failed or corrupted |
| Failure_Amount_act | The number of times the failure is to be repeated |
| Request_Start_time_act | The time at which the request subaction is to be started. This time can be absolute w.r.t. to system time or it can be relative to some preceeding transaction phase that has completed |
| ReST_ABS_REL_act | Flag indicates if the Request_start_time field is an Absolute or Relative value |
| Request_Start_Index_act | This field has valid data only if the Request_Start_Time_act is specified as relative. It gives the relative index of the Transaction to which the present transaction is relative to. The Index of the transaction to be used to get the actual start time of present transaction = (Present Index − Request_Start_Index_act) |
| Request_Start_Phase_act | This field indicates which phase of the reference transaction the present transaction is relative to. The possible phases are: Request_Phase Request_ack_Phase Response_Phase Response_ack_Phase |
| Request_Ack_Latency_act | The time at which the ACK for a request packet has to be sent |
| RAL_ABS_REL_act | If the Request_Ack_Latency_act time is absolute or relative ABSOULTE = 0 RELATIVE = 1 |
| Request_Ack_Index_act | If relative, the relative index of the reference transaction |
| Request_Ack_Phase_act | If relative, the phase of the referenced transaction to which the sending of the ACK for the request packet is to be made relative to |
| Response_Start_Latency_act | The time at which the response subaction is to be start. This time can be absolute w.r.t to sytsem time or it can be relative to some preceeding transaction phase that has completed |
| RpSL_ABS_REL_act | Flag indicaties if the response_start_time field is an Absolute or Relative value |
| Resonse_Start_Index_act | Relative index of the referenced transaction |
| Response_Start_Phase_act | Phase of the referenced transaction to which the present transaction is to be made relative |
| Response_Ack_Latency_act | The time at which the ACK for a request packet has to be sent |
| RpAL_ABS_REL_act | If the Request_Ack_Latency_act time is absolute or relative ABSOLUTE = 0 RELATIVE = 1 |
| Response_Ack_Index_act | If relative, the relative index of the referenced transaction |
| Response_Ack_Phase_act | If relative, the phase of the referenced transaction to which the sending of the ACK for the request packet is to be made relative to |
| Retry_Start_Latency_act | Time at which the request or response has to be retried |
| RetST_ABS_REL_act | If the Retry_ABS_REL_act is absolute or relative ABSOLUTE = 0 RELATIVE = 1 |
| Retry_Start_Index_act | If relative, the relative index of the referenced transaction |
| Retry_Start_Phase_act | If relative, the phase of the referenced transaction to which the sending of the ACK for the request packet is to be made relative to |
| Address_act | The register address in the link core: not used in the plp slice |
| Failure_Start_Latency_act | Failure start time |

-continued

| DESCRIPTION | |
|---|---|
| FailST_ABS_REL_act | If the Failure_Start_Latency_act is absolute or relative:<br>ABSOLUTE = 0<br>RELATIVE = 1 |

The p_rt_read task is used to read the lp_results_table.

TABLE 1.7

| INPUTS | DESCRIPTION |
|---|---|
| Index | Index corresponding to transaction |
| OUTPUTS | DESCRIPTION of the field in lp Results Table |
| Dest_Id | Destination node ID |
| TL | Transaction label |
| RT | Retry Code |
| Tcode | Transaction Code |
| Pri | Priority |
| Source_Id | Source node ID |
| Phase | Cummulative Phase |
| Request_Lreq_Begin | Start time of a link request to send a request packet |
| Request_Lreq_end | End time of a link request to send a request packet |
| Request_begin | Start time for request packet |
| Request_end | End time for a request packet |
| Ack_Request_Lreq_Begin | Start time of a link request of type immediate to send an acknowledge for a request packet |
| Ack_Request_Lreq_End | End time of a link request of type immediate to send an acknowledge for a request packet |
| Ack_Request_Begin | Start time for an acknowledge packet for a request |
| Ack_Request_End | End time for an acknowledge packet for a request |
| Response_Lreq_Begin | Start time of a link request to send a response packet |
| Response_Lreq_End | End time of a link request to send a response packet |
| Response_Begin | Start time for a response packet |
| Response_End | End time for a response packet |
| Ack_Response_Lreq_Begin | Start time of a link request of type immediate to send an acknowledge for a response packet |
| Ack_Response_Lreq_End | End time of a link request of type immediate to send an acknowledge for a response packet |
| Ack_Response_Begin | Start time of the acknowledge packet for a response |
| Ack_Response_End | End time of the acknowledge packet for a response |
| Failure_Type | Specifies the erroneous field in a packet |
| Failure_Expected | If a failure occurs in one of the fields, this gives correct (expected) value of the filed form the Action List |
| Failure_Received | If a failure occurs, this gives the corrupted value as received from the packet |
| Failure_Begin | Start time of the transaction which has a failure |
| Failure_End | End time of the transaction which has a failure |

Task to write results able during intitialization.

Lp_rt_write (RT_Index_i, Dest_Id_i, TL_i, RT_i, TCode_i, Pri_i, Source_Id_i,
  Phase_i, Request_Lreq_Begin_i, Request_Lreq_End_i,
  Request_Begin_i, Request_End_i, Ack_Request_Lreq_Begin_i,
  Ack_Request_Lreq_End_i, Ack_Request_Begin_i,
  Ack_Request_End_i, Response_Lreq_Begin_i,
  Response_Lreq_End_i, Resonse_Begin_i, Response_End_i,
  Ack_Response_Lreq_Begin_i, Ack_Response_Lreq_End_i,
  Ack_Response_Begin_i, Ack_Response_End_i, Failure_Type_i,
  Failure_Expected_i, Failure_Received_i, Failure_Begin_i,
  Failure_End_i);

Apart from the above tasks the lp_pm_rules uses a look_up task to find the Index of a transaction on the bus. It then uses this Index to enter the progress of this transaction into the Results Table.

Look_Up (look_up_type, Dest_Id_RT_o, Tlabel_RT_o, Tcode_RT_o,
  Source_Id_RT_o, Index_RT_o, Phase_res, Length_act, Dest_off_act,
  Ext_Tcode_act, Rcode_act, Data_act, Data_Ptr,
  Req_Header_CRC_act, Resp_Header_CRC_act, Data_CRC_act,
  Retry_Amount_act, Speed_Code_act, Failure_Data_act,
  Failure_Field_act, Failure_Amount_act);

TABLE 1.8

LOOK UP Task

| I/O arguments | DESCRIPTION |
|---|---|
| Look_up_type | Takes three possible values: depending on when the Look_up task is called<br>Look_Up_Initialize<br>Look_Up_Nexus<br>Look_Up_Status |
| Dest_Id_RT_o | Destination ID from Results Table |
| Tlabel_RT_o | Transaction label from Results Table |
| TCode_RT_o | Transaction code from Results Table |
| Source_RT_o | Source If from Results Table |
| Index_RT_o | Index of transaction from Results Table |
| Phase_res | Phase from Results Table |
| Length_act | Data length |
| Dest_Off_act | Destination offset from Action List |
| Ext_Tcode_act | Extended Transaction code from Action List |
| RCode_act | Response Code from Action List |
| Data_act | Data from Action List |
| Data_Ptr_act | Data Pointer from Action List |
| Req_header_CRC_act | Header CRC for the request |
| Resp_Header_CRC_act | Header_CRC for the response |
| Data_CRC_act | Data CRC of the packet |
| Retry_Amount_act | Retry Amount |
| Speed_Code_act | Speed code from the Action List |
| Failure_Data_act | Failure data from Action List |
| Failure_Field_act | Failure Field from Action List |
| Failure_Amount_act | Failure Amount from Action List |

The Bus Op PM is used to observe the various transitions on the LP bus and flag any errors in bus transitions.

When the Data is entered into the Results Table it is available for use by the plp_tg_rules to initiate the next operation.

TABLE 1.9

Phase Values used by the lp_pm_rules

| PHASE | DESCRIPTION |
|---|---|
| Initialize | Transaction has not started |
| Complete | Request and Response subaction of a MAP are both completed |
| Failure | Indicates a Failure in the Transaction |
| Start_Req_Arb | Start of a Fair Arbitration for Request subaction |
| End_Req_Arb | End of a Fair Arbitration for Request Subaction |
| Lost_Req_Arb | Fair Arbitration for Request Subaction is Lost |
| Retry_Req_Arb | Fair Arbitration for Request Subaction is Retired |
| Won_Req_Arb | Fair Arbitration for Request Subaction is won |
| Start_Request | Link has started sending a request packet |
| Request_Received | A request packet has been received by the link from the serial bus |
| Re_Request | A request packet is a retired request |
| Request_Finished | A request packet has finished |
| Start_Req_Lreq_Ack | Start of arbitration of type immediate to send an acknowledge for a request packet |
| End_Req_Lreq_Ack | End of arbitration of type immediate to send an acknowledge for a request packet |
| Request_Ack_Complete | The acknowledge type received for a request packet was ack_complete |
| Request_Ack_Pending | The acknowledge type received for a request packet was ack_pending |
| Request_Ack_Reserved | The acknowledge type received for a request packet was reserved value |
| Request_Ack_Busy_A | The acknowledge type received for a request packet was ack_Busy_A |
| Request_Ack_Busy_B | The acknowledge type received for a request packet was ack_Busy_B |
| Request_Ack_Busy_X | The acknowledge type received for a request packet was ack_Busy_X |
| Request_Ack_Data_Error | The acknowledge type received for a request packet was ack_data_error |
| Request_Ack_Type_Error | The acknowledge type received for a request packet was ack_Type_error |
| Start_Resp_Arb | Fair Arbitration for response subaction has started |
| End_Resp_Arb | Fair Arbitration for response subaction has ended |
| Lost_Resp_Arb | Fair Arbitration for response subaction is lost |
| Retry_Resp_Arb | Fair Arbitration for response subaction is retired |
| Won_Resp_Arb | Link has start sending a response packet |
| Start_Response | Link has started sending a response packet |
| Response_Received | A response packet has been received by the link from the serial bus |
| Re_Response | A response packet is a retired response |
| Response_Finished | A response packet has finished |
| Start_Resp_Lreq_Ack | Start of arbitration of type immediate to send an acknowledge for a response packet |
| End_Resp_Lreq_Ack | End of arbitration of type immediate to send an acknowledge for a response packet |
| Response_Ack_Complete | The acknowledge type received for a response packet was ack_complete |
| Reponse_Ack_Pending | The acknowledge type received for a response packet was ack_pending |
| Reponse_Ack_Reserved | The acknowledge type received for a response packet was reserved value |
| Reponse_Ack_Busy_A | The acknowledge type received for a response packet was ack_Busy_A |
| Reponse_Ack_Busy_B | The acknowledge type received for a response packet was ack_Busy_B |
| Reponse_Ack_Busy_X | The acknowledge type received for a response packet was ack_Busy_X |
| Reponse_Ack_Data_Error | The acknowledge type received for a response packet was ack_data_error |
| Reponse_Ack_Type_Error | The acknowledge type received for a response packet was ack_Type_error |

Partial phases are used to enter information in the results_table when nexus information to relate a transaction to an Index in the result_table is not available to the lp_pm_rules.

TABLE 1.10

Phases for partial entry

| PHASE | DESCRIPTION |
|---|---|
| Start_Arb | A Fair Arbitration has started |
| End_Arb | A Fair Arbitration has ended |
| Lost_Arb | A Fair Arbitration is lost |
| Retry_Arb | A Fair Arbitration is retired |
| Won_Arb | A Fair Arbitration has been won |
| Start_Packet | An Asynchronous packet transfer has started |
| Start_Imm | An arbitration of type immediate has started |
| End_Imm | An arbitration of type immediate has ended |
| End_Pri | An arbitration of type Priority has ended |
| End_Iso | An arbitration of type Isochronous has ended |
| Concatenated_Packet | A concatenated packet has occurred on the bus |
| Data_Started | "Data on" on the serial bus |

Depending on which phase of the transaction is on, the lp_pm_rules enter the phase information into the Results Table.

The Phase field in the Results Table is presently 52 bits wide (Expandable). Whenever a new phase occurs it is bitwise ORed with the phase field in the result table. The phase thus has cummulative information on the progress of a transaction.

This Phase information is read from the Results Table by the plp_tg_rules.

For every phase of the transaction the plp_tg_rules has a corresponding E variable. To derive the E Flag from the cummulative phase, the Phase_res (Phase value from the Results Table) is bitwise ANDed with the phase value and then Bitwise ORed.

E_XXXXXXXX=(Phase_res & XXXXXXX)

TABLE 1.11

The E Flags used in the plp_tg_rules are

| E Flag | Derived from |
|---|---|
| Link Request | |
| E_Start_Req_Arb | \|Phase_res & Start_Req_Arb |
| E_End_Arb | \|Phase_res & End_Req_Arb |
| E_Won_Req_Arb | \|Phase_res & Won_Req_Arb |
| E_Lost_Req_Arb | \|Phase_res & Lost_Req_Arb |
| E_Retry_Req_Arb | \|Phase_res & Retry_Req_Arb |
| Request Packet | |
| E_Start_Request | \|Phase_res & Start_Request |
| E_Request_Received | \|Phase_res & Request_Received |
| E_Re_Request | \|Phase_res & Re_Request |
| E_Request_Finished | \|Phase_res & Request_Finished |

TABLE 1.11-continued

The E Flags used in the plp_tg_rules are

| E Flag | Derived from |
|---|---|
| Request AckLreq | |
| E_Start_Req_Lreq_Ack | \|Phase_res & Start_Req_Lreq_Ack |
| E_End_Req_Lreq_Ack | \|Phase_res & End_Req_Lreq_Ack |
| Request Ack Packet | |
| E_Req_Ack_Complete | \|Phase_res & Request_Ack_Complete |
| E_Req_Ack_Pending | \|Phase_res & Request_Ack_Pending |
| E_Req_Ack_Busy | \|((Phase_res & Request_Ack_Busy_A) |
| | \|\|(Phase_res & Request_Ack_Busy_B) |
| | \|\|(Phase_res & Request_Ack_Busy_X)) |
| E_Req_Ack_Error | \|((Phase_res & Request_Ack_Data_Error)\|\|Phase_res & Request_Ack_Type_Error)) |
| Response Packet Lreq | |
| E_Start_Resp_Arb | \|(Phase_res & Start_Resp_Arb) |
| E_End_Resp_Arb | \|(Phase_res & End_Resp_Arb) |
| E_Won_Resp_Arb | \|(Phase_res & Won_Resp_Arb) |
| E_Lost_Resp_Arb | \|(Phase_res & Lost_Resp_Arb) |
| E_Retry_Resp_Arb | \|(Phase_res & Retry_Resp_Arb) |
| Response Packet | |
| E_Start_Response | \|(Phase_res & Start_Response) |
| E_Response_Received | \|(Phase_res & Response_Received) |
| E_Req_Response | \|(Phase_res & Re_Response) |
| E_Response_Finished | \|(Phase_res & Response_Finished) |
| Response AckLreq | |
| E_Start_Resp_Lreq_Ack | \|(Phase_res & Start_Resp_Lreq_Ack) |
| E_End_Resp_Lreq_Ack | \|(Phase_res & End_Resp_Lreq_Ack) |
| Response Ack Packet | |
| E_Resp_Ack_Complete | \|(Phase_res & Response_Ack Complete) |
| E_Resp_Ack_Pending | \|(Phase_res & Response_Ack_Pending) |
| E_Resp_Ack_Busy | \|((Phase_res & Response_Ack_Busy_A)\|\|(Phase_res & Response_Ack_Busy_B)\|\|(Phase_res & Response_Ack_Busy_X)); |
| E_Resp_Ack_Error | \|((Phase_res & Response_Ack_Data_Error)\|\|(Phase_res & Response_Ack_Type_Error)) |

E_Rule Example:

The development of an E_Rule is illustrated below. The E_Rule is based on a corresponding "rule" which follows.

Rule_J_3_1_3: ImmReq, take control of the Bus immediately on detecting IDLE; do not arbitrate; used for acknowledge transfers.

To send an acknowledge for a request packet the link has to be granted the bus. The Immediate Request for the bus is made during the reception of a REQUEST PACKET.

E_End_Req_Lreq_Ack—Is set when the Link request of type IMMEDIATE to send the acknowledge for a request packet ends E_request_Finished—Is set when the link has finished receiving the request packet If the Link has sent a Lreq of Type IMMEDIATE (E_end_Lreq_Ack) during the reception of the request packet and it has completed reception of the request packet (E_Request_Finished), then the link can be granted the bus when the PHY-LINK bus becomes IDLE (E_Bus_Idle).

Grant the bus only if the acknowledge for the request packet has not already been sent (!E_Req_Pkt_Ack_Sent).

E_Rule_J_3_1_3=
    E_End_Req_Lreq_Ack &&
    E_Request_Finished &&
    E_Bus_Idle &&
    (!E_Req_Pkt_Ack_Sent);

Appendix 3: High-Level Presentation of Test Generation

| Basic Information | |
|---|---|
| Link Core | Test Environment |
| >>High level Registers | >>Commands |
| Operational Control | MAP |
| 1394 A Control | MIP |
| + Priority Control | Reg |
| Interrupt Controls | TE_INITIALIZE |
| Link ID Address | LINK_CORE_RESET |
| Isoch Receive Channels | |

Tests can be written on the phy side or the application side. The TE automatically generates the traffic, monitors the bus for the 1394 protocol, and generates the information on the success of the test.

All Test can be written using these five Commands
1. MAP—Move Async. Packet
2. MIP—Move Isoch. Packet
3. Reg—Read/Write Link Core Register
4. TE INITIALIZE—Initialize the TE
5. Link_Core_Reset—Reset the Link Core for a specified duration (Note, there are also other instructions performing specific tasks, such as CRC_Function, which computes the CRC value).

Initialization accomplishes the following tasks:

Specify mode for link core oepration (1394-1995 or 1394a);

Initialize link core ID; the TE gets all other IDs;

Decide cycle master;

Select channels on which tehe link core sends isoch packets;

Choose the mode for phy status generation (automatic generation from TE/Test based—MAP)

Choose the mode for cycle start generation (automatic generation from TE or link core/Test based—MAP);

Select the mode of interface with the phy layer (LP_Direct/LP_Differential, AL_Multiplexed/AL_Non-multiplexed).

How the TE is Organized for Simulation

The Makefile is used for running simulations. It concatenates the files top_header, aal_slice_header, plp_slice_header, core_header and the Test file into a single file before simulation.

top_header—Includes variable definitions and also definitions for functions and tasks used in the test (MAP, MIP, Reg, TE_INITIALIZE, LINK_CORE_RESET)

aal_slice_header—Includes the instantiation of AAL slice for the top module plp_slice_header—Includes the instantiation of PLP slice for the top module Test file—The functions and tasks defined in the top_header are called in the test file to make entries into the Action List Structure of a Test
Initial
Begin—all commands are to be included within an initial block, to load the action list, for the list of action to be performed by the TE.
  TE_INITIALIZE—performed at absolute time 0, to initialize the TE
  LINK_CORE_RESET—performed after the TE has been initialized, to reset the link core
  REG—performed to initialize the registes in link core to the values as required by the test plan
  MAP—load the Action List with the required async transaction
  MIP—load the Action List with required isoch transaction
  Start_test—start the simulatio after the Action List has been loaded
End
The "TE INITALIZE" Task
TE_INITIALIZE (IEEE_Spec_Version, Phy_Status_Generation, Gap_Count,
  Cycle_Start_Generation, Link_Core_Id, Cycle_Master_Id,
  Link_Core_Channels, System_Params_Modified, Request_Start_Time,
  ABSOLUTE, Request_Start_Index, Request_Start_Phase)
IEEE_Spec_Version P1394a or IEEE1394-95
Phy_Status_Generation AUTOMATIC or MAP_BASED
Gap_Count Indicates the max. no. of hops in a network between 2 nodes (refer 1394 Spec for more details)
Cycle_Start_Generation AUTOMATIC or MAP_BASED
The "TE_INITALIZE" Task
Link_Core_Id The value Like ID assigned to the Link Core in the Test Environment
Cycle_Master_Id When the Link Core needs to be the Cycle master this value is same as the Link Id, else it takes all other values other than Link Id
Link_Core_Channels Defines the Channels to be owned by the Link Core for sending Isochronous Data.
Bits valid only for P1394A
Stream_Pkt, Pri_Response_Pkts, MultiSpeed_Concat, Accel_Requests,
Pri_Request_Pkts, A1394_Phy_Link_HandShake, Pri_Req_Count, PHY_Speed
Data_On_Count A measure of the Data On time before a packet is sent from the PHY layer. (Refer 1394 Spec for more details)
Interface_Mode
  LP_DIRECT_MODE or
  LP_DIFFERENTIATED_MODE,
  AL_NON_MULTIPLEXED_MODE or
  AL_MULTIPLEXED_MODE
The "Reg" Instruction
Reg
  (Request_Code, Address, Data, Request_Start_Time, ReST_ABS_REL, Request_Start_Index, Request_Start_Phase);
Request_Code—An instruction for the Test Environment for the kind of operation to perform, a Link Core register READ/WRITE.
Address—Address of register in the Link Core.
Data—Data to be written into the Link Core, or compared with while reading from the Link.
ReST_ABS_REL—A binary variable, indicating whether the transaction is to executed at absolute time, or with respect to one of the phases of any transaction Time related fields—Request_Start_Time (see below for more details)
Index related field—Request_Start_Index (see below for more details)
Phase related field—Request_Start_Phase (see below for more details)
The "MIP" Instruction
MIP (ISOC_Block, Length, Tag, Channel, ISOC_Block, Sync_Code, Data,
  Data_Ptr, Request_Header_CRC, Data_CRC, Speed_Code, Failure_Data,
  Failure_Field, Failure_Amount, Request_Start_Time, Absolute/Relative,
  Request_Start_Index, Request_Start_Phase)
MIP
  (Request_Code, { . . . 1394 fields . . . }, Speed_Code, Failure_Field,
  Failure_Data, Request_Start_Time, ReST_ABS_REL, Request_Start_Index,
  Request_Start_Phase);
Request_Code—An instruction for the Test Environment to initiate an Isoch transaction or an Async Stream transaction (P1394A)
Speed_Code—The speed at which the packet transactions are performed
ReST_ABS_REL
  —A binary variable, indicating whether the transaction is to executed at absolute time, or with respect to one of the phases of any transaction
Failure related fields—Failure_Data, Failure_Field (see below for further details)
Time related fields—Request_Start_Time (see below for further details)
Index related fields—Request_Start_Index, (see below for further details)
Phase related fields—Request_Start_Phase, (see below for further details)
The "MAP" Instruction
MAP (Request_Code, Tcode, Source_Id, Dest_Id, TL, Pri, Length, Dest_Off,
  Ext_Tcode, Retry_Code, Rcode, Data, Data_Ptr, Req_Header_CRC,
  Resp_Header_CRC, Req_Data_CRC, Resp_Data_CRC, Retry_Amount,
  Speed_Code, Failure_Data, Failure_Field, Failure_Amount,
  Request_Start_Time, Absolute/Relative, Request_Start_Index,
  Request_Start_Phase, Request_Ack_Latency, Absolute/Relative,
  Request_Ack_Index, Request_Ack_Phase, Response_Start_Latency,
  Absolute/Relative, Response_Start_Index, Response_Start_Phase,
  Response_Ack_Latency, Absolute/Relative, Response_Ack_Index,
  Response_Ack_Phase, Retry_Start_Latency, Absolute/Relative,
  Retry_Start_Index, Retry_Start_Phase)
MAP
  (Request_Code, {. . . 1394 fields . . . },
  Retry_Amount, Speed_Code, Failure_Data, Failure_Field, Failure_Amount,
  Request_Start_Time, ReST_ABS_REL, Request_Start_Index, Request_Start_Phase, Request_Ack_Latency, RAL_ABS_REL, Request_Ack_Index, Request_Ack_Phase, Response_Start_Latency, RpSL_ABS_REL, Response_Start_Index, Response_Start_Phase, Response_Ack_Latency, RpAL_ABS_REL, Response_Ack_Index, Response_Ack_Phase, Retry_Start_Latency, RetST_ABS_REL, Retry_Start_Index, Retry_Start_Phase);

Request_Code An instruction for the Test Environment to initiate an Async transaction, PHY packet, or a PHY register access (read/write)

Speed_Code—The speed at which the packet transactions are performed

ReST_ABS_REL, RAL_ABS_REL, RpSL_ABS_REL, RpAL_ABS_REL,

RetST_ABS_REL
— A binary variable, indicating whether the transaction is to executed at absolute time, or with respect to one of the phases of any transaction Failure related fields—

Failure_Data, Failure_Field,

Retry_Amount, Failure_Amount (see below for more details)

Time related fields—

Request_Start_Time, Request_Ack_Latency,

Retry_Start_Latency, Response_Start_Latency,

Response_Act_Latency (see below for more details)

Index related fields—

Request_Start_Index, Request_Ack_Index,

Response_Start_Index, Response_Ack_Index,

Retry_Start_Index (see below for more details)

Phase related fields—

Request_Start_Phase, Request_Ack_Phase,

Response_Start_Phase, Response_Ack_Phase,

Retry_Start_Phase (see below for more details)

CRC Function Instruction

CRC_Function (Data1, Data2, Data3, Data4, number_inputs,

Keep_Old_CRC_Value)

Failure Related Fields

Failure_Field Selects one of the fields in a packet (Async/Isoch) to be failed, in a trasaction. When no failures are introduced this field is set to "0".

Failure_Data Selects the bits in the field to be failed. The failure data is XORed with the field data, and this data is sent in the actual packet. When no failures are introduced this field is set to "0".

Retry_Amount The number of times a transaction is to be retried after a failure has occurred. This number is equal to or greater than the Failure Amount (for an Async packet [Cycle Start packets and Async Stream packets are exceptions]), or equal to the Failure Amount (for an Isoch Packet, Async Stream packet (P1394A) or Cycle Start packet). When no failures are introduced this field is set to "0".

Failure_Amount The number of times a transaction is to be failed. When no failures introduced this field is set to "0".

Time Related Fields

Request_Start_Time—The minimum time after which a request is to be initiated by the TE, after the completion of the phase[1] of a sub-action referred by the index.

Request_Ack_Latency—The minimum time after which an ACK Pending is to be sent by the TE to the Link Core, after the completion of the request phase* of the sub-action.

Response_Start_Latency—The minimum time after which a response is to be initiated by the TE, after the completion of the phase* of a sub-action referred by the index.

Response_Ack_Latency—The minimum time after which an ACK Complete is to be sent by the TE to the Link Core, after the completion of the response phase* of the sub-action.

[1]Refer Phase related fields

Retry_Start_Latency—The minimum time after which a retry is to be initiated by the TE, after the completion of the phase of a sub-action referred by the index.

In case of the binary variable being defined as ABSOLUTE, these times correspond to the absolute times in the simulation process after which a transaction will be initiated. The timing values for the Acknowledge packets are used by the TE to check timing when Link is sending an ACK packet.

Index Related Fields

Request_Start_Index The index of the transaction to which the request phase of the current request sub-action is relative to.

Request_Ack_Index Always indexed to the request phase of a transaction, the Request and the Request ACK together constitute a request sub-action.

Response_Start_Index The index of the transaction to which the response phase of the current response sub-action is relative to.

Response_Ack _Index Always indexed to the response phase of a transaction, the Response and the Response ACK together constitute a response sub-action.

Retry_Start_Index The index of the transaction to which the initiation of the current retried sub-action is relative to. If the Index is a positive integer, the transactions referred to are those preceding the current entry in the Action List. If the Index is a negative integer, the transactions referred to are those succeeding the current entry in the Action List.

Phase Related Fields

The Phases valid for an Async[2] transaction are: Request Phase, Request ACK Phase, Response Phase, Response ACK Phase and Complete Phase.

[2]Cycle Start packets and Async Stream packets are exceptions

The Phase valid for an Isoch packet, Async Stream packet (P1394A) and Cycle Start is: Complete Phase.

The Phase valid for a Reg command is: Complete Phase.

The Phases valid for a PHY register access (read/write) transaction are: Request Phase and Complete Phase.

Request_Start_Phase—The relative phase of a transaction in the Action List, to which request phase of the current transaction is to be initiated by the TE.

Request_Ack_Phase—Always refers to the request phase of the current transaction.

Response_Start_Phase—The relative phase of a transaction in the Action List, to which response phase of the current transaction is to be initiated by the TE.

Response_Ack_Phase—Always refers to the response phase of the current transaction.

Retry_Start_Phase—The relative phase of a transaction in the Action List, to which a retry (request/response sub-action) for the current transaction is to be initiated by the TE.

What is claimed is:

1. A method of testing a device, the method comprising the steps of:
 monitoring at least one output of the device, wherein the at least one output is generated by the device in response to an applied test command; and
 resolving the at least one output into atomic operations, wherein the atomic operations are substantially the smallest constituent operations which are substantially independent of the device.

2. The method of claim 1, further comprising the steps of:
 reconciling the atomic operations of the at least one monitored output against at least one rule governing a protocol;
 reconciling the atomic operations of the at least one monitored output against the applied test command; and
 recording the results of the test command reconciling step; and
 recording the results of the protocol reconciling step.

3. The method of claim 1, further comprising the step of:
 simulating the effect of at least one additional device on the device being tested,
 wherein the at least one additional device interfaces with the device being tested, and
 wherein a bus equivalent model is used to simulate the bus interactions between the at least one additional device and the device being tested such that it is not necessary to simulate the functional operation of the at least one additional device.

4. A method of testing a device, the method comprising the step of:
 applying a test command to the device by
  breaking the test command into its atomic operations, wherein the atomic operations are substantially the smallest constituent operations which are substantially independent of the device; and
  applying the atomic operations to the device, wherein a generator rules section comprising rules for the protocol and for the device and for the test command is utilized to apply the atomic operations to the device.

5. The method of claim 4, wherein the atomic operations can be applied to the device at relative times which are not fixed but are stipulated with regard to a second action, wherein the second action comprises an atomic operation.

6. The method of claim 4, further comprising the steps of:
 monitoring at least one output of the device, wherein the at least one output is generated by the device in response to the applied atomic operations of the test command;
 resolving the at least one output into atomic operations;
 reconciling the atomic operations of the at least one monitored output against the protocol rules;
 reconciling the atomic operations of the at least one monitored output against the test command; and
 recording the results of the two reconciling steps.

7. The method of claim 6, wherein the test command comprises a failure which is purposely applied to the device.

8. The method of claim 6, wherein the atomic operations can be applied to the device at relative times which are not fixed but are stipulated with regard to a second action, wherein the second action comprises an atomic operation.

9. A method of reconciling at least one monitored output of a device as part of a test of the device, wherein a test command has been applied to the device and the at least one output has been resolved into atomic operations, wherein the atomic operations are substantially the smallest constituent operations which are substantially independent of the device, the method comprising the steps of:
 reconciling the atomic operations of the at least one monitored output against at least one rule governing a protocol; and
 recording the results of the protocol reconciling step.

10. The method of claim 9, further comprising the steps of:
 reconciling the atomic operations of the at least one monitored output against the test command; and
 recording the results of the test command reconciling step.

11. The method of claim 10, wherein:
 the step of reconciling the atomic operations against the protocol rules comprises using a first monitor rules section, wherein the first monitor rules section comprises rules for the protocol; and
 the step of reconciling the atomic operations against the test command comprises using a second monitor rules section, wherein the second monitor rules section comprises rules for the test command.

12. The method of claim 11, wherein the first monitor rules section comprises the second monitor rules section.

13. A method of testing a device, the method comprising the step of:
 resolving at least one output from the device into atomic operations;
 utilizing a monitor rules section, which includes output protocol rules for a protocol and output device rules for the device, for monitoring the at least one output from the device by reconciling the atomic operations of the at least one monitored output against the protocol rules, wherein the output protocol rules and the output device rules relate to outputs from the device.

14. The method of claim 13, further comprising the step of:
 utilizing a generator rules section for generating inputs to the device, wherein the generator rules section comprises input protocol rules for the protocol and input device rules for the device, and wherein the input protocol rules and the input device rules relate to inputs to the device.

15. A system for testing a device, the system comprising:
 a first subsystem for monitoring at least one output of the device, wherein the at least one output is generated by the device in response to an applied test command; and
 a second subsystem for resolving the at least one output into atomic operations, wherein the atomic operations are substantially the smallest constituent operations which are substantially independent of the device.

16. A system for testing a device, the system comprising:
 a first subsystem for breaking a test command into its atomic operations, wherein the atomic operations are substantially the smallest constituent operations which are substantially independent of the device; and
 a second subsystem for applying the atomic operations to the device, wherein a generator rules section comprising rules for the protocol and for the device and for the test command is utilized to apply the atomic operations to the device.

17. A system for reconciling at least one monitored output of a device as part of a test of the device, wherein a test command has been applied to the device and the at least one output has been resolved into atomic operations, wherein the atomic operations are substantially the smallest constituent operations which are substantially independent of the device, the system comprising:

a first subsystem for reconciling the atomic operations of the at least one monitored output against at least one rule governing a protocol; and a second subsystem for recording a result of the protocol reconciliation.

18. A computer program product for testing a device, comprising:

a computer-readable signal-bearing medium;

first computer readable program code in the medium for monitoring at least one output of the device, wherein the at least one output is generated by the device in response to an applied test command; and second computer readable program code in the medium for resolving the at least one output into atomic operations, wherein the atomic operations are substantially the smallest constituent operations which are substantially independent of the device.

19. A computer program product for testing a device by applying a test command to the device, the computer program product comprising:

a computer-readable signal-bearing medium;

first computer-readable program code in the medium for breaking the test command into its atomic operations, wherein the atomic operations are substantially the smallest constituent operations which are substantially independent of the device; and second computer-readable program code in the medium for applying the atomic operations to the device, wherein a generator rules section comprising rules for the protocol and for the device and for the test command is utilized to apply the atomic operations to the device.

20. A computer program product for causing a reconciling of at least one monitored output of a device as part of a test of the device, wherein a test command has been applied to the device and the at least one output has been resolved into atomic operations, wherein the atomic operations are substantially the smallest constituent operations which are substantially independent of the device, comprising:

a computer-readable signal-bearing medium;

first computer readable program code in the medium for reconciling the atomic operations of the at least one monitored output against at least one rule governing a protocol; and second computer readable program code in the medium for recording a result of the protocol reconciliation.

\* \* \* \* \*